United States Patent
Fisher et al.

(10) Patent No.: US 10,317,775 B2
(45) Date of Patent: Jun. 11, 2019

(54) SYSTEM AND TECHNIQUES FOR IMAGE CAPTURE

(71) Applicant: Andra Motion Technologies Inc., Dartmouth (CA)

(72) Inventors: Antony Fisher, Halifax (CA); Julian Taylor, Halifax (CA); Michael Macdonald, Dartmouth (CA); Jeffrey Levy, Dartmouth (CA)

(73) Assignee: Andra Motion Technologies Inc., Dartmouth (CA)

( * ) Notice: Subject to any disclaimer, the term of this patent is extended or adjusted under 35 U.S.C. 154(b) by 0 days.

(21) Appl. No.: 15/516,358

(22) PCT Filed: Oct. 5, 2015

(86) PCT No.: PCT/CA2015/051005
§ 371 (c)(1),
(2) Date: Mar. 31, 2017

(87) PCT Pub. No.: WO2016/049781
PCT Pub. Date: Apr. 7, 2016

(65) Prior Publication Data
US 2018/0046062 A1    Feb. 15, 2018

Related U.S. Application Data

(60) Provisional application No. 62/059,623, filed on Oct. 3, 2014.

(51) Int. Cl.
| G03B 3/12 | (2006.01) |
| H04N 5/232 | (2006.01) |
| G08C 17/02 | (2006.01) |
| G03B 13/34 | (2006.01) |
| G03B 13/36 | (2006.01) |

(52) U.S. Cl.
CPC ............... G03B 3/12 (2013.01); G03B 13/36 (2013.01); G08C 17/02 (2013.01);
(Continued)

(58) Field of Classification Search
CPC ...... G03B 3/12; G03B 13/36; G03B 2206/00; G03B 13/34; H04N 5/23216; H04N 5/23203; G08C 17/02; G08C 2201/32
See application file for complete search history.

(56) References Cited

U.S. PATENT DOCUMENTS

| 8,982,272 B1* | 3/2015 | Preston | H04N 5/23293 348/333.03 |
| 2004/0046938 A1* | 3/2004 | Gero | G02B 7/28 352/140 |

(Continued)

OTHER PUBLICATIONS

International Search Report for Application No. PCT/Ca2015/051005, dated Jan. 5, 2016.

(Continued)

Primary Examiner — Nhan T Tran
(74) Attorney, Agent, or Firm — Marshall, Gerstein & Borun LLP

(57) ABSTRACT

An adjustment device and associated method is disclosed, for adjusting an equipment, such as a camera, having an actuator for adjusting a variable setting, such as a lens setting (focus, iris, zoom). A control system drives the actuator and command component of the adjustment device to reflect a position of the actuator. In a slave mode, the command component is driven by the control system. In an override mode, a manual operation of the command component drives the actuator of the equipment. Also disclosed are a method for building a model of a lens, a method for treating an image capture to produce a visual effect, a method for creating a node in a model representing a given space, a method for setting a node in a model based on a known node, and a method for calibrating a node in a model.

21 Claims, 39 Drawing Sheets

(52) U.S. Cl.
CPC ..... *H04N 5/23203* (2013.01); *H04N 5/23216* (2013.01); *G03B 13/34* (2013.01); *G03B 2206/00* (2013.01); *G08C 2201/32* (2013.01)

(56) References Cited

U.S. PATENT DOCUMENTS

| | | | |
|---|---|---|---|
| 2008/0225234 A1* | 9/2008 | Bauer | H04N 5/23212 352/140 |
| 2008/0284899 A1* | 11/2008 | Haubmann | G02B 7/287 348/345 |

OTHER PUBLICATIONS

Wireless Compact Unit WCU-4; Internet Archive [online[; Jul. 4, 2014 [retrieved on Dec. 8, 2015]; Retrieved from the Internet: <URL:https://web.archive.org/web/20140704022827/http://www.arri.com/camera/pro_camera_accessories_electronic_control_system/products/wireless_compact_unit_wcu_4/>.

Written Opinion of International Searching Authority for International Application No. PCT/CA2015/051005, dated Jan. 5, 2016.

Arnold & Richter Cine Technik GmbH & Co., "Wireless Compact Unit WCU-4—Software Update Packet 2.0—User Manual", Austria, Feb. 9, 2015, pp. 1-84, http://www.arri.com/?eID-registration&file_uid=13526.

Arnold & Richter Cine Technik, "CLM-4 Controlled Lens Motor—User Manual", Germany, May 7, 2014, pp. 1-8, http://www.arri.com/?eID-registration&file_uid=12914.

Arnold & Richter Cine Technik, "WCU-4 Wireless Compact Unit—User Manual", Germany, Jan. 15, 2014, pp. 1-42, http://www.arri.com/?eID-registration&file_uid=11281.

* cited by examiner

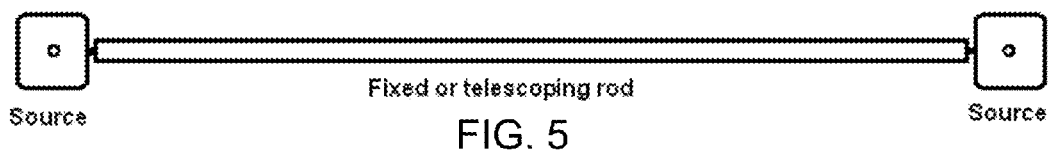
Fixed or telescoping rod
Source                                    Source
FIG. 5
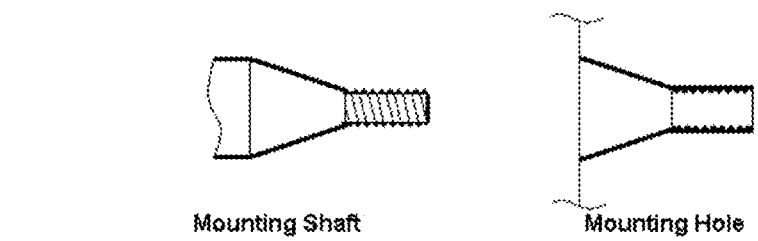
Mounting Shaft            Mounting Hole
FIG. 5B                   FIG. 5C
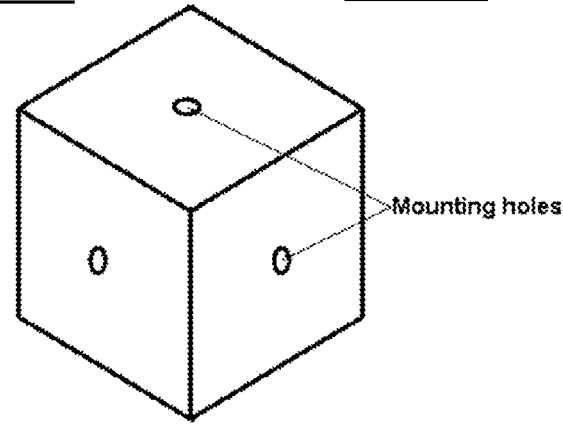
Mounting holes
Case with mounting holes, enclosing source
FIG. 5A

| | | |
|---|---|---|
| Node name: | Eyes ⊗ | Save Node |
| Node is fixed focal distance: | NO | |
| Node uses sensor: | YES | Delete Node |
| Assigned sensor: | A1 | |
| Calibration sensor: | A2 | Close |
| Calibration Stylus: | YES | |
| X offset: | 5" ⊗ | Freeze/Stream XYZ Measurements |
| Y offset: | 0.0" ⊗ | |
| Z offset: | 7" ⊗ | |

Motion Sensors:

| A1 | A2 | A3 | B1 | B2 | B3 |
|---|---|---|---|---|---|
| Eyes | NOT ASSIGNED | NOT ASSIGNED | NOT ASSIGNED | NOT ASSIGNED | NOT ASSIGNED |

| C1 | C2 | C3 | D1 | D2 | D3 |
|---|---|---|---|---|---|
| NOT ASSIGNED | NOT ASSIGNED | NOT ASSIGNED | NOT ASSIGNED | NOT ASSIGNED | NOT ASSIGNED |

FIG. 8

Exemple Node

Example selected
node with associated
sensor info

SYSTEM AND TECHNIQUES FOR IMAGE CAPTURE

FIELD

The present invention relates to the field of camera equipment. More particularly, the present invention relates to an adjustment device and associated system and method for adjusting an equipment, such as a camera. Also disclosed are a method for building a model of a lens, a method for treating an image capture to produce a visual effect, a method for creating a node in a model representing a given space, a method for setting a node in a model based on a known node, and a method for calibrating a node in a model.

BACKGROUND

In camera environments (e.g. film, television, live entertainment, sports), a large variety of equipment exists to operate the functionalities of cameras, lighting, and sound. The control and interrelations of these functions determines the qualities of the final imagery and sound perceived by audiences. One such function is camera focus. "Pulling focus" or "rack focusing" refers to the act of changing the lens's focus distance setting in correspondence to a moving subject's physical distance from the focal plane. For example, if an actor moves from 8 meters away from the focal plane to 3 meters away from the focal plane within a shot, the focus puller will change the distance setting on the lens during the take in precise correspondence to the changing position of the actor. Additionally, the focus puller may shift focus from one subject to another within the frame, as dictated by the specific aesthetic requirements of the composition.

This process of adjusting the focus is performed manually by the "First Assistant Camera" (first AC) or "Focus Puller".

Depending on the parameters of a given shot, there is often very little room for error. As such, the role of a focus puller is extremely important within the realm of a film production; a "soft" image will, in most circumstances, be considered unusable, since there is no way to fix such an error in post-production. One must also consider that an actor may not be able to duplicate his or her best performance in a subsequent take, so the focus puller is expected to perform flawlessly on every take. Because of these factors, some production personnel consider the focus puller to have the most difficult job on set.

Though Focus Pullers can be very skilled, the current process still slows down production due to the complexity and difficulty of the task.

Current film production begins with a blocking rehearsal, in which the various actors' positions are established. During the rehearsal, a camera assistant lays tape marks on the floor at all points where an actor pauses in movement. The actors then leave set to go through hair and makeup, and stand-ins come in to take their places at these various positions for the purposes of lighting, framing, and focus-mark setting.

Once a camera position is established by the director of photography and camera operator, the first AC begins to measure the various distances between the actors' marks and the focal plane of the camera. These distances are recorded in a series of grease pencil/pen marks on the focus barrel of the lens, and/or the marking disc on the follow focus device. Using the stand-ins the marks are checked through the viewfinder and/or the onboard monitor for accuracy. If marks are repositioned in order to provide specific framing desired, the first AC must re-measure/re-set his marks accordingly. Additionally, the first AC may lay down specific distance marks on the floor which will be referenced during the take as actors move between their marks, in order to assist in accurately adjusting the focus to the correct intermediate distances.

When the actors return to set, there is usually a rehearsal for camera in which the focus puller and operator will practice the shot and make sure everything has been set up properly. During a take, the focus puller modifies the focus based on the dialog, movement of the actors or subject, movement of the camera and compensates on the fly for actors missing their marks or any unforeseen movement. In cases where an obstruction prevents the focus puller from seeing all his marks, he may request the second AC to call the marks for him over a 2-way radio during the shot. In some situations, such as on long lenses, wide apertures, very close distances, or any combination of the three, a subject moving even a few millimeters may require immediate and very precise focus correction.

After a take, if the focus puller feels he's made a mistake—be it a timing error, a missed mark, or any other issue which may have rendered some part of the take "soft", he or she will typically report this to the operator (who most likely noticed the error in the viewfinder) or director of photography, and may ask for another take if another wasn't already planned.

In addition to keen eyesight, reflexes, and intuition, the focus puller's primary tools are a cloth or fiberglass tape measure, steel tape measure, laser rangefinder, and in some cases an on-camera ultrasonic rangefinder which provides a real-time distance readout mounted on the side of the mattebox or camera body. In setups where the focus puller cannot touch the camera, such as on steadicam or crane shots, he or she will use a remote follow focus system, though some focus pullers prefer using a remote system at all times. In any of the above mentioned cases the focus puller is still required to adjust the focus manually during the course of the shot.

The current approach is time consuming, difficult, and highly prone to error. It has long been a technical hurdle in cinematic moving image production and it imposes significant creative constraints on the director as well as increasing the cost of production due to unusable shots, slow setup times and the need for highly skilled and highly paid focus pullers.

Known to the Applicant are semi-automatic focusing systems that depend on lasers, sonar, and facial/object recognition tracking.

These methods are essentially variances of the same approach in that they each sense the "two dimensional plane" of the image and capture depth or distance information for any given area or pixel on that plane. For the most advanced systems, the operator of the system can then choose a point on the two dimensional image, at which time the distance data for that point will then be input to a motor which controls focus adjustment in real-time.

These known methods present some limitations. More particularly, these systems are all "line of sight". They cannot focus on an object that is not currently visible in the "two dimensional image plane". The laser system requires an additional operator to target a laser on the desired subject. The facial recognition system will lose track of an object if it turns rapidly, goes off frame or disappears behind another subject or object.

Perhaps most importantly, none of these systems is truly capable of the extreme accuracy required for the most challenging focus tasks, i.e a long focal length with a wide aperture when the subject is moving rapidly and the focus point on the subject is very specific, for example the eye, because for both the LIDaR (Light Detection and Ranging) and laser systems a human operator must keep track of the eye in real-time either by moving a cursor on a screen or by aiming an actual laser. It should also be noted that shining a laser into a person's eye may be undesirable. While the facial recognition system could in theory track and eye, there is a need to provide an increased level of precision and accuracy.

Known to the Applicant are U.S. Pat. No. 5,930,740 (MATHISEN), U.S. Pat. No. 8,448,056 (PULSIPHER), and U.S. Pat. No. 8,562,433 (LARSEN); United States Patent Applications having publication Nos. 2008/0312866 (SHI-MOMURA), 2010/0194879 (PASVEER), 2013/0188067 (KOIVUKANGAS), 2013/0222565 (GUERIN), 2013/0229528 (TAYLOR), and 2013/0324254 (HUANG), and Japanese Patent Application having publication No. JP 2008/011212 (KONDO).

Automated vs Manual Control

Current methods for adjusting Focus, Iris and Zoom on cinema and other cameras often use a handheld remote device, where a dial is turned manually and this in turn adjusts the focus ring on the lens.

These dials typically have hard stops and the degree of rotation is never more than 360 degrees. Typically it is in the 180 degree range.

The mapping of this dial to the movement of the focal ring on the lens is typically fixed so that a user learns the absolute position of a hand dial relative to the focal distance. In this way a user is accustomed to holding the unit and without looking at readouts on the unit, will, by "feel" be capable of adjusting focus.

However, with the advent of semi-automated focus pulling systems that use distance or range finding technology, it will be possible to have the focus ring on the lens adjusted without the need to turn a manual dial. Despite this, many users will want to be able to choose when to use automatic focusing and when to use manual focusing. Currently there is no method for this available.

The obvious solution is to have a button that activates when the unit is in manual mode and when the unit is in automatic mode. However, this causes problems if we imagine that a user turns the dial to one fixed focal point, say 3 feet, and then switches the system over to automatic. The subject then moves to 20 feet, at which point the user wants to return to manual focus control. However, the dial is still positioned at 3 feet, which—in the event of hard stops on the wheel, mean that the "feel" or learned response to that dial is no longer appropriate. Using a digital display will correct for the actual distance, but will not allow a user to still have the correct learned interaction with that dial.

One other method is have a dial that rotates freely—I.e no hard stops, so that a user can always adjust focus relative to that point, thus preserving some of their learned responses. However, hard stops are invaluable for other reasons, because the main reason for a dial is to give tactile responses and hitting a hard stop is a reliable physical feedback.

Haptic feedback is another option, where instead of hard stops, a user feels a "buzz" for example to indicate when they have reached a virtual feedback.

However, none of these is fully satisfying, since the user ideally wants to have a fully manual focus dial which they can use without any automation, and then simply decide when to use automation and when to use manual.

Method for Creating a Mathematical Model of a Lens

Lenses are shipped from the factory with "witness marks" which indicate where the focal ring needs to be adjusted in order for the subject to be in focus at the distance indicated on the witness mark.

When using software based lens control, either through an external focus motor, or using motors built into the lens, it is necessary to create a software model of the position of these witness marks, which is a mathematical analog, model or representation of the rotation of the focus wheel or other focusing hardware in order to be able to facilitate remote, external or automatic control of the lens.

Current methods for calibrating this mathematical model of the focus properties of the lens require using a servo (or other controllable motor) and aligning the lens to the witness mark and then using the "integer number" which represents a position of the motor and from there creating a curve fit, a spline fit or some other mathematical model of the motor.

This is time consuming and has a few drawbacks:

Firstly, the witness marks created at the factory are seldom accurate to a very high degree, so using these marks can cause poor focus response when using distance data to drive focus adjustment.

Secondly, even if the user creates their own witness marks by observing focus positions on the lens for a range of distances, this will always introduce human error which will be determined by the users ability to observe focus—i.e. imaging equipment available, resolution of camera used for assessment, etc.

Thirdly, if the user is using a "Motion Focus" system, for example an Andra System, which uses positional data of both camera and subject to calculate distance, on occasion this data is subject to distortion, and observed focus will drift at certain regions in the room, even in the theoretical possibility that a lens mathematical model is 100% accurate.

Live Visual Effects

The current staple for tracking camera and/or actor/objects in the film industry uses optical-based tracking systems that have many limitations including mediocre accuracy, poor orientation, and involves optical tracking points that will not be part of the final image (e.g. green screen suits, tracking marks on clothes and surfaces, etc.). Another common technique for vfx is by use of pixel tracking that is often imprecise and requires manually selecting pixels of the original image by a skilled person, and these pixels are in no way associated with the movements of the camera and other objects in the scene. Currently there are many limitations including disconnected datasets, high computational requirements (that limit live vfx possibilities), and enormous amounts of manual labour.

Hence, in light of the aforementioned, there is a need for an improved system which, by virtue of its design and components, would be able to overcome some of the above-discussed prior art concerns.

SUMMARY

The object of the present invention is to provide a system which, by virtue of its design and components, satisfies some of the above-mentioned needs and is thus an improvement over other related systems and/or methods known in the prior art.

According to an aspect, there is provided an adjustment device for a camera system. The camera system comprises a camera having a lens and an actuator for adjusting the lens, the camera system further comprising a control system for automatically controlling the actuator of the lens. The adjustment device comprises:

a communication module for receiving control data from the control system;

a command component being operable in a slave mode, wherein the command component is operated toward a target configuration in response to the control data received from the control system, said target configuration representing a position of the actuator of the lens, the command component being further operable in an override mode when the command component receives a manual operation; and a processor for operating the command component based on the control data received in the slave mode, and for generating, based on a configuration of the command component, command data to be sent to the actuator of the lens, via the communication module, when the command component is operated manually in the override mode.

According to another aspect, there is provided a method for adjusting a camera, the camera having a lens and an actuator for adjusting the lens, the camera being in communication with a control system for automatically controlling the actuator of the lens, the method comprising:
 a) receiving at a command component, control data from said control system, for operating the command component in a slave mode toward a target configuration in response to the control data, the target configuration representing a position of the actuator of the lens; and
 b) when receiving a manual operation at the command component, generating via a processor, command data to be sent to the actuator of the lens for an adjustment of the lens, in order to override the control data received from the control system.

According to another aspect, there is provided a non-transitional storage comprising data and instructions for execution by a processor, to carry out the steps of the above-mentioned method.

According to yet another aspect, there is provided a method for building a model of a lens for a camera, the camera having a focal plane, the method comprising:
 a) providing a visual target located at a focal node of a node sensor;
 b) receiving focus adjustment of the lens to achieve a focus setting where the visual target is in focus at the camera;
 c) obtaining focal distance data representing a distance between the visual target and the focal plane of the camera; and
 d) recording in a memory an indicator representing said focus setting, in association with said distance data.

According to another aspect, there is provided a non-transitional storage comprising data and instructions for execution by a processor, to carry out the steps b), c) and d) of the above-mentioned method.

According to another aspect, there is provided a device configured to carry out the steps b), c) and d) of the above-mentioned method.

According to yet another aspect, there is provided a method for treating an image capture to produce a visual effect, the method comprising:
 a) providing in a memory, a model of a given space, said model comprising at least one node, each node representing a physical location in the given space; and
 b) manipulating, by means of a processor, an image capture activity of said given space, based on said at least one node of the model.

According to another aspect, there is provided a non-transitional storage comprising data and instructions for execution by a processor, to carry out the steps of the above-mentioned method.

According to another aspect, there is provided a device for carrying out the steps of the above-mentioned method.

According to yet another aspect, there is provided a method for creating a node in a model representing a given space, the method comprising:
 a) providing a camera having a lens, the lens being adjusted to focus on a point within the given space, the point representing the node of the model;
 b) receiving via a focus setting of the lens, focal distance data representing a distance between the focal plane of the camera and said point in the space;
 c) receiving via the lens, orientation data representing the pointing direction of the lens;
 d) calculating, by means of a processor, a position of said point in space, based on the focal distance data and the orientation data; and
 e) storing in memory said node, as part of the model, in association with the position calculated in step (d).

According to another aspect, there is provided a non-transitional storage comprising data and instructions for execution by a processor, to carry out the steps b) to e) of the above-mentioned method.

According to another aspect, there is provided a device for carrying out the steps b) to e) of the above-mentioned method.

According to yet another aspect, there is provided a method for setting a node in a model representing a given space, the method comprising:
 a) receiving a known position associated with a node of the model;
 b) pointing a camera at a point in the given space having a relative position to the known position;
 c) receiving via a focus setting of the lens, focal distance data representing a distance between the focal plane of the camera and said point in the space;
 d) calculating, by means of a processor, a position of said point in space relative to the lens; and
 e) storing in memory the calculated position.

According to another aspect, there is provided a non-transitional storage comprising data and instructions for execution by a processor, to carry out the steps of the above-mentioned method.

According to another aspect, there is provided a device for carrying out the steps of the above-mentioned method.

According to yet another aspect, there is provided a method for calibrating a node in a model representing a given space, the node being offset relative to a reference, the method comprising:
 a) providing first position data from a first sensor at first location representing said reference;
 b) providing second position data representing said node;
 c) calculating a distance and orientation of an offset of the node relative to the reference, based on the first position data and the second position data; and
 d) storing in a memory said distance and orientation calculated, representing a tip offset of the node relative to the reference.

According to another aspect, there is provided, a non-transitional storage comprising data and instructions for execution by a processor, to carry out the steps of the above-mentioned method.

According to another aspect, there is provided, a device for carrying out the steps of the above-mentioned method.

According to yet another aspect, there is provided an adjustment device for adjusting an equipment having a variable setting and an actuator for adjusting said variable setting, said actuator being responsive to a control system for automatically controlling the actuator, the adjustment device comprising:

a communication module for receiving control data from the control system;

a command component being operable in a slave mode, wherein the command component is operated toward a target configuration in response to the control data received from the control system, said target configuration representing a position of the actuator of equipment, the command component being further operable in an override mode when the command component receives a manual operation; and a processor for operating the command component based on the control data received in the slave mode, and for generating, based on a configuration of the command component, command data to be sent to the actuator of the variable setting of the equipment, via the communication module, when the command component is operated manually in the override mode.

According to yet another aspect, there is provided a method for adjusting an equipment having a variable setting and an actuator for adjusting said variable setting, said actuator being responsive to a control system for automatically controlling the actuator, the method comprising:

a) receiving control data, at a command component, from said control system for operating the command component toward a target configuration in response to the control data, the target configuration representing a position of the actuator of the variable setting of the equipment; and b) when receiving a manual operation at the command component, generating via a processor, command data to be sent to the actuator of the equipment for an adjustment of the variable setting, in order to override the control data received from the control system.

According to another aspect, there is provided a non-transitional storage comprising data and instructions for execution by a processor, to carry out the steps of the above-mentioned method.

In particular embodiments, the orientation data is captured by the sensor device in all three degrees of freedom, for example in Euler angles of azimuth, elevation and roll (A,E,R). In such embodiments, the processor is adapted to calculate a position of a point of focus, or "node" in relation to the positional and orientation data representing the location of the sensor device. The processor is thus adapted to generate a control signal based on the position of the node.

By "point of focus" or "node" it is meant a particular point or region of interest on the subject based on which the setting (for example, focus, zoom, aperture, lighting, sound, etc.) of the equipment is to be controlled. This "node" is sometimes referred to as the "tip offset" in motion tracking systems that provide both position and orientation for example, in some situations where the node does not have the identical coordinate of the sensor but is at a fixed distance from the sensor. For example, the node may correspond to an eye of a person, while the positional and orientation data corresponds to the back of the person's head where the sensor is located. Thus, the focus, zoom, aperture, inter ocular angle, control pan, tilt, roll of the camera, position of the camera, lighting equipment, and/or sound equipment may be set depending on the particular positioning of the person's eye, through a calculation from the position and orientation of the sensor.

Embodiments of the present invention are advantageous in that a use of motion tracking data with very specific properties to create multiple predefined positional and directional 'nodes' in three-dimensional space, an increased level of equipment control and automation is achievable in a wide variety of moving and still photographic environments.

Embodiments of the present invention are advantageous in that they allow, with or without user interaction, real-time tracking and/or choosing from multiple pre-defined stationary or moving points in a three-dimensional space (nodes) and without any additional manual intervention, the choosing of any of these nodes at any time using a software interface or mechanical dial or other mechanical input device. In an exemplification of focus control, upon a user selecting a desired node, the system automatically adjusts focus to that node and maintains focus on that node even if the node and the camera are moving. It will also enable focus on a node that is not in the current field of view, allowing objects to be in focus the instant they enter the composition or appear from behind other objects (doorways, walls, vehicles, etc.).

The objects, advantages and features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 5 is a schematic diagram showing a camera sensor mount to be used with the system of FIG. 1A, according to an embodiment, the camera sensor mount comprising a rod and source cases mounted at each extremity of the rod.

FIG. 5A is a perspective view of the source case of the camera sensor mount shown in FIG. 5.

FIG. 5B is a side plan view of a portion of the rod shown in FIG. 5, showing one of the extremities of the rod with a mounting shaft extending therefrom.

FIG. 5C is a profile view of a mounting hole of the source case shown in FIG. 5A, configured to receive the extremity of the rod shown in FIG. 5B.

FIG. 8 shows a node creation/modification window of the GUI shown in FIG. 7.

DETAILED DESCRIPTION OF EMBODIMENTS

Figure 1A:
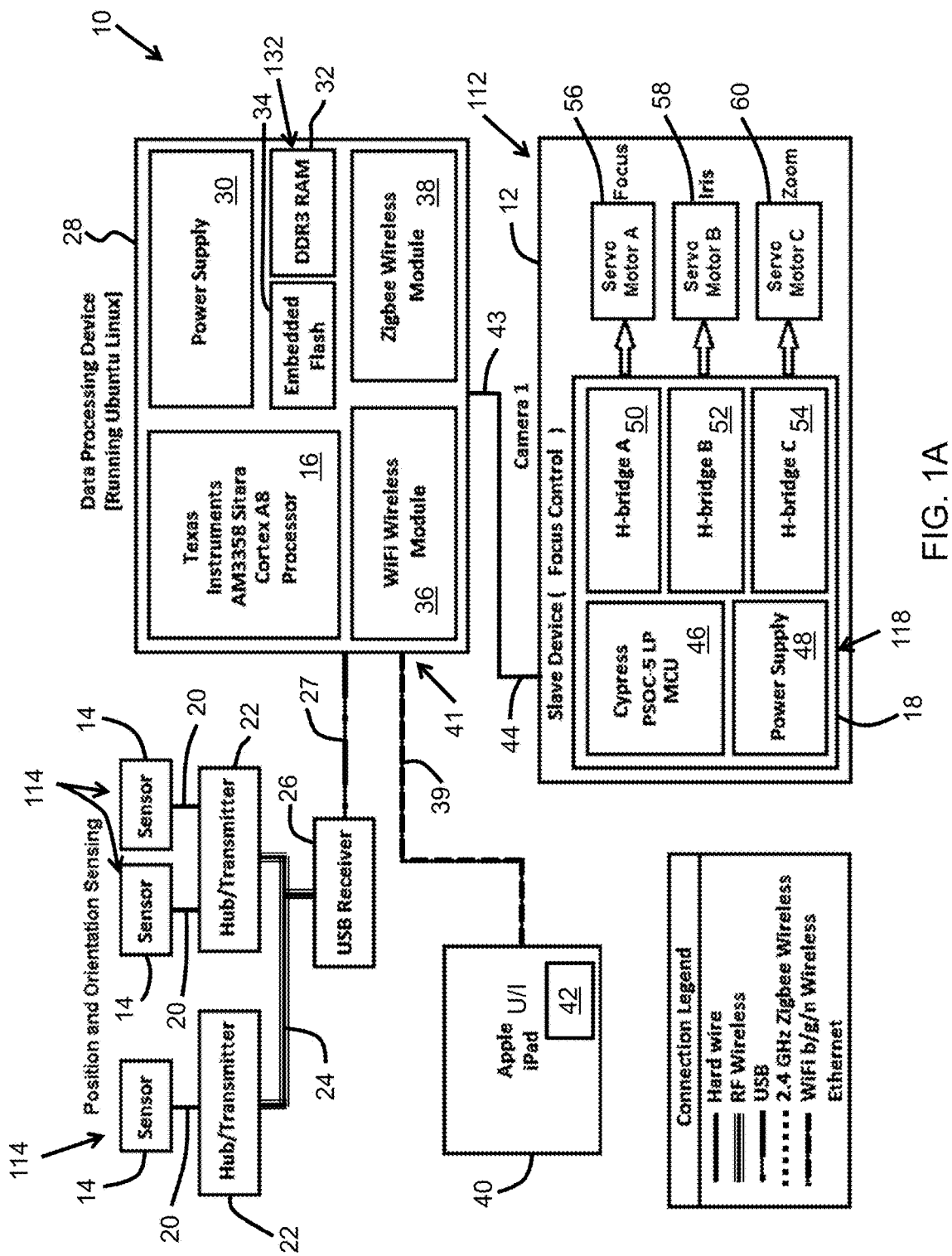
FIG. 1A is a block diagram of a system for controlling camera settings, according to an embodiment of the present.

In the following description, the same numerical references refer to similar elements. The embodiments mentioned and/or geometrical configurations and dimensions shown in the figures or described in the present description are embodiments of the present invention only, given for exemplification purposes only.

Broadly described, the present describes techniques, for example in the context of image capture, associated with the use of a model representing a physical space, where the model includes nodes representing locations in the physical space. Some nodes (sensor nodes) are obtained via a sensor, other nodes (non-sensor nodes) are calculated by applying an offset (or "tip offset") relative to another node (either a sensor node or non-sensor node). The present description discloses a method for creating a node in a model representing a given space, a method for setting a node in a model based on a known node, and a method for calibrating a node in a model.

More particularly, the present description concerns an adjustment device and associated system and method for adjusting an equipment, such as a camera.

Also disclosed is a method for building a model of a lens.

Also disclosed is a method for treating an image capture to produce a visual effect.

The above-mentioned techniques are compatible with a system and method for controlling a setting of a camera, according to a particular embodiment, which uses a motion capture or global (or local) positioning system to generate a three-dimensional positional and orientation data. This data is processed by software that computes in real-time the position and orientation in three-dimensional space along with other dimensional calculations including the relative distance data between the desired subject and the camera. This data is then used to control equipment such as servo motors for manipulating camera related equipment such as lens focus, lens aperture, and camera remote heads, all in real-time.

More particularly, according to a particular embodiment, controlling focus and composition, and involves creating pre-defined points in a three-dimensional space, hereafter referred to as "nodes". A node may either be a fixed node in a room, i.e. a vase of flowers. Or it may be a moving node, i.e. a person or animal. Fixed nodes do not require a sensor if the camera is not moving, or if the camera has a sensor. Moving nodes require a sensor as do moving cameras. Since the motion tracking system essentially creates the possibility of drawing an infinite number of defined points in a given three-dimensional space, interfacing with this data allows for vastly more complex and liberating creative and practical possibilities. One important feature of "nodes" as defined and used in this system is that they have both positional and orientation data: this allows for intelligent operations to be performed, such as pulling focus automatically between left and right eye—see "Auto Profiling" later in this document.

Thus when referring to FIG. 1, there is provided a system 10 for controlling a setting of an equipment 112 related to image capture, such as a camera 12. The system 10 comprises one or more sensing device 114, such as sensors 14, configured to capture position data and orientation data at the sensing device. The system 10 further comprises a processor 16 embedded in a data processing device 28 (also referred to herein as "data processing unit"). The processor 16 is in communication with the sensing devices 114, and configured to determine position information of a region of interest to be treated by the equipment 112, based on the position and orientation data. The processor 16 further comprises an output port 43 configured to output a control signal directed to the equipment 112, in order to control in real-time the setting of the equipment 112 based on said position information of the region of interest.

The system 10 further comprises a controller 118 being in communication with the output port 43 and being configured to control the setting of the equipment 112 with the control signal. The system 10 further comprises a memory 132, such as RAM 32, for storing the position data and orientation data. The system 10 further comprises the equipment 112. In accordance with this embodiment, the sensing devices 114 are visibility independent (i.e. non line-of-sight sensors), and comprise a transmitter 22. The system 10 further comprises a receiver 26 which is in communication between the transmitter 22 and the processor 16. The system 10 further comprises a user device 40 comprising a user interface 42 and which is in communication with the data processing device 28 over a wireless communication network 39.

More particularly, FIG. 1 shows a system 10 for controlling a setting of a camera 12. The system 10 comprises sensors 14, each for mounting on a subject to be capture by the camera 12, and each being adapted for capturing three-dimensional positional data based on the location of each sensor 14. The system 10 further comprises a processor 16 adapted to communicate with the sensor 14 for receiving the positional data and for sending a control signal based on the positional data. The system 10 further comprises a controller 18 adapted to communicate with the processor 16, in order to control, in response to the control signal, the setting of the camera 12.

As also shown in FIG. 1, the sensors 14, are each hardwired 20 to a hub/transmitter 22. The hub/transmitter 22 communicates via wireless radio frequency (RF link) communication means 24 to a Universal Serial Bus (USB) receiver 26, which in turn is connected via a USB connection 27 to a data processing device 28, having the processor 16 embedded therein.

The data processing device 28 further comprises a power supply 30 and a DDR3 random access memory (RAM) 32, and embeds a Flash non-volatile computer storage 34. The data processing device 28 further comprises a WiFi communication module 36 and a Zigbee™ wireless communication module 38 for communicating over a wireless data network 39 with a user device 40, which in this example is an iPad™, and includes a user interface 42. It is to be understood that the iPad™ may be replaced or combined with any other suitable computer device such as for example and Android™ tablet computer.

The controller 18 is connected to the data processing device 28 over a hardwire 44. The controller 18 is attached in an area of the camera 12, and comprises a Cypress PSOC™ 5 LP micro-controller unit (MCU) 46, as well as a power supply 48. H-bridges 50, 52, 54 connect the controller 18 to respective servo motors 56, 58, 60 which automatically operate particular settings of the camera 12, namely focus, iris and zoom respectively.

It is to be understood, that according to alternative embodiments, the above-mentioned components may be interconnected in any suitable manner via any suitable communication means.

Figure 2A:
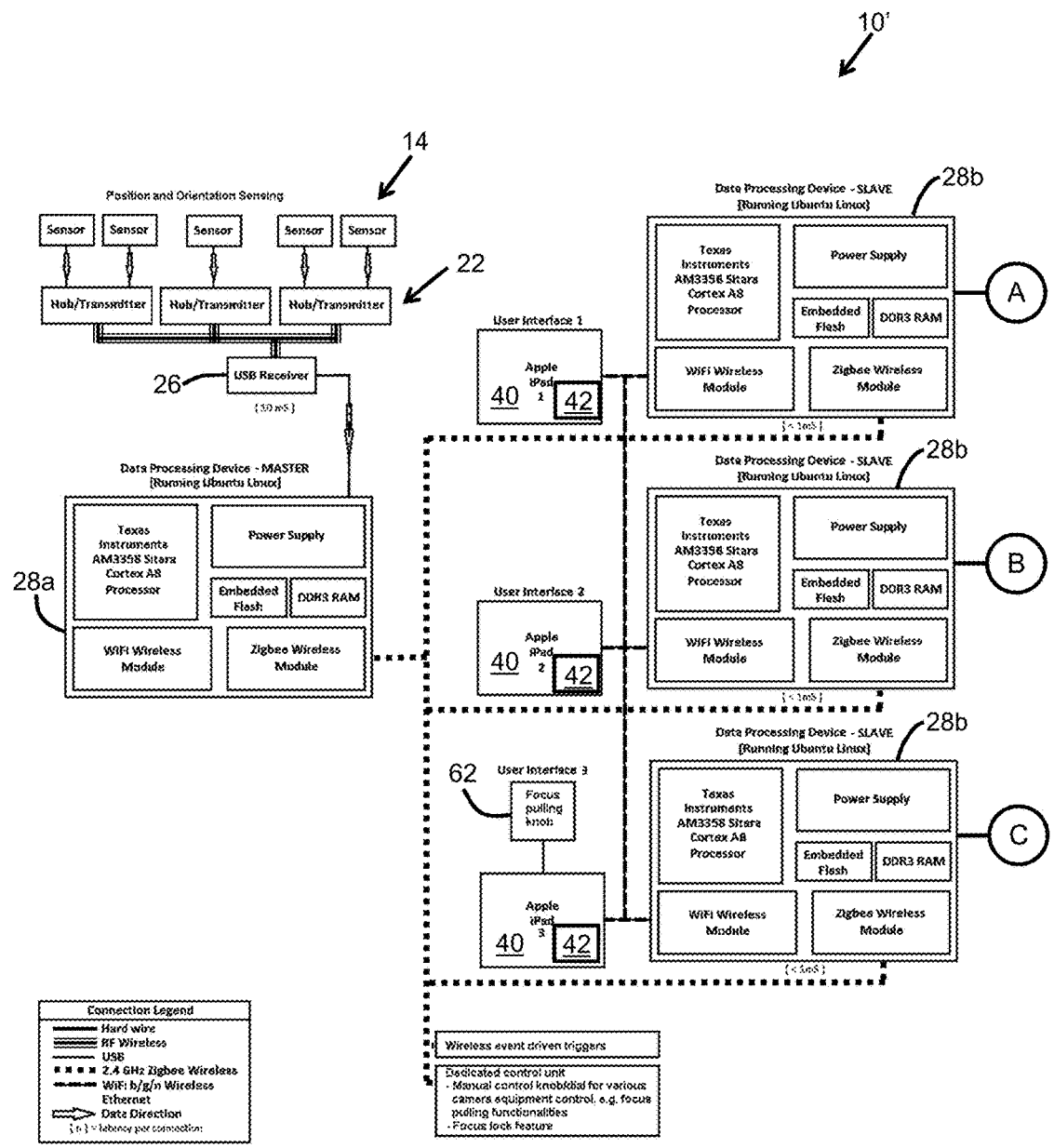
FIGS. 2A and 2B show a block diagram of a system for simultaneously controlling multiple camera settings and camera controls, according to another embodiment of the present invention.
Figure 2B:
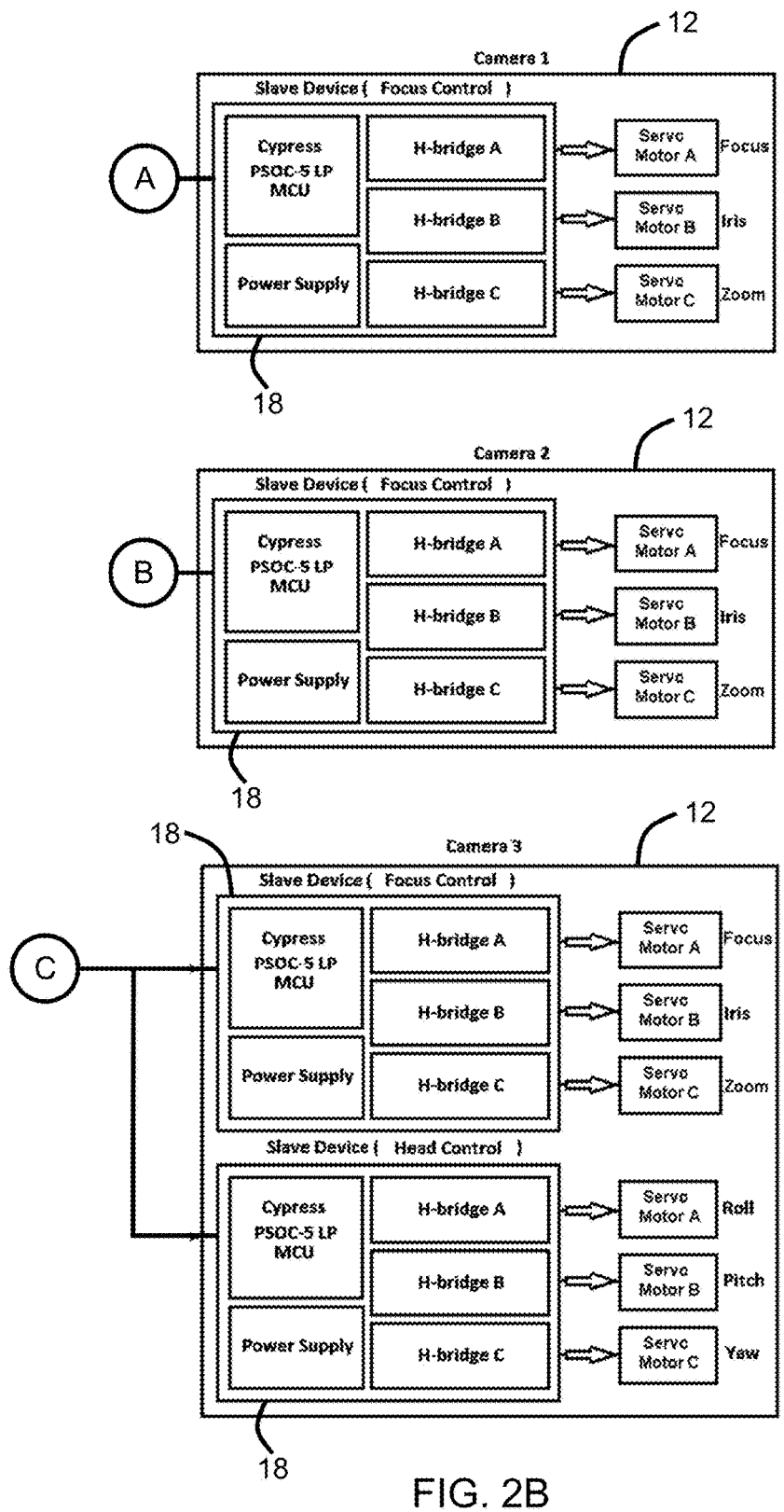

Indeed and for example, in the embodiment shown in FIGS. 2A and 2B, a plurality of cameras 12 are controlled by the system 10'. Each camera 12 is connected to a "slave" data processing device 28$b$, which is operable via corresponding user interfaces of user devices 40. The "slave" data processing devices 28$b$ are in communication with a "master" data processing device 28$a$.

The remaining components of FIGS. 2A and 2B refer to similar components shown in FIG. 1.

In the embodiments shown in FIGS. 1 and 2, the sensor system is provided by a magnetic motion tracking system. More particularly, the sensor 14 is provided by an induction coil and the system 10, 10' further includes an alternating current (AC) magnetic source generator (see FIG. 3). The hub 22 powers the sensor 14, interprets the data and transmits the positional data over radio frequency 24. Preferably, the magnetic source is mounted together with onboard power, on a custom extendable pole mount.

Optionally, a radio frequency repeater may be provided to extend the range of data transmission coming from the motion capture system. The USB RF receiver needs to get data from the sensor and transmit it to the camera. If the distance between camera and sensor is very large (for example when using a 2000 mm or 200 mm lens for car commercials etc) then it may be necessary to boost the range. Also optionally, a USB repeater may be provided in order to extend the range of data transmission coming from motion capture system.

The user interface 42 of each user device 40, i.e. iPad™, includes a touch screen, and the user device 40 is adapted to execute interface software which communicates with the central controller(s) 28, 28$a$, 28$b$.

Optionally, mechanical input devices (e.g. focus control dial or slider) may be provided to act as an analog/digital interface to add additional control features to the soft/ware. For example, as illustrated in FIGS. 2A and 2B, one of the user devices 40 has a user interface 42 including a focus pulling knob 62.

The central data processing device 28, operates with a Linux™ operation system, and performs much of the processing to control the servo motor(s) 56, 58, 60.

As previously mentioned, the servo motors 56, 58, 60, mechanically adjust camera settings, such as, for example, focus, zoom, aperture and/or control pan, tilt, roll, and/or the like.

It is to be understood that depending on particular embodiments, the setting may include any one of the following or a combination thereof: a focus setting of a camera, a zoom setting of the camera, an aperture setting of the camera, an inter ocular lens angle setting of the camera, a pan setting of the camera, a tilt setting of the camera, a roll setting of the camera, a positional setting of the camera, a lighting equipment control setting, a sound equipment setting, and the like.

In the context of the present description, the term "processor" refers to an electronic circuitry configured to execute computer instructions, such as a central processing unit (CPU), a microprocessor, a controller, and/or the like. A plurality of such processors may be provided, according to embodiments of the present invention, as can be understood by a person skilled in the art. The processor may be provided within one or more general purpose computer, for example, and/or any other suitable computing device.

Still in the context of the present description, the term "storage" refers to any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or the like. A plurality of such storage devices may be provided, as can be understood by a person skilled in the art.

Moreover, "computer-readable storage" refers to any suitable non-transitory processor-readable storage medium or computer product.

Other components which may be used with the above-described system 10, 10' include:
- a custom modular system of non-metallic pole mounts for source placement, namely a carbon fiber scaffolding rig with pre-determined sizes so that it can be quickly and easily set up, when using more than two sources.
- various clips and brackets for mounting sensors and magnetic sources to cameras, subjects and objects; and
- various instruments for facilitating easy measurement of node offsets and placement and source locations.

Figure 3:
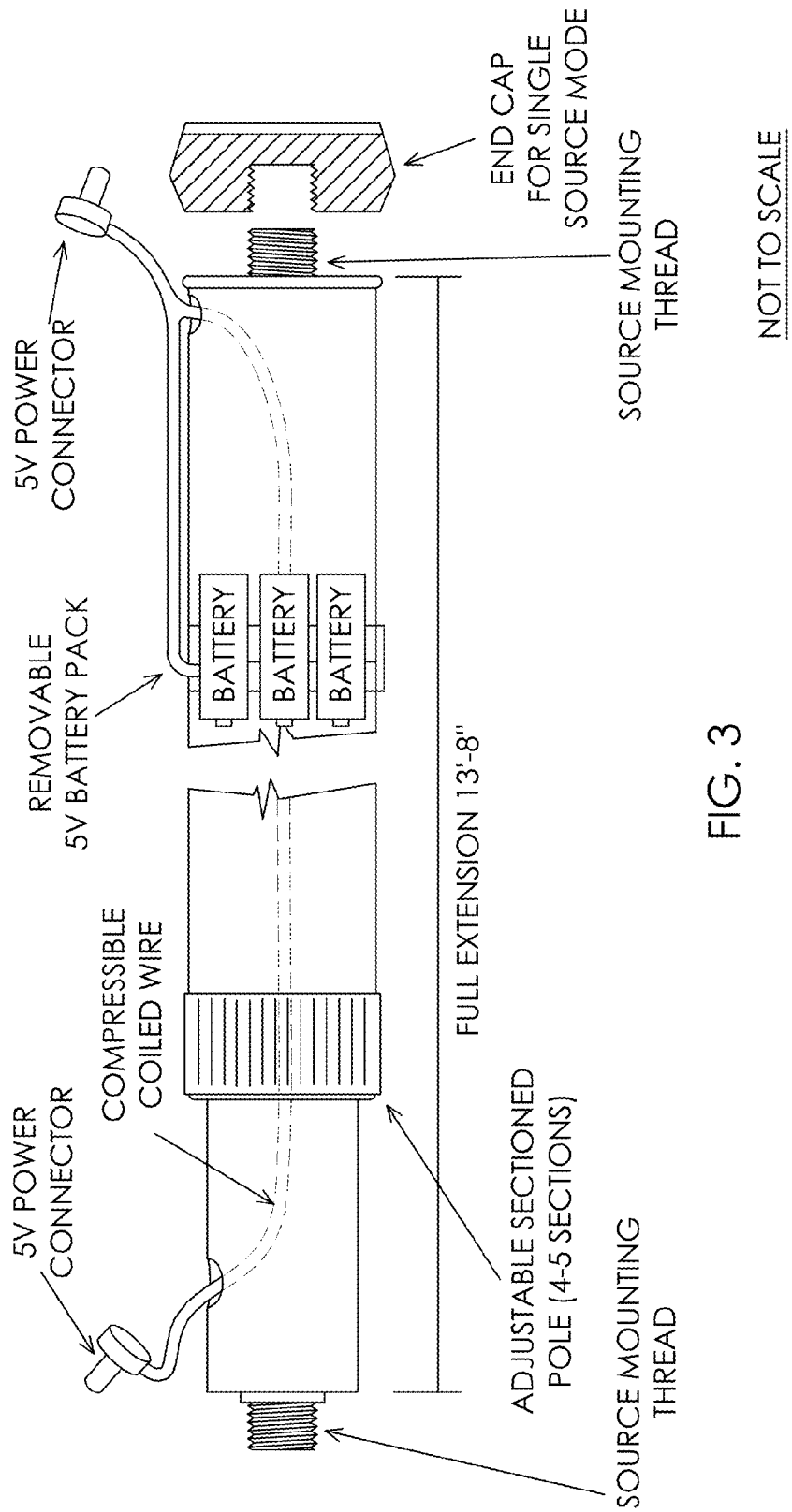
FIG. 3 is a schematic diagram showing a single or double boom pole source mount to be used with the system shown in FIG. 1A, according to an embodiment.
Figure 4:
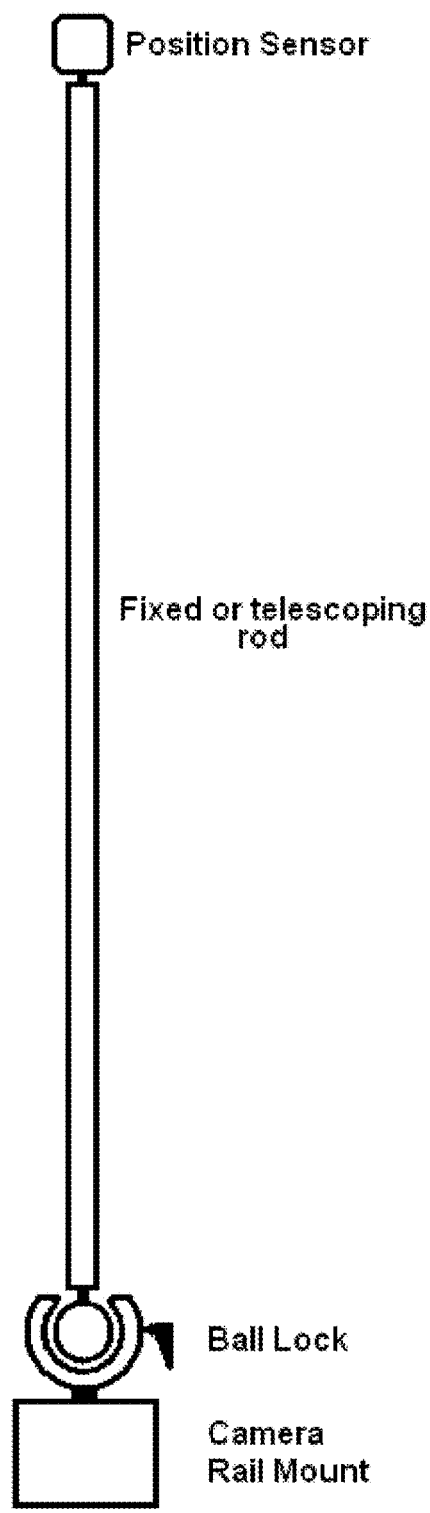
FIG. 4 a schematic diagram showing a camera arm source mount to be used with the system shown in FIG. 1A, according to an embodiment.
Figure 6:
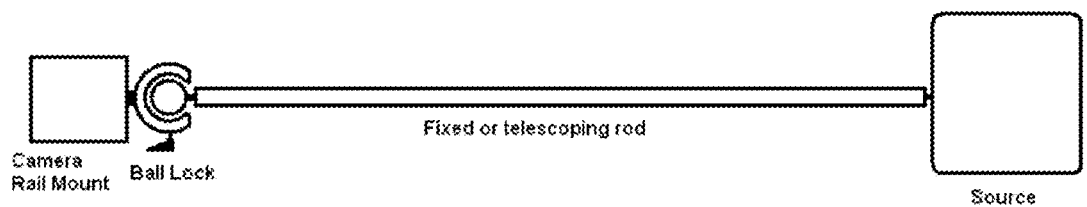
FIG. 6 is a schematic diagram showing a modular source mounting system to be used with the system of FIG. 1A, according to an embodiment.

Namely, FIG. 3 shows a single or double boom pole source mount to be used with the system, according to an embodiment. Moreover, FIG. 4 shows a camera arm source mount to be used with the system, according to an embodiment. Moreover, FIG. 5 shows a camera sensor mount to be used with the system, according to an embodiment, with portions thereof being shown in FIG. 5A-5C. Furthermore, FIG. 6 shows a modular source mounting system to be used with the system, according to an embodiment.

Operation of the System

As previously mentioned, embodiments of the present allow controlling focus and composition and involves creating pre-defined points in a three-dimensional space, referred to herein as "nodes", having both positional and orientation data. A node can either be a fixed node in a room, i.e a vase of flowers. Or it can be a moving node, i.e a person or animal. Fixed nodes do not require a sensor if the camera is not moving, or if the camera has a sensor. Moving nodes require a sensor as do moving cameras.

In operation, with reference to FIG. 1 the sensor 14 generates a coordinate representing it's physical location, for example an X,Y,Z coordinate of a Cartesian coordinate system and/or an Azimuth, Elevation, Roll (A, E, R) which represents the orientation of the sensor. For example, in the case where the sensor 14 is placed on the back of the head of a person being capture by the camera 12, the information generated by the sensor will indicate the location of the sensor and whether the person's head is facing forward, backward, etc.

The processor 16 receives the position and orientation information and calculates the position of the "node". For example, in the case where the sensor 14 is placed on the back of the head of a person, a "node" may correspond to one of the eyes of the person. Thus, the processor 16 seeks the predetermined position of the person's eye in relation to the sensor 14, and calculates the location of the eye, i.e. the point of focus, based on the location and orientation information received. The processor then calculates the distance between the camera 12 and the point of focus. Based on the calculated distance, the processor 16 outputs a control signal in order to control settings of the camera 12.

Figure 1B:
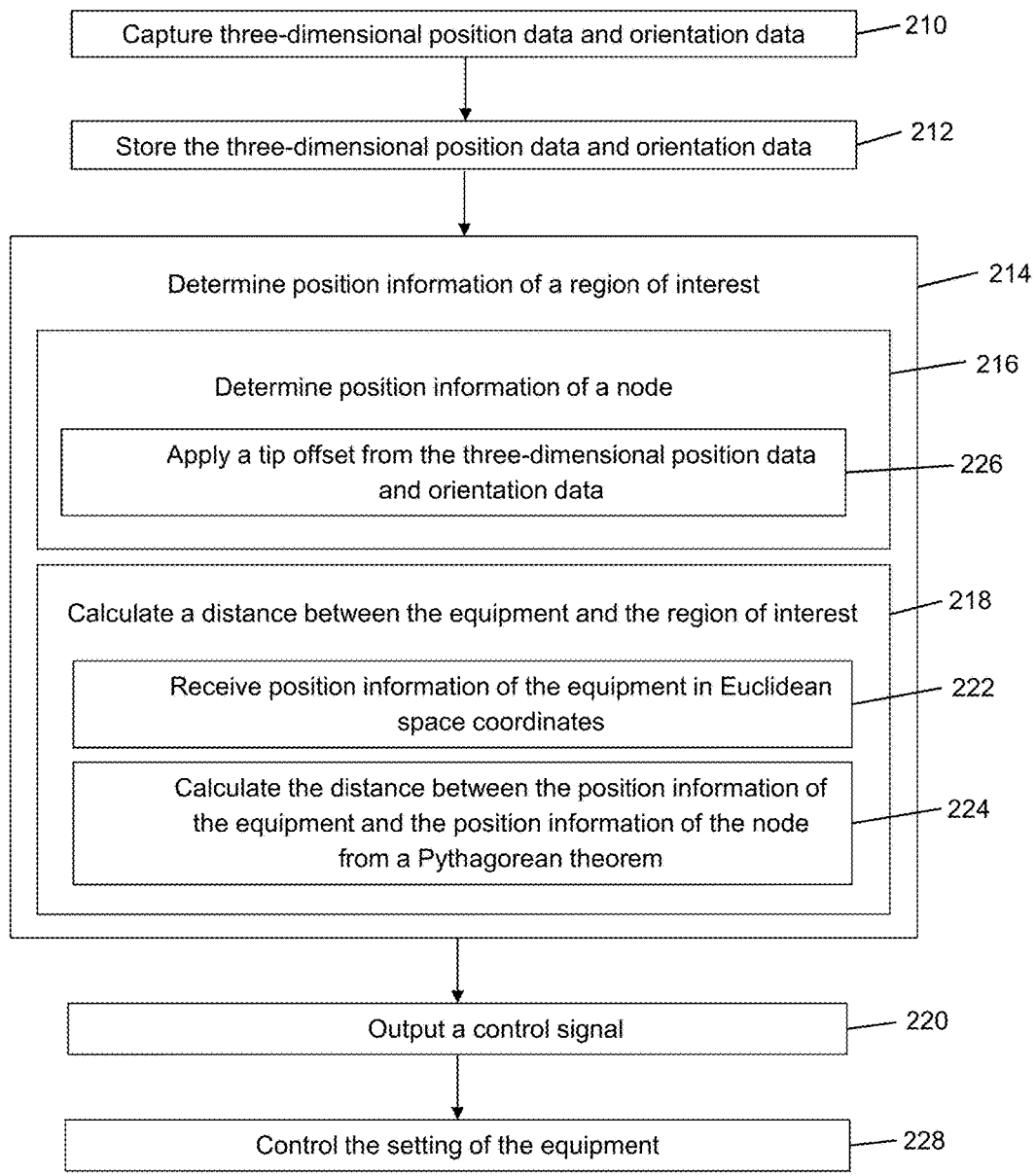
FIG. 1B is a flow chart representing steps of a method executed by the system shown in FIG. 1A, in accordance with an embodiment.

Thus, as better shown in FIG. 1B with further reference to FIG. 1A, there is provided a method 200 for controlling a setting of the equipment 112. The method 200 comprises capturing 210, by means of the sensing device 114, three-dimensional position data and orientation data of the sensing device 114, and storing 212 the position data and orientation data in the memory 132. The position data and orientation data is captured by the sensing device which produces a coordinate representing a physical location and a property representing the orientation of the sensing device 114. The method 200 further comprises determining 214, by means of the processor 16, position information of a region of interest to be treated by the equipment, i.e. a "node", based on the three-dimensional position data and orientation data. The node and the sensor device 114 are typically located a different locations. The processor 16 thus determines 216 the position information of the node, and further calculates 218 a distance between the equipment 112 and the node.

The method further comprises outputting 220, via output port 43, a control signal directed to the equipment 112, based on the calculated distance.

More particularly, a "Distance Formula" is derived from the Pythagorean theorem and calculates the distance between two points in three-dimensional Euclidean space (x1,y1,z1) and (x2,y2,z2). Once the exact position of two nodes are determined, the distance formula can be used to calculate the distance between these nodes. For the example of focusing a camera, if one of the nodes is the centre of the focal plane on a camera, the external focus ring or internal electronic focus mechanism of the lens can be set to that distance in order to focus an object.

More particularly, the position information of each node in the computing step 216 comprises Euclidean space coordinates of the node $(x_1, y_1, z_1)$, and the calculating step 218 comprises:
- receiving 222 position information of the equipment in Euclidean space coordinates $(x_2, y_2, z_2)$; and
- calculating 224 the distance between the position information of the equipment and the position information of the node from the following pythagorean theorem:

$$\text{distance} = \sqrt{(x_1-x_2)^2 + (y_1-y_2)^2 + (z_1-z_2)^2}$$

For a motion tracking sensor that measures both position and orientation, vector mathematics can be used to apply a "tip offset" to the location of the sensor. For example if an actor puts a sensor on the back of his/her cranium, a tip offset could project the location of the sensor to the surface of the actor's left eye, in effect creating a virtual sensor on the actor's eye. For rigid subjects/objects, applying a tip offset allows for nodes to be defined anywhere inside or on the surface of the subject/object. Likewise, tip offsets (nodes) can be created anywhere in 3D space, i.e. they can exist outside an object representing a location coordinate relative to the sensor's position and orientation. Thus, the determining step 216 comprises applying 226 a tip offset from the position data and orientation data of the sensing device 114 of the capturing step 210 in order to calculate the position information of the node.

One method to perform this tip offset (node) projection makes use of measured X, Y, and Z offsets from that sensor's origin to the eye, with respect to the axis system defined by the sensor. For the eye example, the offsets could be 10 cm in the X-direction, 0 cm in the Y-direction, and 8 cm in the Z-direction with respect to the sensor's local coordinate system. With these offsets, rotational matrices and/or quaternions can be used to calculate the absolute position (X,Y,Z) and orientation (yaw, roll, pitch) of the actor's eye in the motion tracking system's coordinate system. The following equations use a standard rotational matrix approach to solving this tip offset problem (see http://www.flipcode.com/documents/matrfaq.html#Q36).

Thus, in this embodiment, step 226 of applying the tip offset (see FIG. 1B) comprises obtaining relative coordinates of the node relative to the three-dimensional position data and orientation data of the sensing device 114, within an axis system defined by the sensing device 114. In this case, the determining step 216 comprises evaluating an absolute position of the node in relation to the equipment 112.

The absolute position of the node is evaluated as follows:
Using the rotation matrix M=X.Y.Z where M is the final rotation matrix, and X,Y,Z are the individual rotation matrices.

$$M = \begin{vmatrix} CE & -CF & -D \\ -BDE+AF & BDF+AE & -BC \\ ADE+BF & -ADF+BE & AC \end{vmatrix}$$

Where:
A,B are the cosine and sine, respectively, of the X-axis rotation axis, i.e. roll;
C,D are the cosine and sine, respectively, of the Y-axis rotation axis, i.e. tilt;
E,F are the cosine and sine, respectively, of the Z-axis rotation axis. i.e. pan;

$X_f = X_s + X_t * M(1,1) + Y_t * M(2,1) + Z_t * M(3,1);$ $Y_f = Y_s + X_t * M(1,2) + Y_t * M(2,2) + Z_t * M(3,2);$ $Z_f = Z_s + X_t * M(1,3) + Y_t * M(2,3) + Z_t * M(3,3);$ where:
$X_f, Y_f, Z_f$ are absolute (or "final") coordinates of the node;
$X_S, Y_S, Z_S$ are coodinates of the sensing device's center;
$X_t, Y_t, Z_t$ correspond to coordinates of the tip offset relative to the sensing device's center;
M(row,column) are elements of the rotation matrix in terms of row and column, respectively, with the element "row" representing the row number of within the matrix and the element "column" representing the column number of within the matrix.

The measurement of the "tip offsets" may be facilitated by another method. For example, there is a sensor is on the back of an actor's cranium with an initial orientation which can be represented in Euler angles or by a quaternion. A user wishes to define a node on the actor's left eye. Another motion tracking sensor can be placed against the actor's eye to calculate the X, Y, and Z offsets (instead of attempting to use a measuring tape for instance). One solution is to measure the "tip offset" and orientation at this initial time. Given the base sensor at position, P1, and the sensor at the desired node point, P2, the "tip offset", V1, is P2−P1.

The initial orientation can be defined as quaternion Q1 with X, Y, Z, and W attributes. At any other time, there will be a new orientation, Q2.

Thus, in this embodiment, step 226 of applying the tip offset comprises obtaining a tip offset having been precalculated by a position of a node sensing device located at a position of the node, in relation to a position and orientation of a base sensing device located at a position of said sensing device. As mentioned above, the initial orientation is defined as quaternion $Q_1$ with X, Y, Z, and W attributes, the orientation data of the capturing step is defined as $Q_2$. The position information of the node is determined according to:

$P_n + (q_i q_n) P_i (q_i q_n)$ where:
$P_i$ is the offset from the sensor at orientation q;
$P_n$ is the current position of the sensor;
$q_i$ is the orientation of the sensor at the time $P_i$ is calculated;
$q_n$ is the current orientation of the sensor; and
$q_i$ and $q_n$ are unit quaternions.

Various other approaches and/or method may be carried out in order to the position and/or orientation data to perform a variety of advanced system functions. An example may be the use of quaternions to calculate the position and orientation of a motion capture "magnetic source" relative to the origin of the motion capture coordinate system. If a member of a film crew places a source at a random position and orientation, then with the use of a motion sensor in the range of this random source, along with data from a sensor or source of known position and orientation, and data from a distance measuring device such as a laser tape measure, the exact position and orientation and the random source may be determined. Simple accessory tools and software may render this exemplified process very quick and simple to carry out.

Referring back to the embodiment shown in FIGS. 1A and 1B, the method 200 further comprises controlling 228, by means of the controller 118 (which is embedded in the equipment 112), the setting of the equipment 112 with said control signal.

Given that the node is offset from the sensor, the orientation data advantageously allows positioning the node even if the sensor turns, as the position of the offset rotates with the sensor. For example, a sensor may be mounted on the handle of a sword, and the focal point could be fixed to the tip of the sword and tracked with high precision no matter how the sword is moved and rotated.

A further advantage of using orientation data relates to a "calibration offset" function. With orientation data, it is possible to use a second sensor to instantly calculate the desired offset position of the focal node. For example, placing a sensor on the back of a performer's neck and then placing a second "calibration sensor" on the performer's eye is a fast and powerful way to create nodes. This feature will be better explained further below.

A further advantage of using orientation data relates to a "quick set" function, which is a special case of the calibration offset feature. The quick set function is useful when both the camera and the subject have sensors mounted to them, or if the camera is not moving and has no sensor, or if the subject is not moving and has no sensor. The camera is pointed at a subject (if there is a sensor on the subject) where the sensor is positioned out of sight, on their back, for example. The camera focus is then adjusted until the desired part of the subject is in focus, their eyes, for example. Using both the position and orientation data from the subject and the camera and then using the distance data indicated by the lens, it is possible to also obtain quick and suitably accurate adjustment of focal nodes. Alternatively, if the subject does not have a sensor but the camera does, conversely the camera data can be used to create a node—as per "quick create" feature describe below. Still alternatively, if the camera does not have a sensor, but is not moving, using the sensor data from the subject sensor relative to the fixed position data of the camera can be used to revise the position data of the subject.

Thus, worded otherwise, there is provided a method for setting a node in a model representing a given space. The method comprises (a) receiving a known position associated with a node of the model; (b) pointing a camera at a point in the given space having a relative position to the known position; (c) receiving via a focus setting of the lens, focal distance data representing a distance between the lens and said point in the space; (d) calculating, by means of a processor, a position of said point in space relative to the lens; and (e) storing in memory the calculated position. In some cases, the position of step (e) may be stored in association with the node, representing an adjusted position of the node. In other cases, the position of step (e) is stored in association with a new node, to create a new node. In this case, the new node may be associated with said node and a corresponding offset relative to the known position.

Further to this, according to a "quick create" function it is possible to create a node without the use of a sensor by using the position and orientation data of the camera, when the pointing direction of the camera is known and recorded relative to the sensor applied to the camera. In this way a user points the camera at a desired object or target and adjusts the focus of the lens so that the object is in focus. The distance data from the lens can then be combined with the position and orientation data of the camera to generate a node, or desired target. This will be a point in three dimensional space. Further repetitions of this process from different camera positions could be used to iterate and improve the accuracy of the data, for example, the lens would likely provide more resolution of data at a close distance because of the design of most lenses. If the object is at a far distance, and the lens data is not accurate, moving the camera to different points around the circumference of the desired node or target would increase the accuracy of the result. Further, with three points equally spaced around the circumference of the node a very highly accurate result could be determined from the camera's orientation and positional data alone. Thus the camera itself becomes a unique tool for creating fixed nodes for the system. This we consider to be wholly new and inventive.

Accordingly, there is provided a method for creating a node in a model representing a given space. The method comprises (a) providing a camera having a lens, the lens being adjusted to focus on a point within the given space, the point representing the node of the model; (b) receiving via a focus setting of the lens, focal distance data representing a distance between the focal plane of the camera and said point in the space; (c) receiving via the lens, orientation data representing the pointing direction of the lens; (d) calculating, by means of a processor, a position of said point in space, based on the focal distance data and the orientation data; and (e) storing in memory said node, as part of the model, in association with the position calculated in step (d). The focal distance data of step (b) may be provided by way of a model of the lens which correlates focus settings with focal distance data, as better explained further below with reference to the method illustrated in FIG. 37.

According to embodiments, the lens may have been adjusted via an automated focus system at the camera, for example using pixel analysis or by projecting a modulated Light-emitting diode (LED) at or near the visual target. In addition, the position stored in step (e) comprises three-dimensional positional data.

Various functional features and aspects, in accordance with particular embodiments of the present invention, will now be described.

Figure 1C:
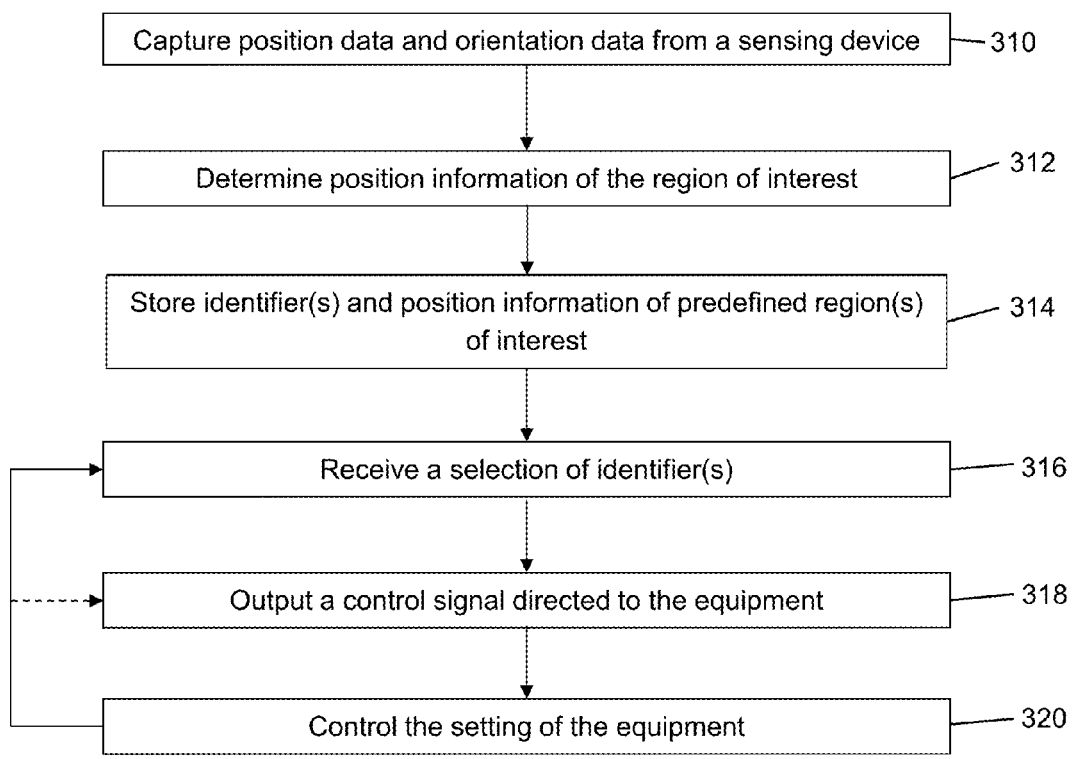
FIG. 1C is a sequence diagram representing a method executed by the system shown in FIG. 1A, in accordance with an embodiment.

According to the embodiment shown in FIG. 1C, with further reference to FIG. 1A, there is shown a method 300 for controlling a setting of an equipment related to image capture. The method 300 comprises storing 314 in the memory 132, one or more identifier of a predefined region of interest (i.e. a "node") to be treated by the equipment 112 and corresponding position information (i.e. three-dimensional coordinate relative to the equipment). The position information is obtained by: capturing 310 position data and orientation data at the sensing device 114; and determining 312 the position information of the region of interest to be treated by the equipment 112, from the position and orientation data of the sensing device 114. The method 300 further comprises receiving 316, at the processor 16, a selection of the one or more identifier. The method 300 further comprises outputting 318, by means of the output port 43, a control signal directed to the equipment 112, in order to control 320 in real-time the setting of the equipment 112 based on the position information of the selected region of interest.

The Node Array:

By pre-defining nodes (either stationary or moving) it is possible to create an array of desired nodes in the interface. Simply by selecting the node the lens will instantly focus on, and/or the camera will point to and compose that node in the field of view. This allows for on the spot improvisation, extremely rapid rack focusing between large numbers of subjects/objects and the ability to accurately adjust between two moving subjects/objects without requiring any act of manual measurement or manual adjustment of focus dial— or in the case of camera operation, any manual adjustment of the camera itself. Thus, in this case, the receiving step 316 of the method 300 depicted in FIG. 1C comprises receiving a predetermined sequenced selection of nodes; and the method repeats the outputting step 318 for each node selected in order to automatically control 320 the setting of the equipment 112 sequentially for a plurality of nodes, in accordance with the sequenced node selection.

Node Sequencer:

It is also possible to create a pre-defined sequence of nodes, which suits the current paradigm of cinematic film production where a director knows the order of subjects in advance. In this way, by pre-loading desired nodes it is possible to simply shift from one subject/object to the next by simply clicking a "next" button, or turning a dial (real or virtual) back and forth the user can not only switch between two subjects at any desired moment, but can also dictate the speed at which the focus adjusts between subjects (speed of the focus pull). Thus, the afore-mentioned repeating of steps 318, 320 shown in FIG. 1C (with reference to FIG. 1A) is prompted upon receiving a user input command, via an input port 41. Alternatively, the steps 318, 320 are repeated based on a predetermined schedule stored in the memory 132.

Geometric Slider:

It is also possible to arrange graphical representations of the nodes (or node array) in geometrical (triangles and squares) or random patterns (zig-zag lines, curved lines etc.) on a touch screen device, and, by sliding a finger between each node the user will be "pulling focus" between subjects, again having control over the speed of the pull and again, having no need to measure or adjust the actual focus distance regardless of movement of subjects or camera.

Thus, the method 300 shown in FIG. 1C (with reference to FIG. 1A) further comprises receiving a user input command via a sliding motion on a touch screen, through the input port 41, corresponding to a displacement between two adjacent nodes, wherein the selection of the receiving step 316 comprises the identifiers of the adjacent nodes. The method 300 further comprises correlating intermediate positions between the adjacent nodes in accordance with the displacement, the outputting step 318 is repeated for each of said intermediate positions.

Interface Modes:

Using the Node Array, the Sequencer, the Geometry Slider and the hardware dial or other input device it is possible to choose between two basic modes of focusing.

One mode is "tap to focus" where a user simply taps a button (virtual or on physical input device) to choose a node or move forward in the node sequence to the next predetermined node. In this mode it should also be noted that it is possible to pre-determine the speed at which focus is adjusted when the next node is selected either by pre-defining a preference, or by adjusting a virtual "speed dial" or analog input device.

The second mode is "slide to focus" where the user not only selects the next node, but by using either the geometry slider, the virtual dial or the analog input device is able to select the next node and in real-time effectuate the speed at which the focus is adjusted. This emulated the current focus pulling paradigm, where a focus puller is in control of the speed of the adjustment, without introducing any danger of missing focus on the desired subject.

Tip Offset and Multiple Nodes from Single Sensor:

By using sensors with provide real-time position and orientation data it is possible to create multiple nodes using the same sensor. This is done by inputting an "offset value" using X,Y,Z, position coordinates and a relative azimuth, elevation, roll coordinate. Hence, a sensor attached to the back of a subject's head can have several nodes associated with the head, since it is a rigid object. The eyes, the tip of the nose, the ears, etc, can all be defined as nodes from a single sensor using this technique.

Fine Adjust for Tip Offset:

In situations where it may be difficult to measure an accurate offset in three-dimensional space two automation techniques are provided:

Presuming the sensor is in place on the back of an actor's neck and the desired node is in fact the eyes, a second sensor can be placed momentarily on the eyes. Using the data from the second sensor the "tip offset" data can be automatically calculated and applied to the node.

A tip offset can be adjusted manually by having the subject stand in view of the camera, then the focus puller can adjust the focus until the desired node is in focus (usually the eyes). The system is able to approximately calibrate its own tip offset because it knows the position and orientation of the sensor and it will know how far the focus has been adjusted relative to the sensor data.

Thus, worded otherwise, there is provided a method for calibrating a node in a model representing a given space. The node is offset relative to a reference. The method comprises: (a) providing first position data from a first sensor at first location representing said reference; (b) providing second position data representing said node; (c) calculating a distance and orientation of an offset of the node relative to the reference, based on the first position data and the second position data; and (d) storing in a memory said distance and orientation calculated, representing a tip offset of the node relative to the reference.

Using a sensor, the second position data of step (b) may be provided from a position measurement via a second sensor at a location of the node.

Alternatively, step (b) may comprise: (i) providing a camera having a lens, the lens being adjusted to focus on a point within the given space, the point representing the node to be calibrated; (ii) receiving via a focus setting of the lens, focal distance data representing a distance between the focal plane of the camera and said point in the space; (iii) receiving via the lens, orientation data representing the orientation of the point in space relative to the lens; (iv) calculating, by means of a processor, a node position of said point in space relative to the focal plane of the camera, on the basis of the focal distance data and orientation data received; and (v) returning the node position having been calculated as the second position data. The focal distance data of step (ii) may be provided by way of a model of the lens which correlates focus settings with focal distance data, as better explained further below with reference to the method illustrated in FIG. 37.

Auto Profiling:

If a user defines a node as the eyes using a sensor hidden elsewhere on the performer's body, it is possible to inform the system that this node is in fact "two nodes", a left and a right eye. Since the system knows at all times where the camera is and where the subject is and how the subject is oriented relative to the camera it can, for example, focus on the left eye when the left side of the face is towards the camera and the right eye when the right side of the face is towards the camera. Thus, the method 300 shown in FIG. 1C (with reference to FIG. 1A) further comprises determining the node (or region(s) of interest) which satisfies a given condition, among the selection of nodes received at step 316. The signal of step 318 is thus generated according to the node which satisfies the given condition.

Likewise, any rotating subject or object could have several "auto profiling" nodes associated with it which can be triggered as the subject or object turns.

Zoom Control:

Similar to pulling focus the position and orientation data can also be used for adjusting zoom. For example if it is desired to keep a subject at exactly the same size in frame regardless of their distance, by entering the lens parameters the system can auto-zoom in and out as the subject or object moves. NB: this effect is sometimes referred to as the "Dolly Zoom" or the "Triple Reverse Zoom", and currently requires a very steady camera motion and multiple rehearsals to achieve. This system enables this effect to be created in hand held shots and with random performer and camera movements.

Mirror Mode:

It is also possible to extend the function to calculate virtual distances and or angles, as would be required for photographing reflections in a mirror, for example. Where the focal distance between a camera and a subject reflected in a mirror equals the distance from camera to mirror PLUS the distance from mirror to subject, by placing a sensor on the mirror and the subject (and the camera if moving) the system can quickly calculate the correct virtual distance to focus on reflections when desired.

Focus Based on Optimal Focal Plane Between Two Nodes or Two Offset Nodes:

It may be desirable for example, to focus on two subjects each of which are wearing sensors. One may thus choose a midway point so that the chosen lens will allow for the subjects to both be in focus as the focal plane will be midway to each subject and will allow for best possible focus of both subjects as the focal plane will be at approximately the midway point of the depth of field. The operator may choose any point between the two subjects as well especially if they wish to ensure that one of the two subjects is given priority and definitely in focus in the event that the other subjects go outside of the range of the depth of field.

Inter Ocular Angle Adjust for 3D Production:

Some three-dimensional photography setups require real-time adjustment of inter ocular angle. This system can automate that adjustment by tethering this angle to the chosen subject/object.

Aperture Control:

In some situations it may be desired to "pull aperture" to adjust the amount of light going into the lens, for example when moving from a bright outdoor location to a dark interior during a single shot. By tethering camera position to aperture adjustment the aperture adjustment can be performed automatically for a range of pre-determined locations. In addition, because orientation data is available for the camera the aperture can be adjusted based simply on the direction of the camera allowing for the currently impossible scenario where a set or location can be lit to more than one "key light" and the aperture will always adjust smoothly between these exposure values.

Save Setups:

It is possible using this system to pre-plan very complex shots or scenes and enter all required data concerning the "nodes" and any sequences into a file on the interface software. This saving of "scenes" greatly improves on set efficiency and also gives creators the ability to plan and prepare highly complex shots that are not possible with current technology.

Distance Displays:

It is possible for the system to calculate the relative distance between subject and camera at any time and display this as distance data on any desired readout at any time. For example, the selected "node" distance data can always be displayed on the main control screen of the software interface. In addition "satellite devices" can tie in to this distance data, and users can select any node at any time to determine data.

For example a focus puller may be focused on Actor A during a rehearsal, but the cinematographer may wish to know how far away Actor B is to asses—the required light level to create the depth of field requested by the director. Using a handheld device like and iPod Touch™ or smart phone the cinematographer could access in real-time the distance data for Actor B, even while Actor A is in focus.

Multi Camera Support:

This system allows the user to setup one or more cameras, with no definable upper limit, and target multiple cameras to the same object or target each camera to separate objects.

Other Real-Time Data Displays:

Having access to real-time data also allows for other real-time calculations and indicators:

Depth of field for any given node at any given time.

Min focal distance warning—e.g., distance can display in orange when pre-defined close distance is reached and flash red when the subject reaches actual minimum focal distance.

Manual Overrides and Automatic Handoff:

Since any focus puller or camera operator may want to manually control focus at any time, regardless of the efficiency of a system, this system enables full instant manual or automatic switching between automatic and manual.

These are the methods available in the current system:

A digital fine adjust "dial" is permanently available to the focus puller. Simply by adjusting this fine adjust the focus puller can override the automatic focus setting by any amount.

"Slate Mode". By selecting a button the auto system immediately switches to full manual.

"Auto Handoff". This mode allows the user to pre-define a point at which a node, subject or object switches from auto to manual and vice versa. This may be useful when using very long lenses with subjects that travel a great distance and or may be a method for avoiding unwanted variances in the data.

Boom Mounted Source:

Since the film industry is already accustomed to the process of mounting a microphone on a long extendible pole—referred to as a "boom pole", one unique implementation of this system is to mount a magnetic source on a boom pole which can then be positioned over the performance area in the closest convenient location, in exactly the same way that a microphone is positioned over the performance area in the closest convenient location. If both subject and camera are equipped with sensors perfect focus data can still be gathered for multiple nodes. However, this method does not allow for camera operation or the use of fixed nodes not associated with a sensor.

Double (and Multiple) Source Boom:

Expanding on the basic idea of mounting a single source on a boom pole it is also possible to mount two sources, one on either end of a boom pole, to expand the range. Likewise other handheld configurations, a triangle or square, for example can extend the range, allowing for quick setups requiring no on set calibration since the relative positions of the sources can be pre-configured in the setup software.

Camera Mounted Source:

Mounting the source directly on the camera and using the software to calibrate the relative position of the camera to the source it is possible to operate the system without a sensor on the camera. This allows for a rapid setup "single source system" which provides great accuracy at close range where it is most needed for acute focus.

Modular System:

Multiple sources (no theoretical upper limit) can be arranged in pre-determined configurations or randomly. Pre-determined configurations can enable quick setups, (such as a equilateral triangle with 10 ft sides) and cover larger areas. Random configurations require some manual setup in software but allow for great flexibility in the shape and area to be covered by the system.

Stationary Magnetic Source (or Optical Sensor) Calibration:

Since the system uses multiple magnetic sources, (or in the case of infrared, multiple cameras) and the X,Y,Z and A,E,R of each source needs to be entered into the system, a simple interface for entering this data is included in the system.

Predictive (or Kalman) Filtering:

Since any automated system is looking at data in real-time it is always looking in the past. Though this system will be extremely fast, even a microsecond lag could have visible effects in extremely challenging situations i.e. very long lenses in low light with rapidly moving subjects. Currently film makers and cinematographers avoid these challenging situations and in fact spend large amounts of money in overcoming them, most notably in the rental of very expensive lighting packages to maintain an average f/stop of 5.6. With the addition of predictive algorithms to the system it is very easy to overcome any slight lag in data by compensating for any delay in focal position by adjusting the focal position in a fixed proportion relative to the subject's speed of motion towards or away from the camera. With the addition of this feature even the most obtaining focus under even the most challenging situations is relatively simple.

As with all features in this system it can be calibrated by the user to add as much or as little automation as is desired. A highly aggressive setting, for example, will create tight focus even on very rapidly moving objects. A less aggressive setting will create a more naturalistic delay, which may be more suitable to some creative goals.

Data Recording:

As previously mentioned, position and orientation data in this system may be recorded (i.e. stored in a memory 132—see FIG. 1A) in real-time and used later in other post production scenarios.

Enhanced Camera Control:

Using position and orientation data it is possible to fully automate the operation of the camera and the movements of a dolly and or jib arm or camera crane. However, camera operators and cinematographers want to have full control of the subtleties of the final composition. One feature of this system is to fully automate the complex work of camera control and allow the operator to simply move his finger over a video playback screen with a touch screen capability to adjust composition. For example, the automated system may keep the performer dead center on frame, but the operator wishes to frame the performer to the left of frame. By simply dragging a finger from any point on the video image to the left the system will compensate and adjust the performer's placement in frame to the desired composition. In this way framing a rapidly moving object will be as simple as if framing a stationary object. This same adjustment can be made with joystick controls, which are currently used for standard remote camera operation and this would also be a big improvement over current technology. The touch screen drag feature however is more intuitive and requires no training.

Infra Red LED:

The above-described system uses an AC magnetic motion capture system. However, an equally viable alternative, which may be applicable to larger studio configurations, is to use infra-red LED motion tracking systems to capture the same data. While infra-red is line of sight to the sensor cameras, it does not require line of sight between the camera and subject. It is possible to hide small infra-red LEDs in clothing, hair and other objects which will be invisible to the camera. It is also possible to create "smart fabrics" that have infra red patterns stitched into them which can provide the same data.

Differential Global (and Local) Positioning System:

Differential GPS provides almost all of the relative positional data required to operate this system. Augmenting the GPS by accelerating the processing time, "tethering", and adding extra sensory capacity to provide orientation data will make this system fully functional in virtually any outdoor location in the world. Indoor studio applications can be augmented by the development and use of a "local positioning system" which operates on the same principals as Differential GPS but at a much smaller scale and, because "satellites" can be stationary, a much greater accuracy can also be achieved.

Lighting and Other Equipment Control:

Once nodes are defined data can be made available to any number of auxiliary control systems that require accurate pointing, following, or targeting and other qualitative adjustments such as width of light beam, etc.

Sports Training:

Adapting this system to sports training is a relatively simple matter. For example, tethering a tennis ball machine to a software interface that knows the exact position of a player it is possible to program the machine to always play to a player's weakness (backhand) and or to create a more challenging virtual opponent with the machine's ability to fire balls at any speed or angle.

Application for Sight-Impaired Environments:

Another application of the system could be for use in low-light situations or for visually impaired persons. For example, an environment could be mapped as nodes and a visually impaired person could receive various types of feedback regarding their position and orientation, and the position and orientation of objects and people in a room. Another example would be in low-light situations such as an extreme darkroom, where any person could not see his or her environment.

In view of the above-mentioned examples, there is provided a method for interacting with a model of a given space, said model comprising at least one node, each node representing a physical location in the given space. The method comprises providing in a memory at least one condition, each condition being associated to one of said at least one node; and when one of said conditions is met, returning, by means of a processor, feedback data in association with the physical location of the corresponding node.

Referring now to FIG. 7 to 25, components of the graphical user interface (GUI) 64 will be described. The GUI 64 is displayed via the user interface device 42 of user device 40, in order to allow a user to operate the system 10 (see FIGS. 1, 2A and 2B).

Figure 7:
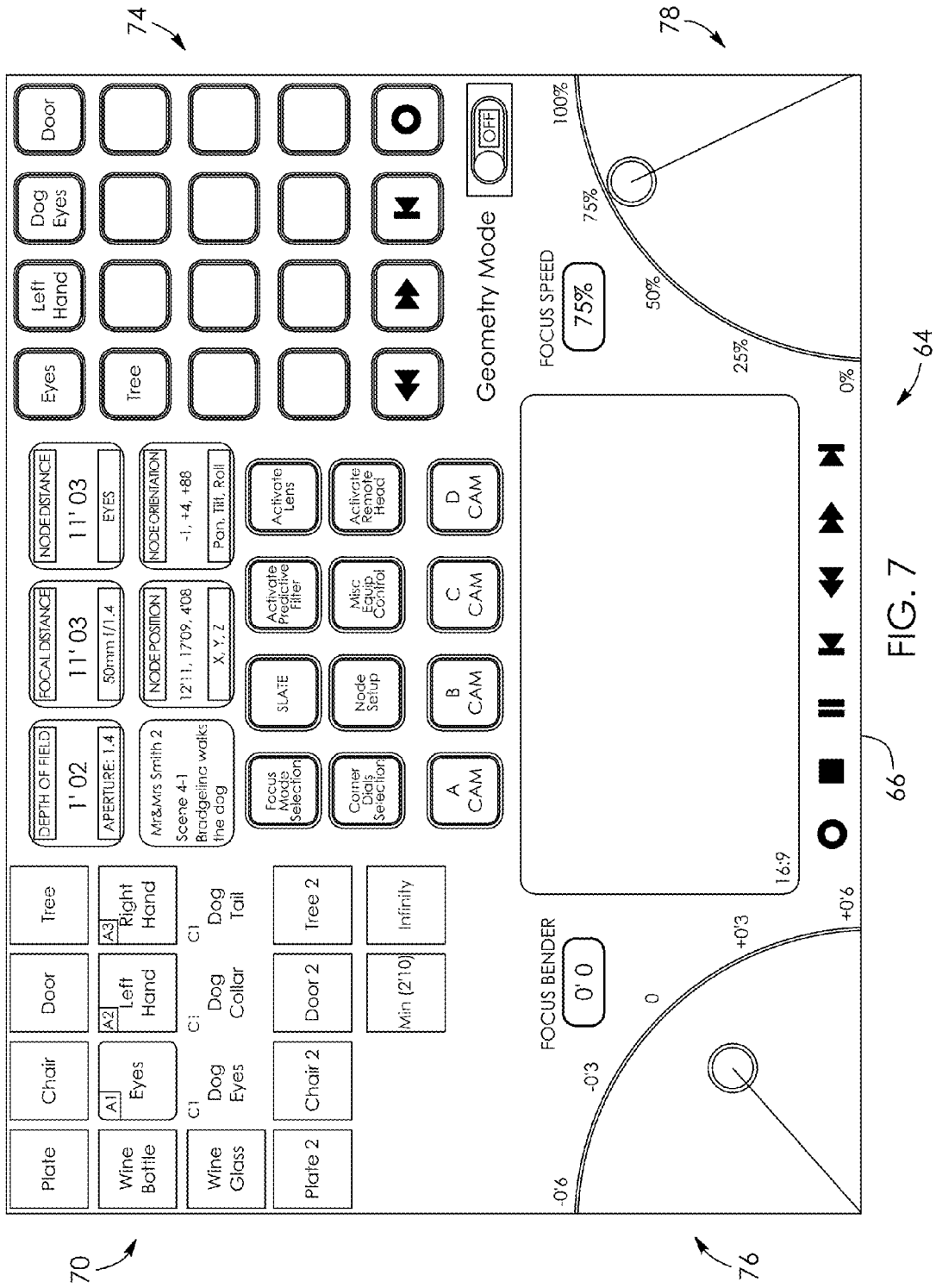
FIG. 7 shows a home screen displayed on a graphical user interface (GUI) of a user device in the system shown in FIG. 1A.

FIG. 7 shows a home screen 66 of the GUI 64.

FIG. 8 shows a node creation/modification window 68.

Figure 9:
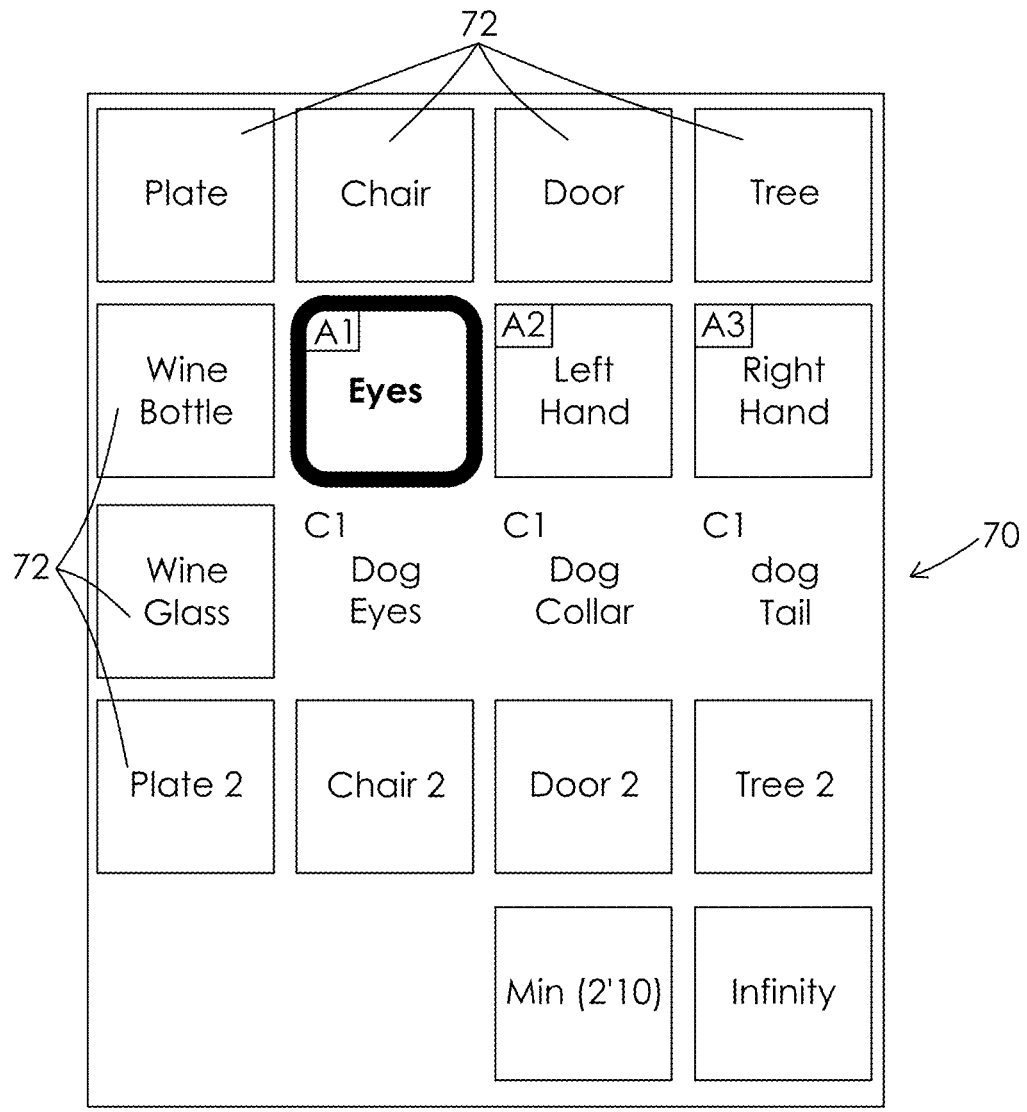
FIG. 9 shows a portion of the home screen shown in FIG. 7, namely a node array defining various nodes.

FIG. 9 shows a portion of the home screen 66 of FIG. 7, namely the node array 70, where a user has created various nodes 72 within the array 70.

Figure 10:
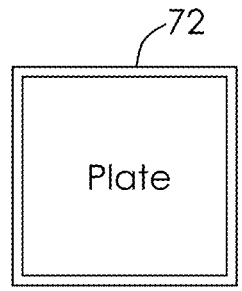
FIG. 10 shows a particular node button of the node array o shown in FIG. 9.

FIG. 10 shows a portion of the node array 70 of FIG. 9, and more particularly, an example of a node 72.

Figure 11:
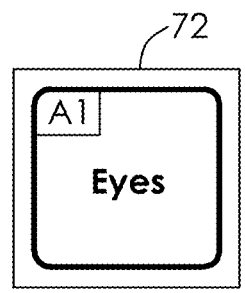
FIG. 11 shows a selected node button of the node array shown in FIG. 9.

FIG. 11 shows another portion of the node array 70 of FIG. 9, and more particularly, a node 72 which is highlighted, indicating that it has been selected by the user by tapping on the node. A node may indicate a variety of information to the user (e.g. if it is associated with a sensor, if the sensor is online, etc.).

Figure 12:
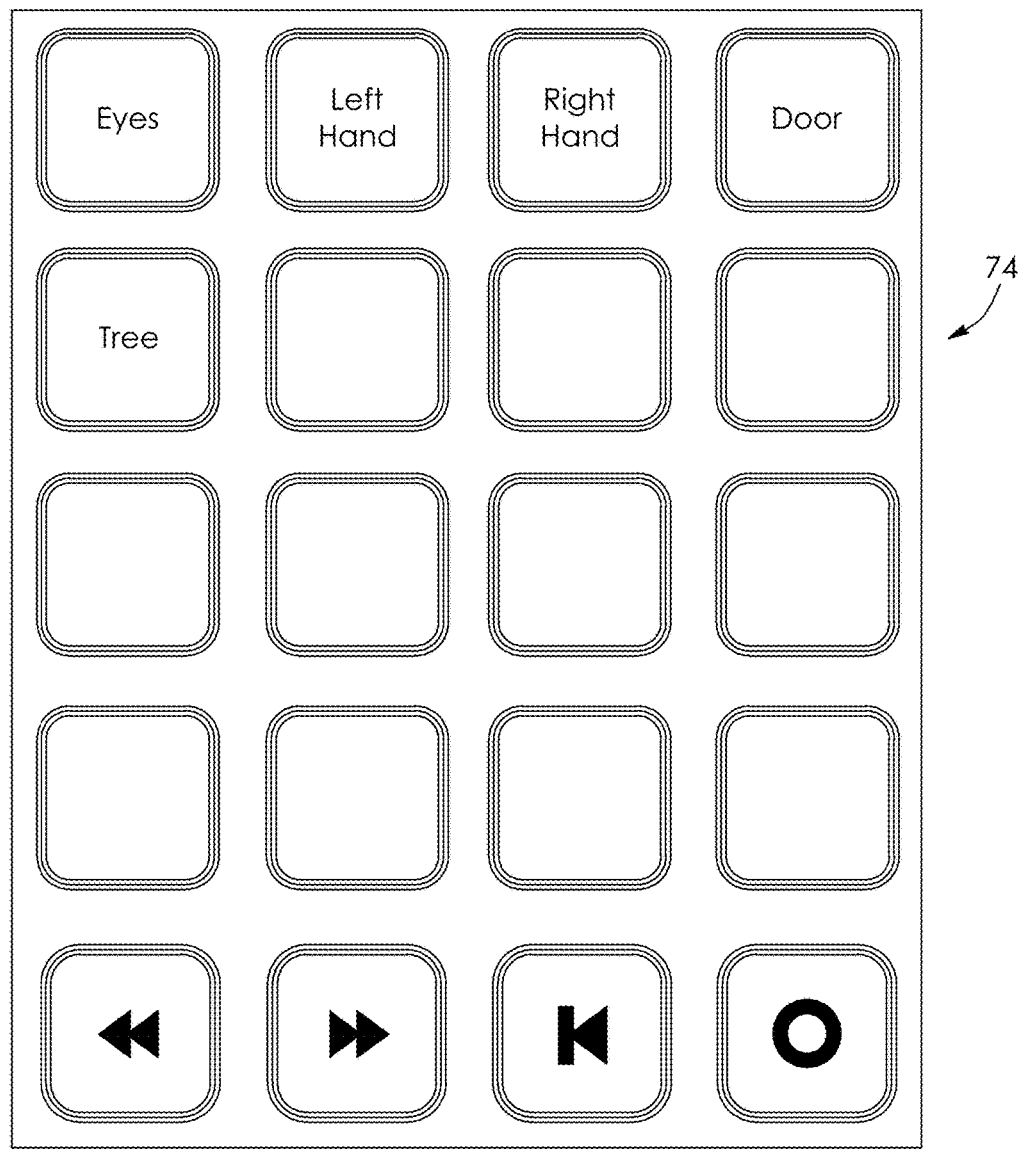
FIG. 12 shows a portion of the home screen shown in FIG. 7, namely showing a sequencer component.

FIG. 12 shows a portion of the home screen 66 of FIG. 7, namely a sequencer 74. A user has recorded various nodes in a specified order to the sequencer 74.

Figure 13:
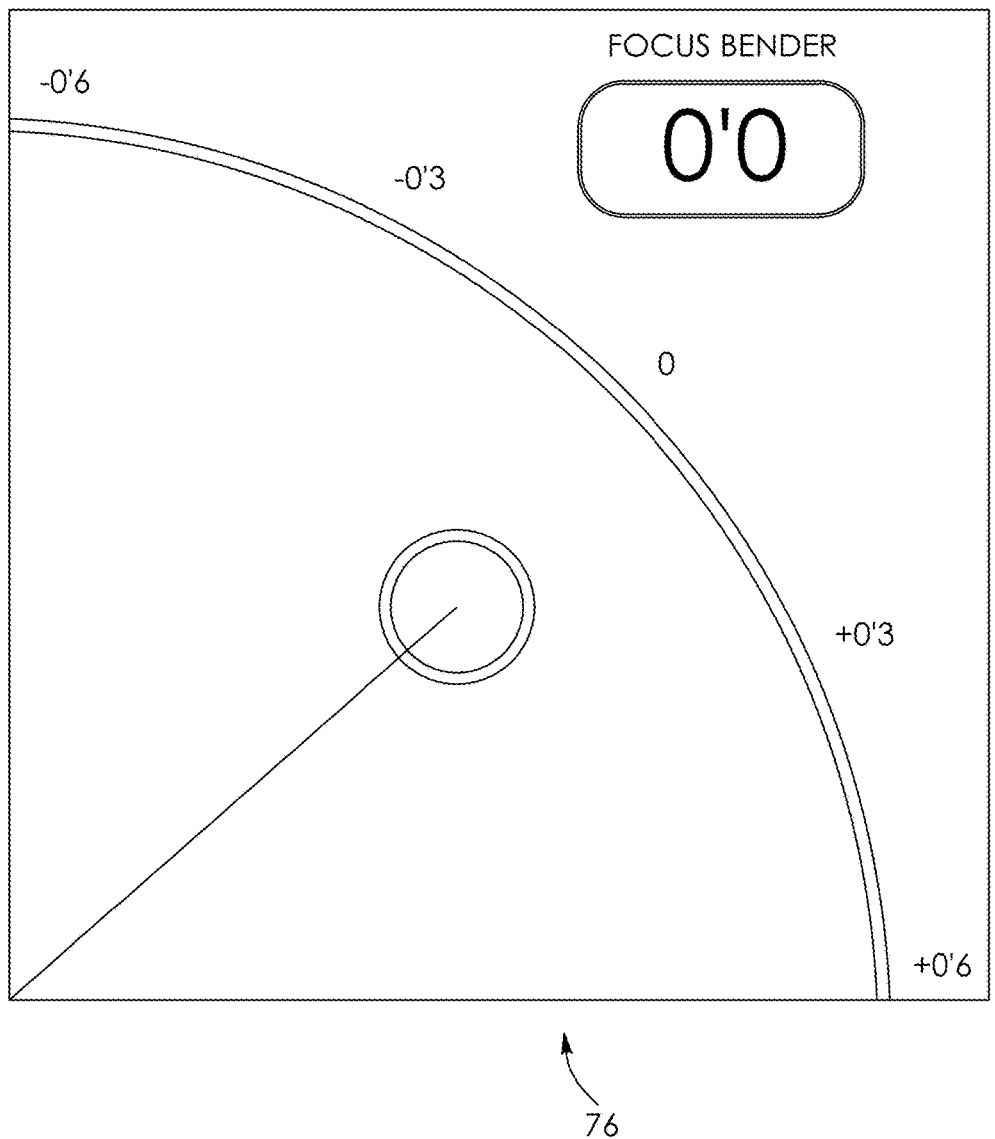
FIG. 13 shows another portion of the home screen shown in FIG. 7, namely showing a corner dial control interface.

FIG. 13 shows another portion of the home screen 66 of FIG. 7, namely exemplifying a corner dial control interface 76. In this embodiment, the dial is used to fine adjust the focus distance of a lens.

Figure 14:
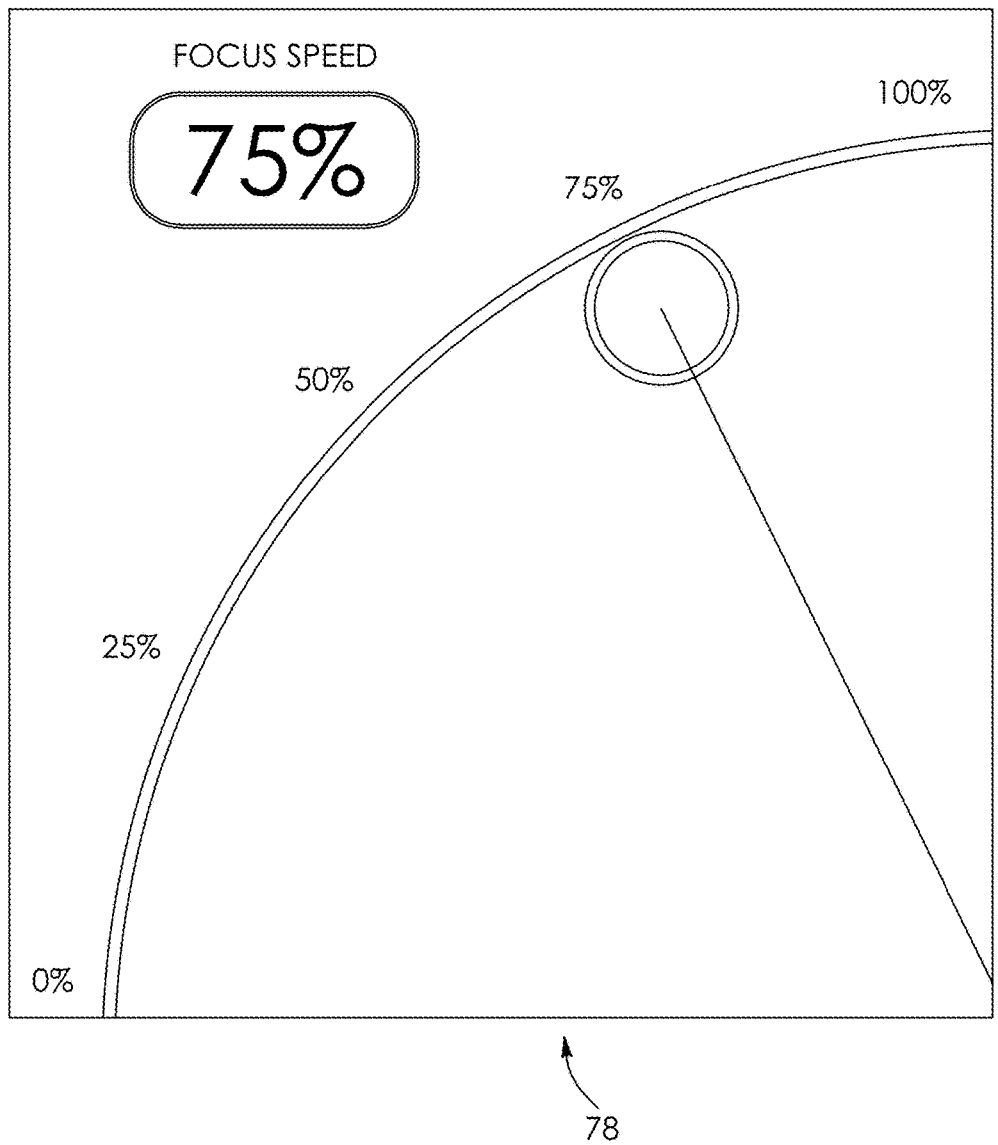
FIG. 14 shows yet another portion of the home screen shown in FIG. 7, namely showing another corner dial control interface.

FIG. 14 shows yet another portion of the home screen 66 of FIG. 7, namely exemplifying another corner dial control interface 78. In this embodiment, the dial is used to control the speed at which the lens pulls focus from one node to another.

Figure 15:
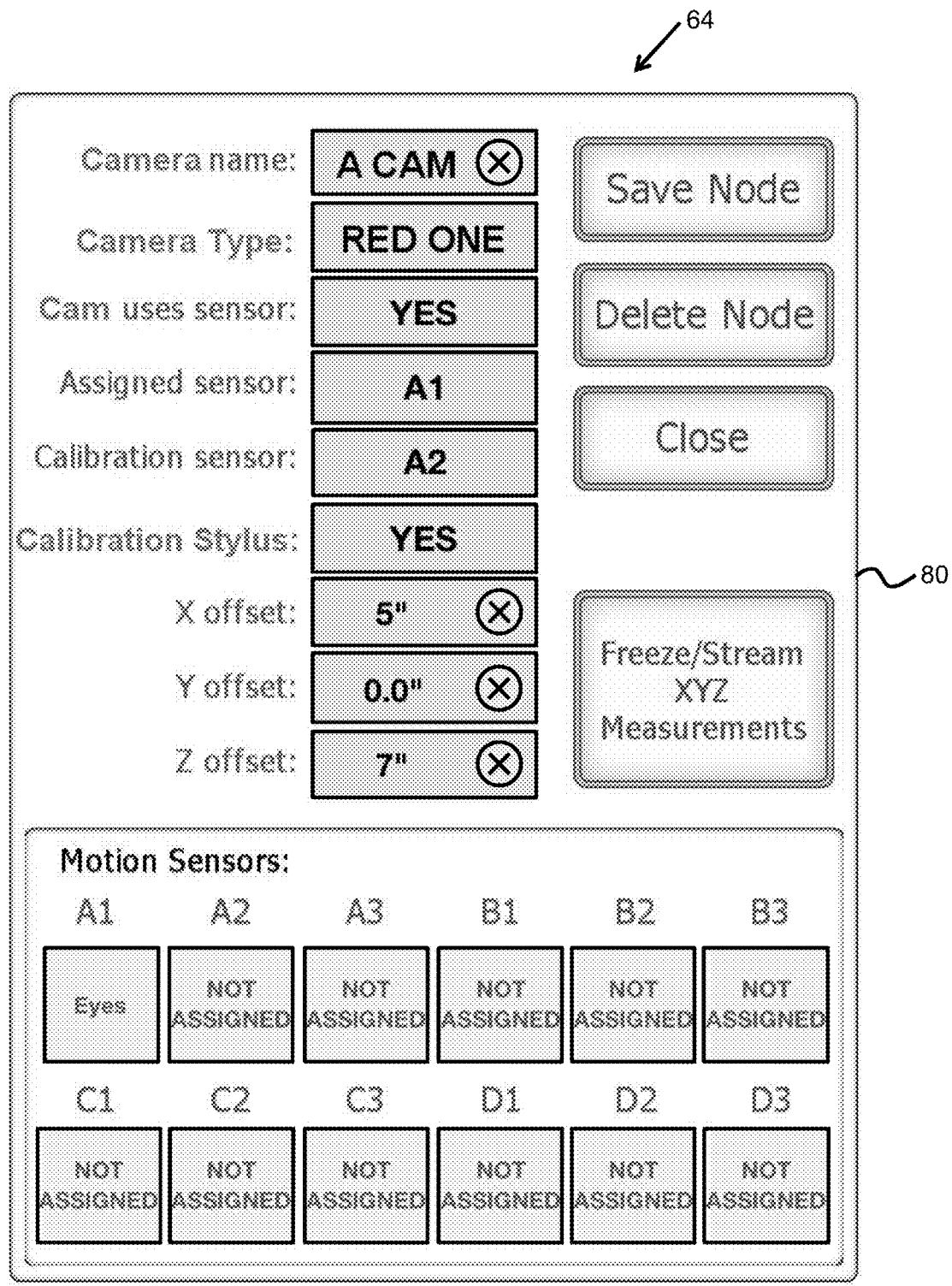
FIG. 15 shows a display screen, according to an embodiment, to be displayed on the user device of the system shown in FIG. 1A, for defining a camera to be controlled.

FIG. 15 shows a window 80 of the GUI 64 for defining a camera.

Figure 16:
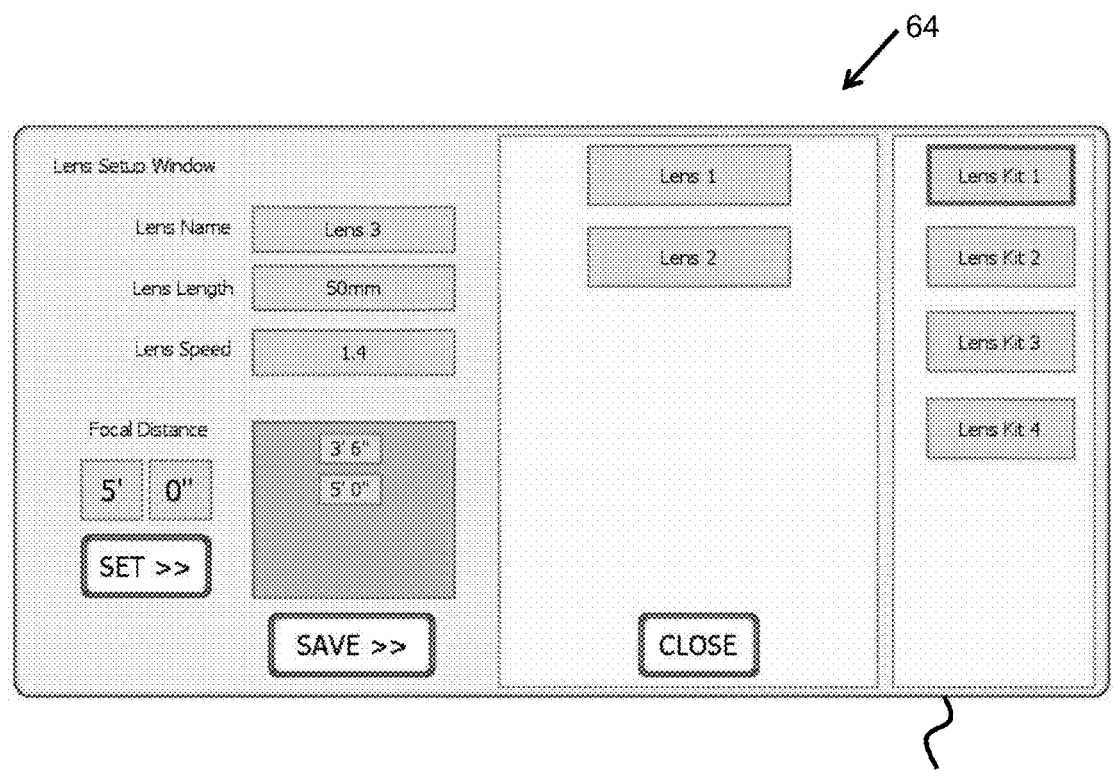
FIG. 16 shows another display screen, according to an embodiment, to be displayed on the user device of the system shown in FIG. 1A, for calibrating lenses of a camera to be controlled.

FIG. 16 shows a window 82 of the GUI 64 for calibrating lenses and selecting which lens is on the camera.

Figure 17:
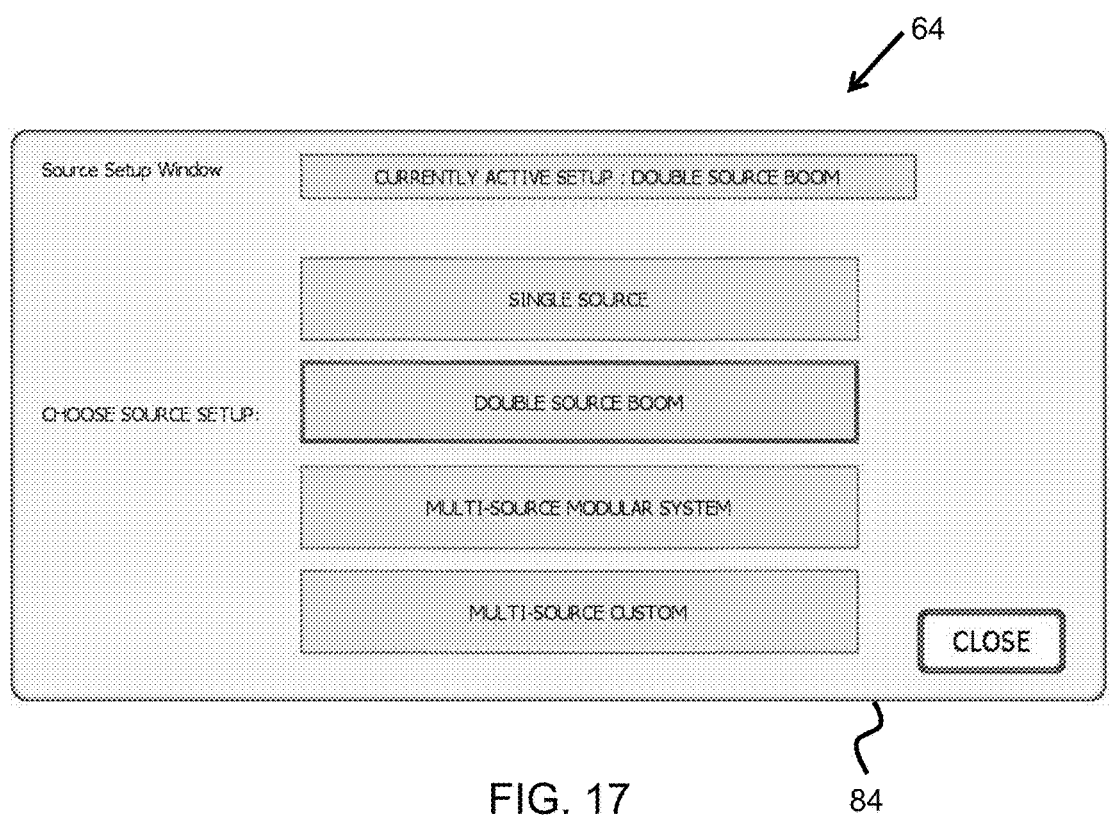
FIG. 17 shows another display screen, according to an embodiment, to be displayed on the user device of the system shown in FIG. 1A, for selecting a configuration of the sensor device.

FIG. 17 shows a window 84 of the GUI 64 for selecting a set-up of the motion tracking system.

Figure 18:
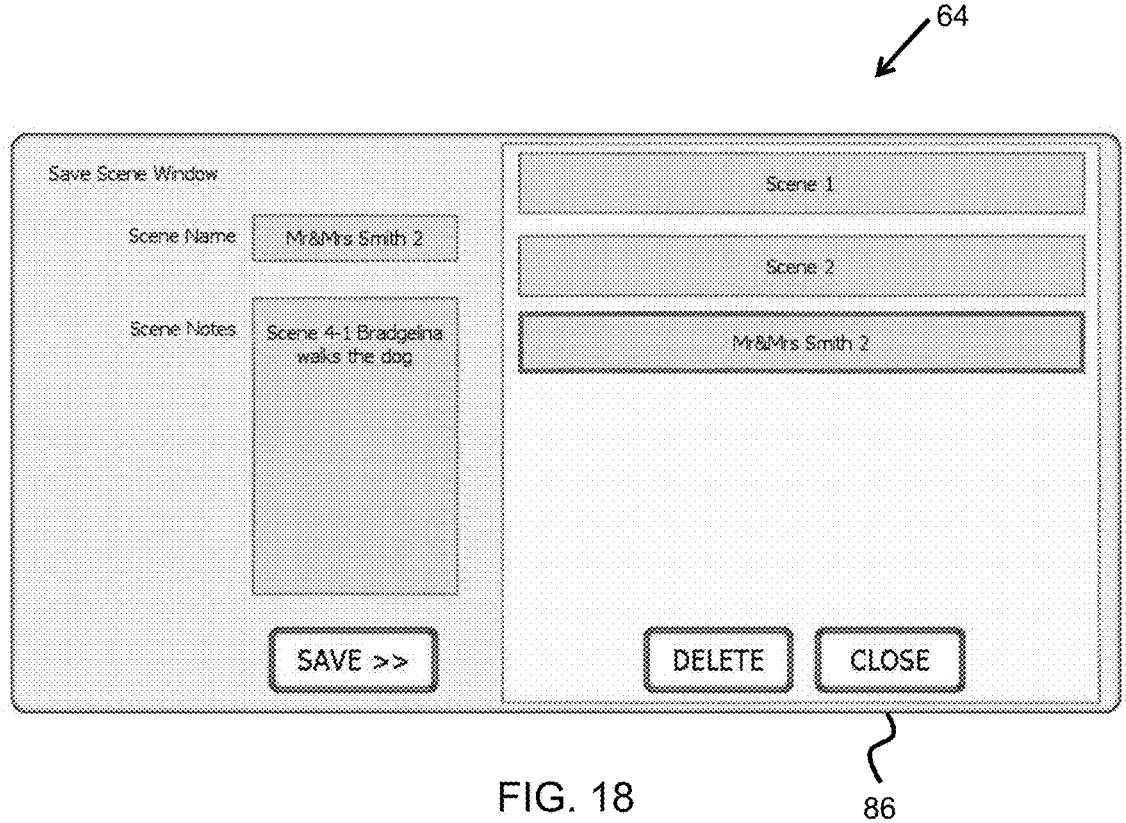
FIG. 18 shows another display screen, according to an embodiment, to be displayed on the user device of the system shown in FIG. 1A, for recording in memory the configuration of the node array and of the sequencer.

FIG. 18 shows a window 86 of the GUI 64 for saving in memory a current state of the application, including the node array 70 and the sequencer 74.

Figure 19:
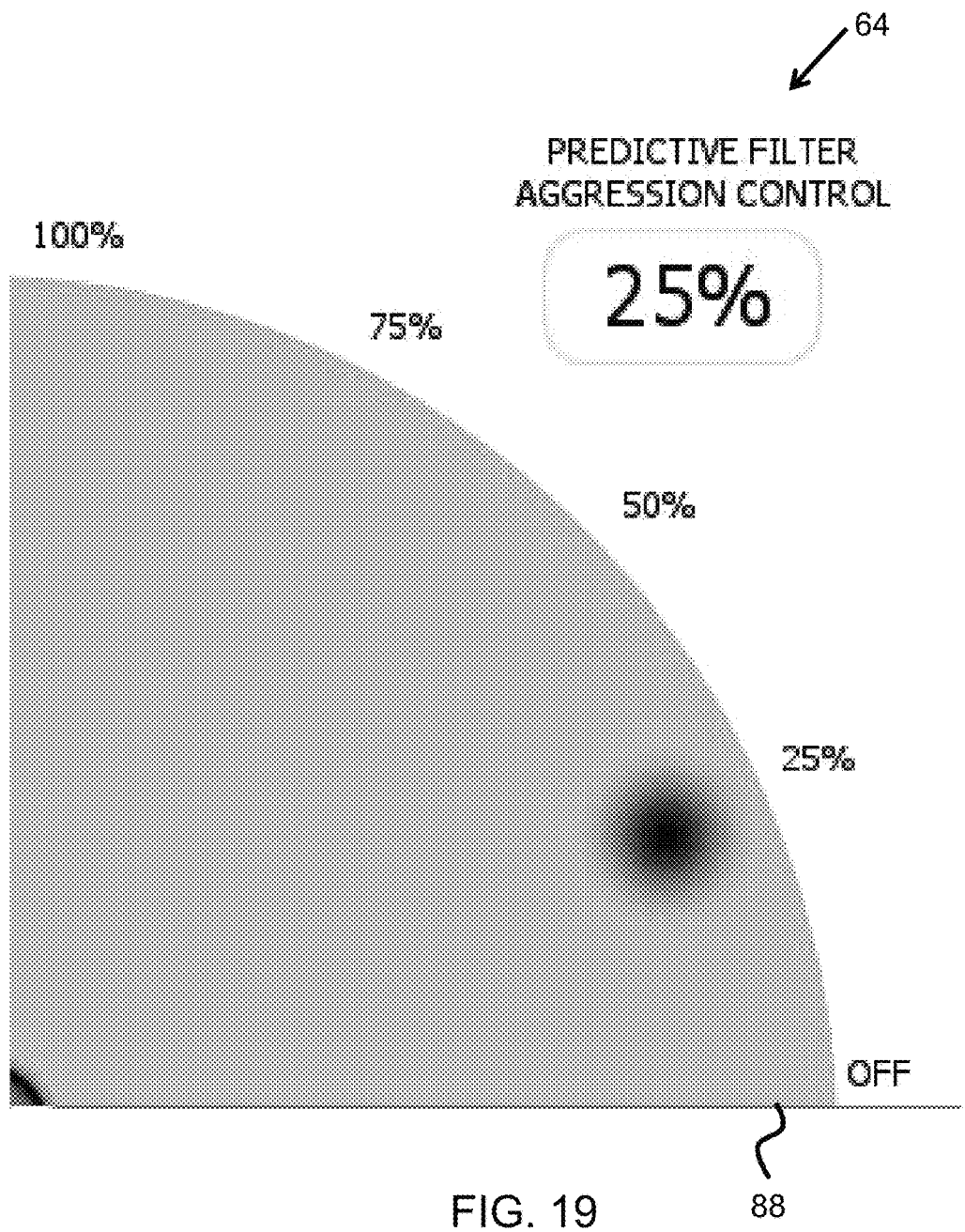
FIG. 19 shows a portion of a display screen, according to an embodiment, to be displayed on the user device of the system shown in FIG. 1A, including a corner controller for adjusting an amount of latency/lag compensation to be applied to the node data.

FIG. 19 shows a portion of a GUI window 64, including a corner controller 88 that allows a user to adjust the amount of latency/lag compensation the system applies to the node data.

Figure 20:
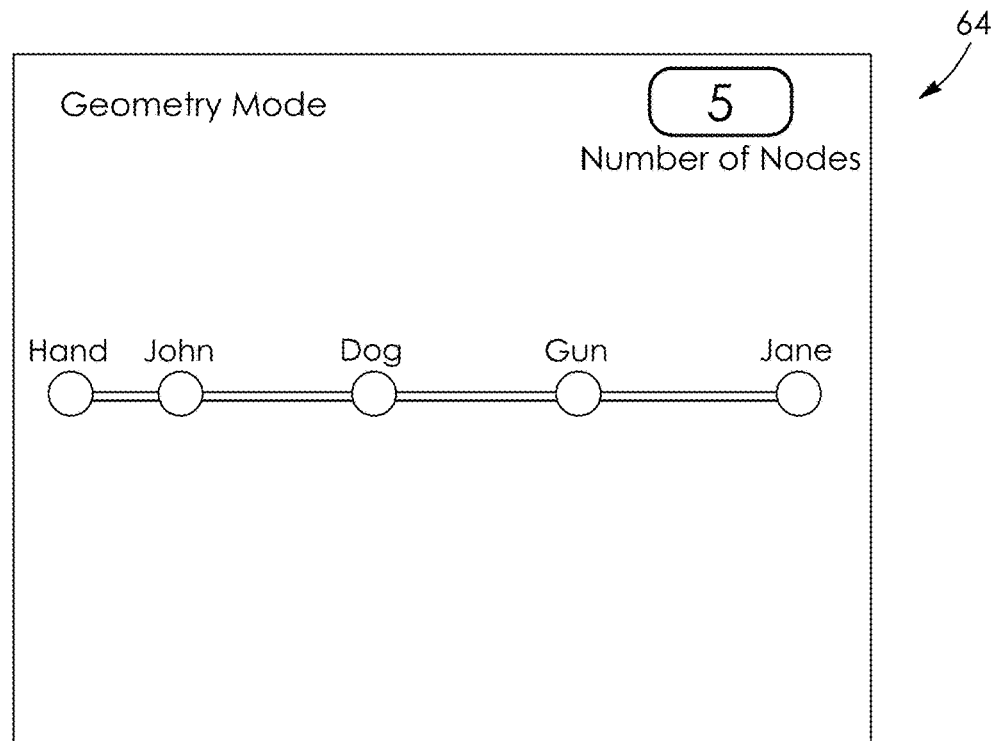
FIG. 20 shows an alternate control display screen, according to an embodiment, to be displayed on the user device of the system shown in FIG. 1A, comprising an interactive graphical representation related to a linear sequencer function.

FIG. 20 shows an alternate control window 90 to GUI 64 ("Full Function Geometry Linear") which allows for interactive graphical representation of the sequencer function. User may pull focus (or make other automatic adjustments) simply by sliding finger from one point (each point representing a node) to the next. The speed at which the user moves finger from one point to another controls the speed of the focus (or other) adjustment to be made.

Figure 21:
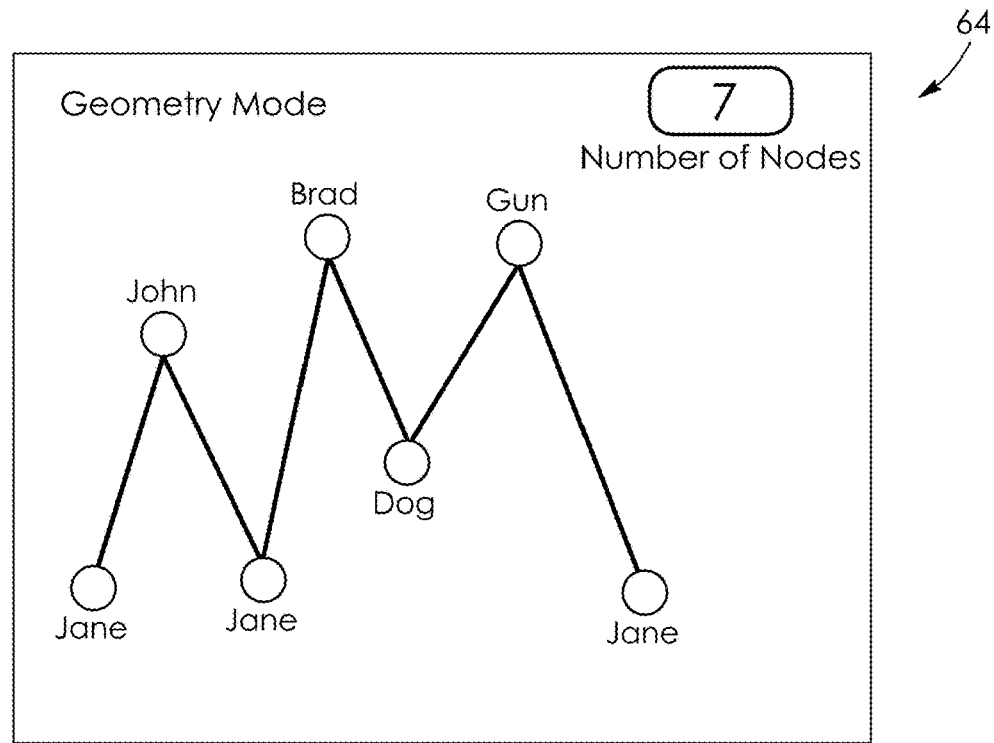
FIG. 21 shows an alternate control display screen, according to an embodiment, to be displayed on the user device of the system shown in FIG. 1A, comprising an interactive graphical representation related to a custom sequencer function.

FIG. 21 shows an alternate control window 92 to GUI 64 ("Full Function Geometry Custom") which allows for interactive graphical representation of the sequencer function. User may determine exact number and position of points on the screen (each point representing a node) and then pull focus (or make other automatic adjustments) simply by sliding finger from one node to the next. The speed at which the user moves finger from one point to another controls the speed of the focus (or other) adjustment to be made.

Figure 22:
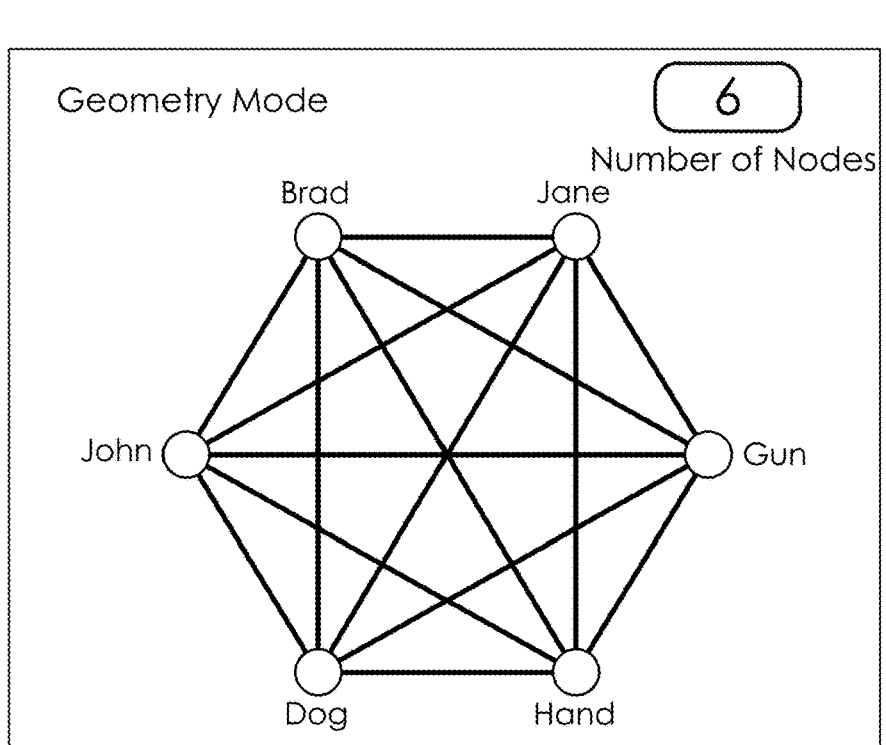
FIG. 22 shows an alternate control display screen, according to an embodiment, to be displayed on the user device of the system shown in FIG. 1A, comprising an interactive graphical representation related to a free sequencing function.

FIG. 22 shows an alternate control window 94 to GUI 64 ("Full Function Geometry 6 Node") which allows for interactive adjustments between any 6 points, each point representing a node. The advantage of this configuration is that no pre-determined sequence is required. The speed at which the user moves finger from one point to another controls the speed of the focus (or other) adjustment to be made.

Figure 23:
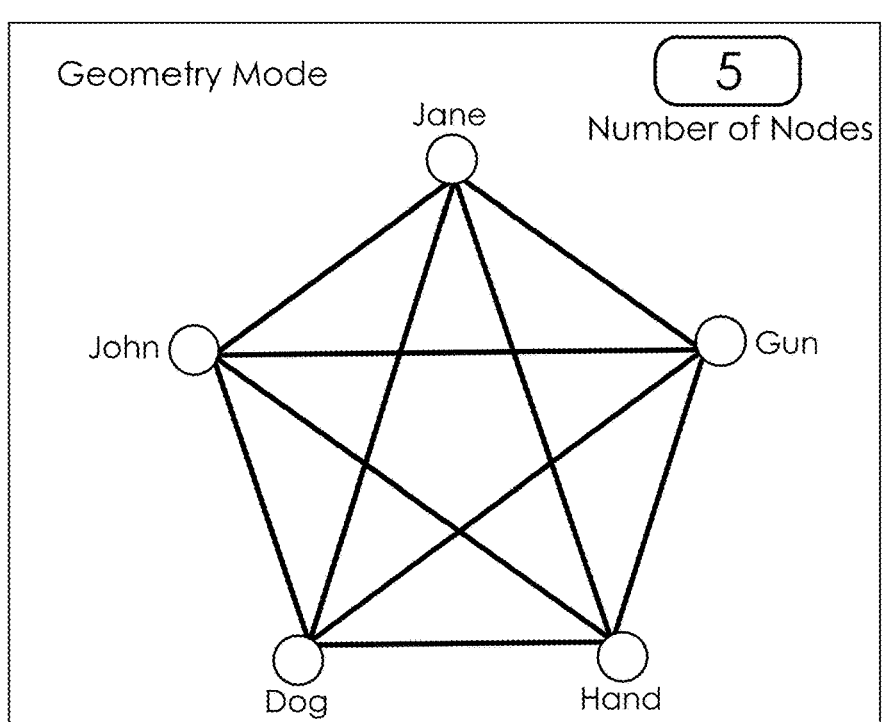
FIG. 23 shows another control display screen, according to an embodiment, to be displayed on the user device of the system shown in FIG. 1A, comprising an interactive graphical representation related to a free sequencing function.

FIG. 23 shows an alternate control window 96 to GUI 64 ("Full Function Geometry 5 Node") which allows for interactive adjustments between any 5 points, each point representing a node. The advantage of this configuration is that no pre-determined sequence is required. The speed at which the user moves finger from one point to another controls the speed of the focus (or other) adjustment to be made.

Figure 24:
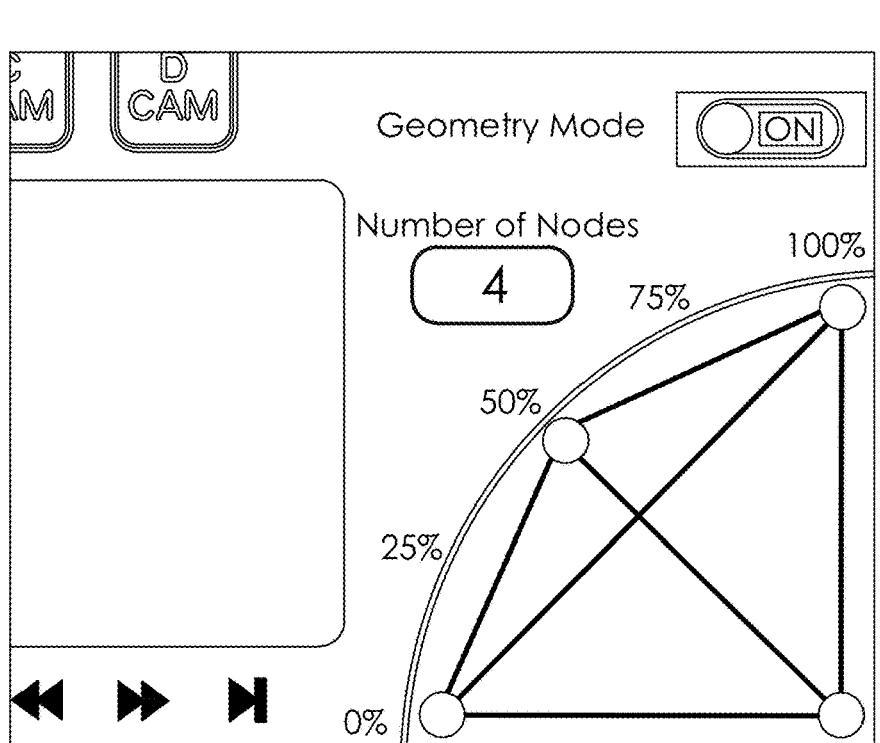
FIG. 24 shows a portion of a home screen, according to an embodiment, to be displayed on a graphical user interface (GUI) of a user device in the system shown in FIG. 1A, namely a 4-node Geometry controller feature.

FIG. 24 shows a detail 98 ("Corner Geometry 4 Nodes") of the corner controller 88 of FIG. 19, in the main control window on GUI 64 which has multiple functions. This function shows how it can be used as an easily controlled graphical representation when four nodes are used. It allows interactive adjustment between four points. The advantage of this configuration is that no pre-determined sequence is required and it is easily operated by the right (or left) thumb in the main GUI 64 window. The speed at which the user moves finger from one point to another controls the speed of the focus (or other) adjustment to be made.

Figure 25:
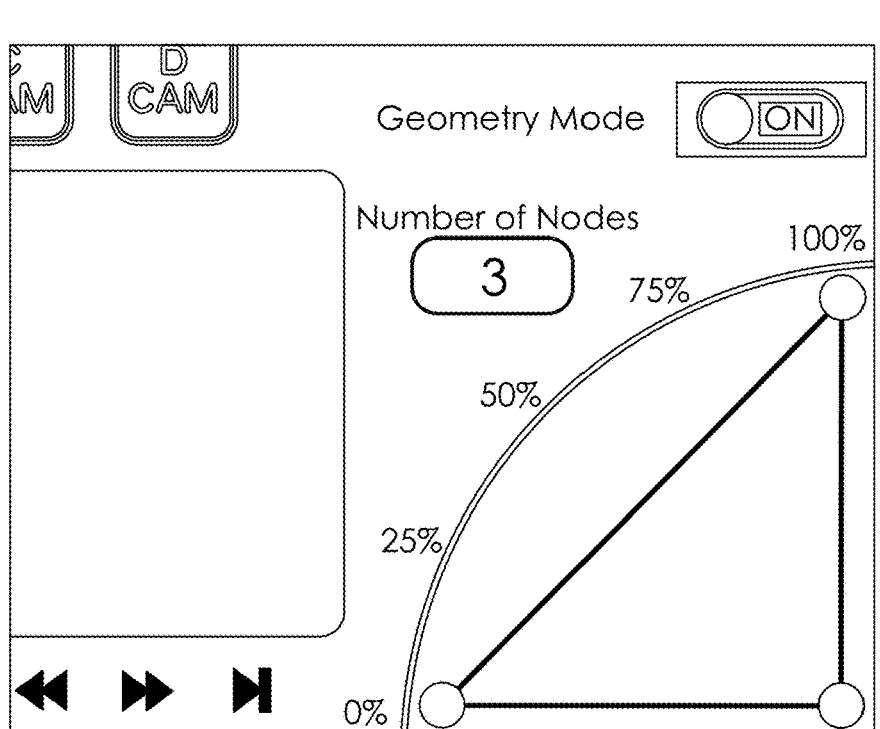
FIG. 25 shows a portion of a home screen, according to an embodiment, to be displayed on a graphical user interface (GUI) of a user device in the system shown in FIG. 1A, namely a 3-node Geometry controller feature.
Figure 26:
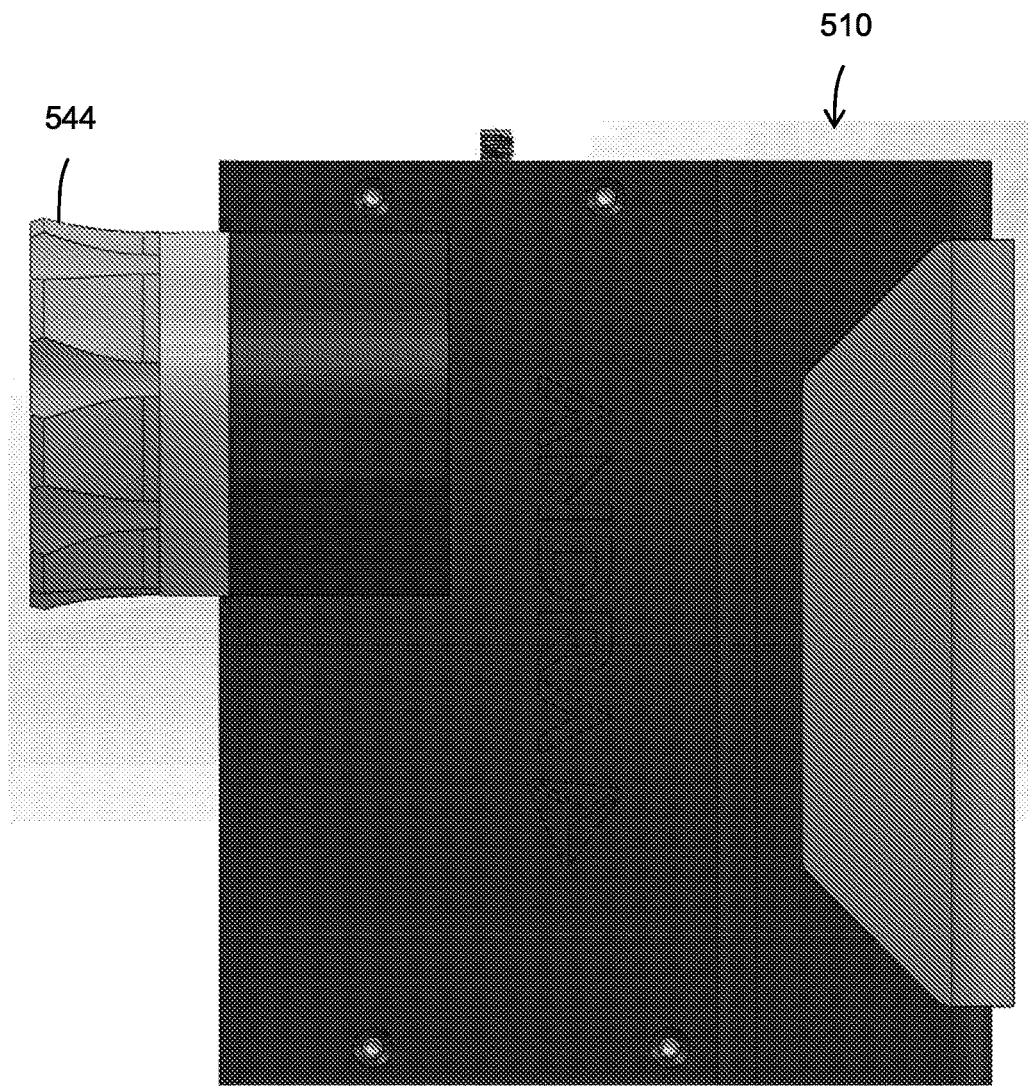
FIG. 26 to 34 represent different views of an adjustment device for a camera system, according to a particular embodiment.
Figure 27:
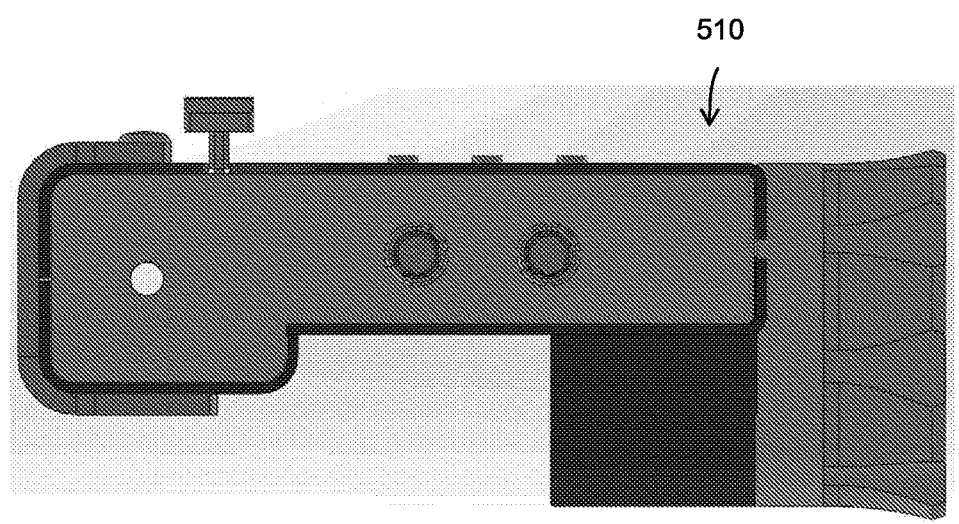
Figure 28:
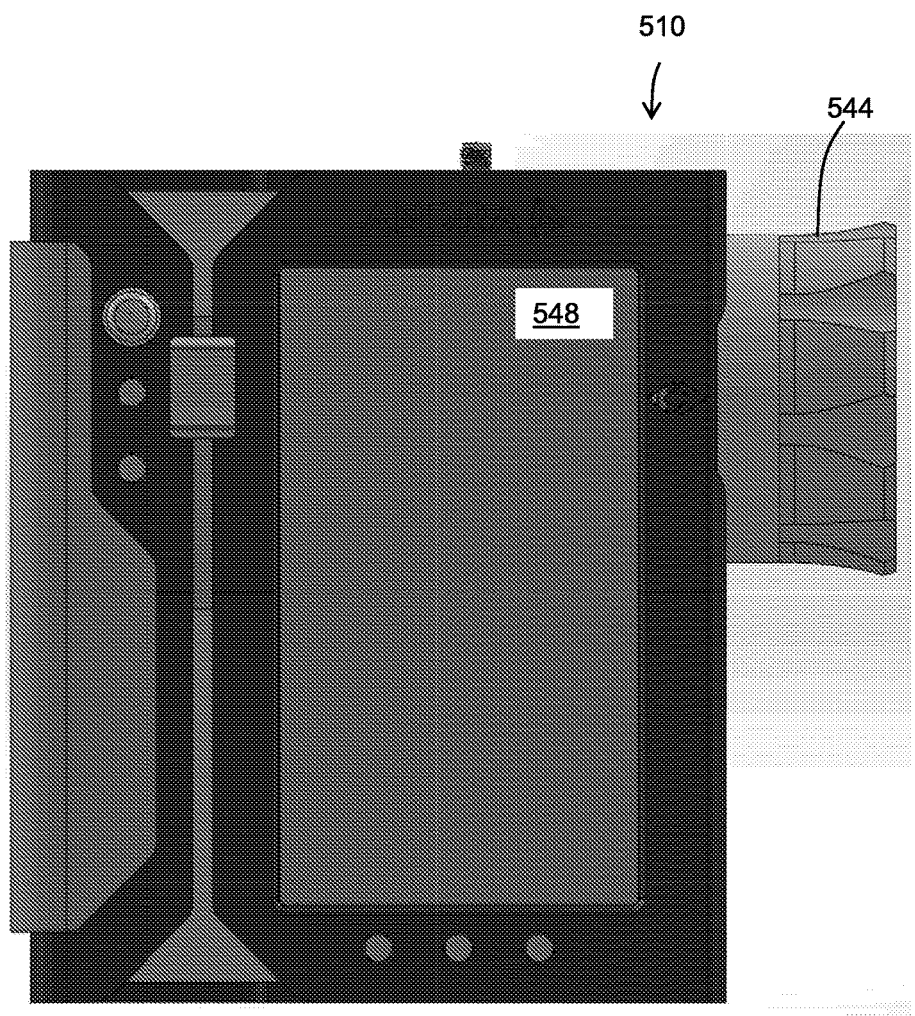
Figure 29:
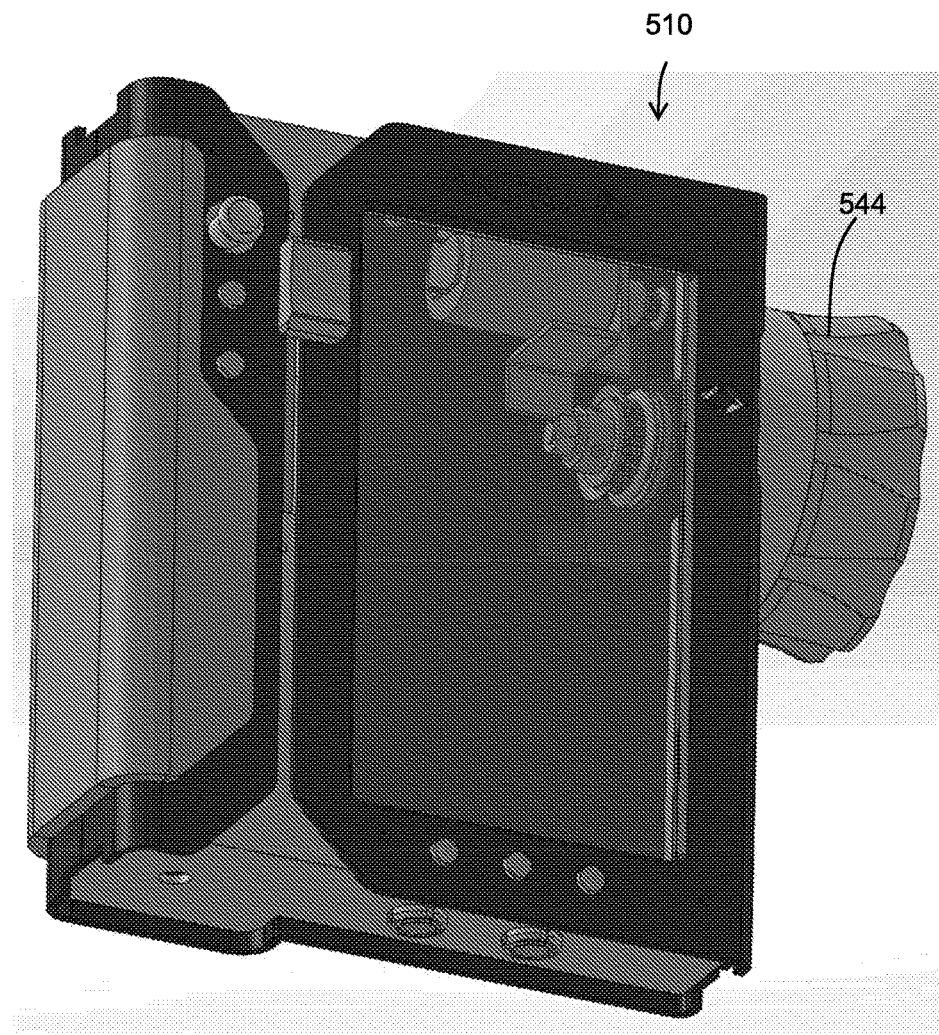
Figure 30:
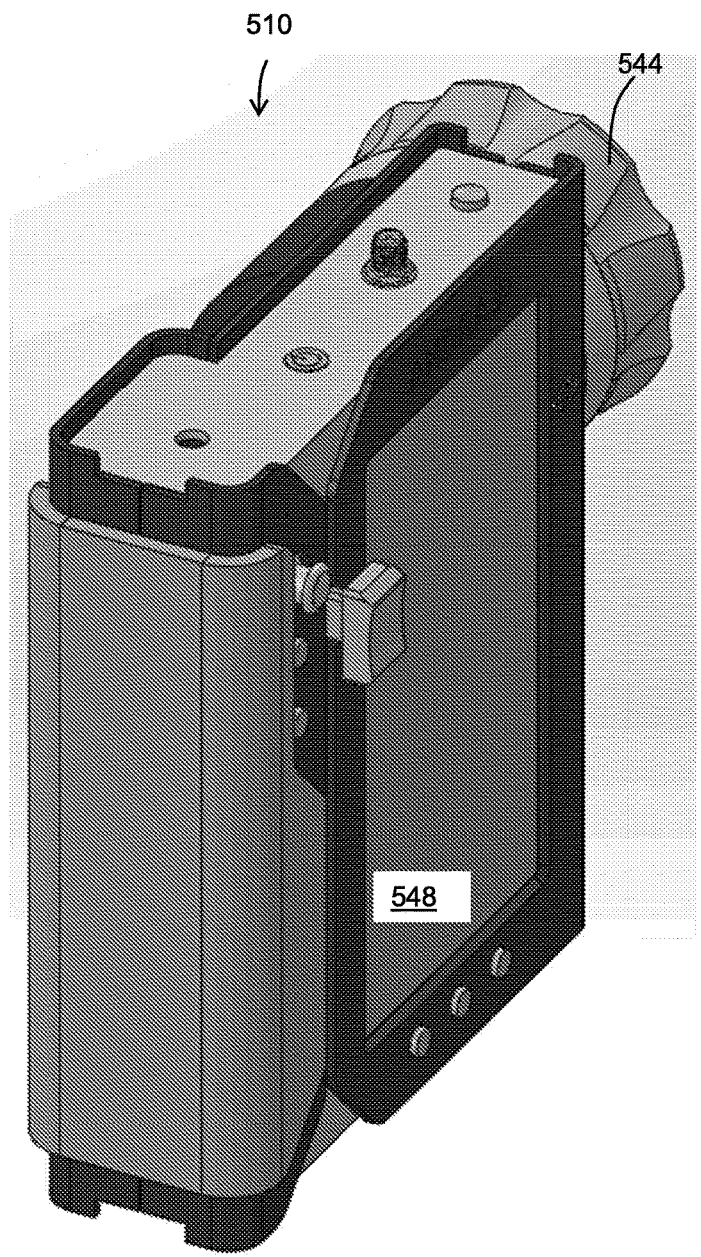
Figure 31:
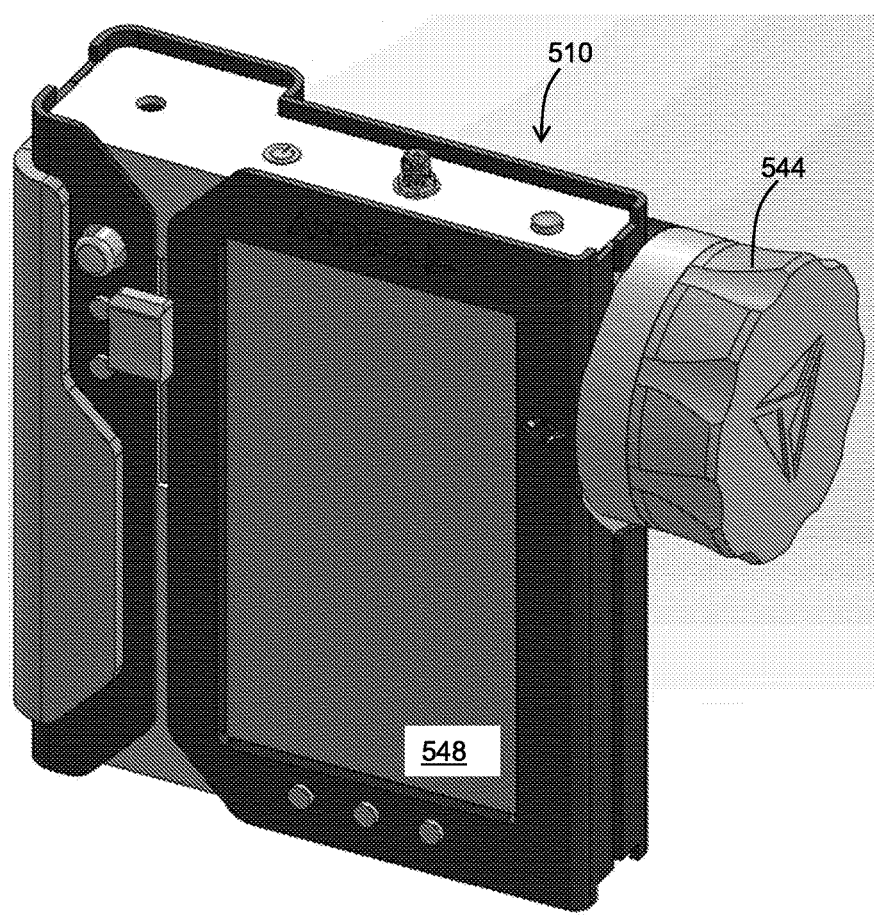
Figure 32:
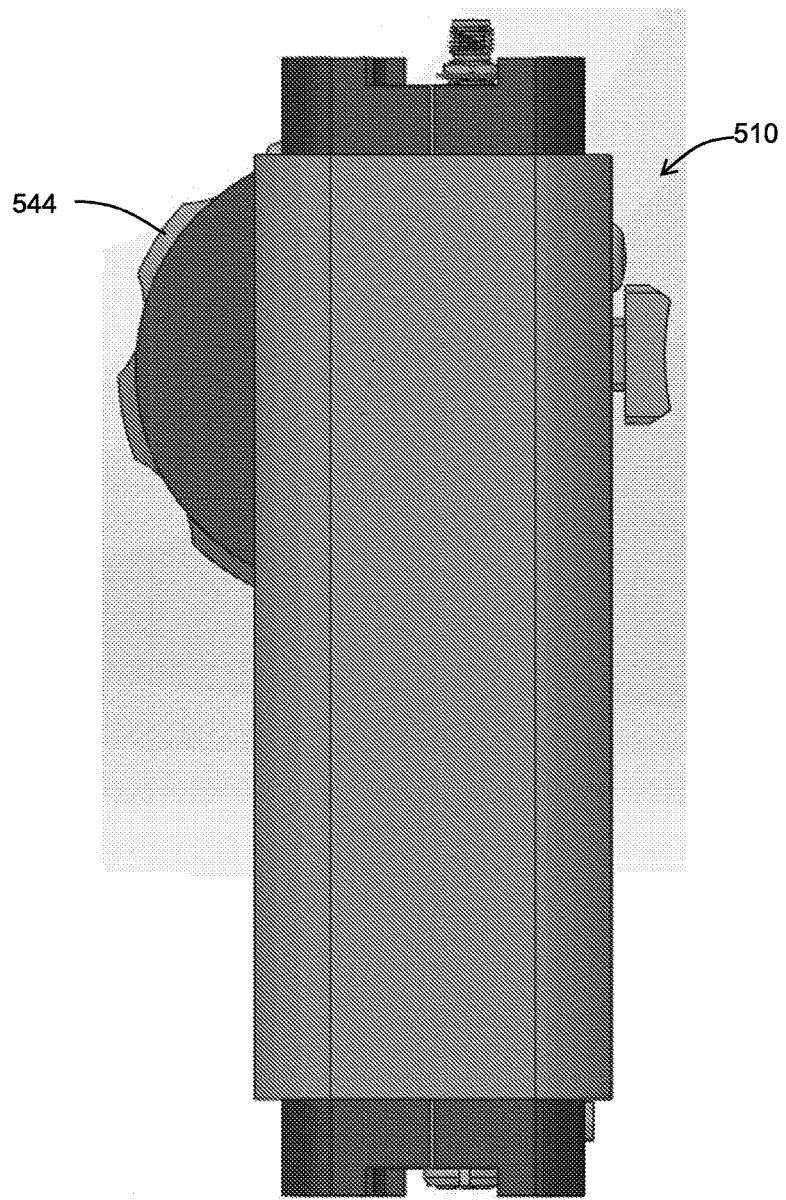
Figure 33:
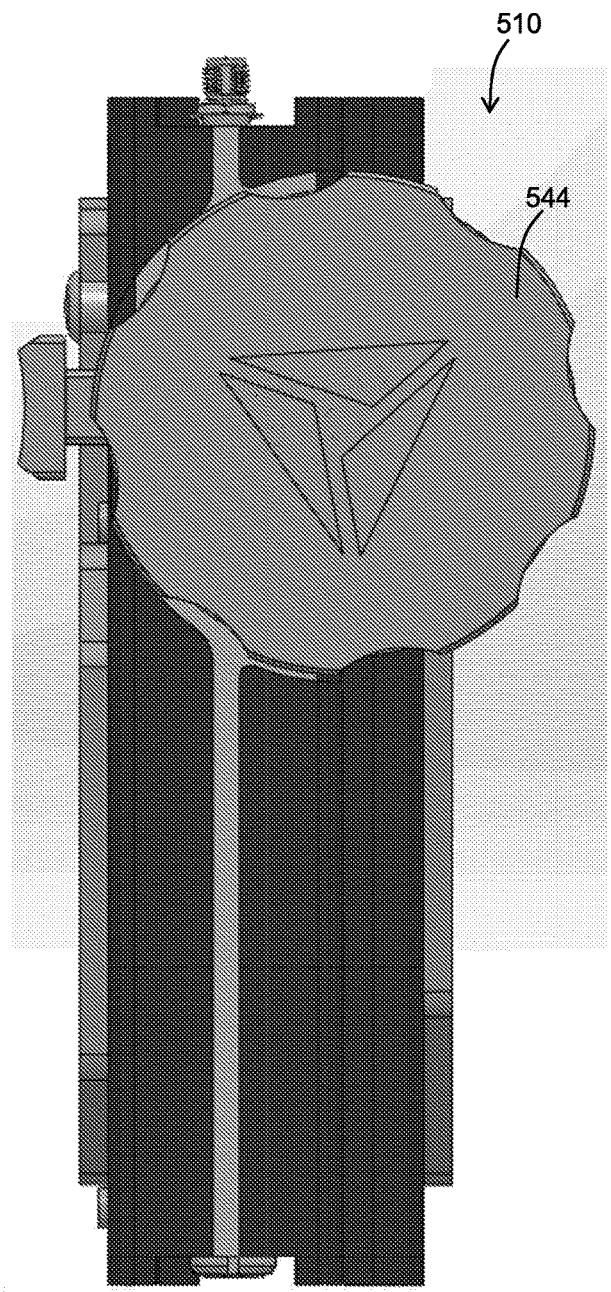
Figure 34:
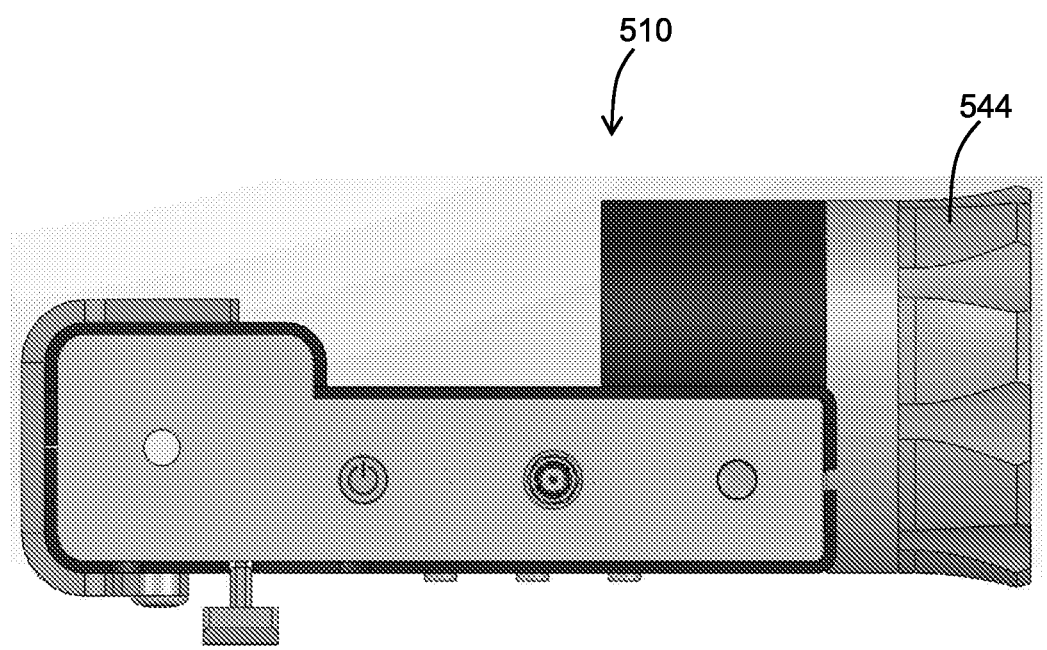
Figure 35:
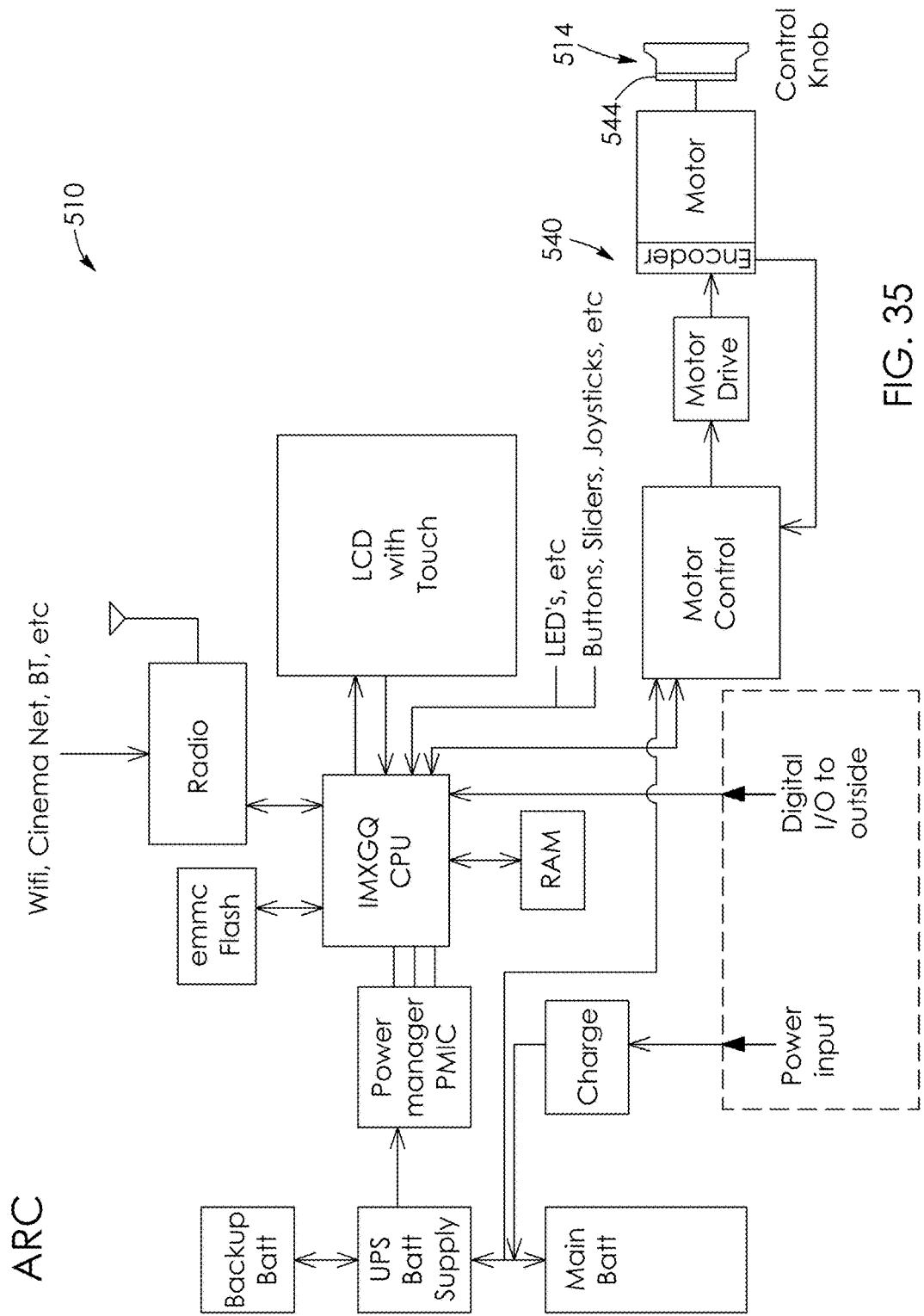
FIG. 35 is a block diagram showing components of the adjustment device of FIG. 26 to 34.

FIG. 25 shows a detail 100 ("Corner Geometry 3 Nodes") of the corner controller 88 in the main control window on GUI 64 which has multiple functions. This function shows how it can be used as an easily controlled graphical representation when three nodes are used. It allows interactive adjustment between three points. The advantage of this configuration is that no pre-determined sequence is required and it is easily operated by the right (or left) thumb in the main GUI 64 window. The speed at which the user moves finger from one point to another controls the speed of the focus (or other) adjustment to be made.

The following list provides additional features, components, uses, etc. in accordance with embodiments of the present invention:

- data streams and features of this system lend themselves for use in post production. All data and video feeds can be stored and immediately replayed (e.g. for each 'take' on a film set) and/or stored for post production (e.g. used for CGI). This includes camera movements/orientations, node movements/orientations, and equipment control.
- data streams and features of this system lend themselves for use in virtual and augmented reality environments. All data and video feeds can be transmitted, stored, and immediately replayed.
- data streams and features of this system lend themselves to interoperation of various hardware. For example, aperture and light dimming can be linked to each other and preprogrammed so that as the aperture is adjusted to change the depth of field, the lighting can be automatically simultaneously dimmed or brightened so the audience experiences changing depth of field without experiencing a change in lighting. Such interoperability pertains to all equipment without limitation.
- the system design, according to embodiments, lends itself to interoperation of multiple operator interface devices (e.g. iPads, iPhone, Ipod touches) running the app and controlling all equipment types. Along with this interoperability, each interface devices can send and receive data with one another. For example, if a operator taps a node to focus his or her camera on one object, that focus decision can be immediately indicated on the device of another focus puller controlling another camera, and also on the devices of various other crew members including the director and producer.
- the system design, according to embodiments, lends itself to extremely flexible multicam functionality. In the example of focus, one iPad can control multiple cameras, and multiple iPads can control multiple cameras simultaneously. One iPad can control multiple cameras simultaneously by tapping a node, or cameras can be selected individual control. A second copy of the node array can also also temporarily replace the sequencer graphic for control of one or more secondary cameras simultaneously to the permanent node array. The video feed section of the app can be made to switch into split screen (e.g. split screen for 2 cameras, or 4-way split screen for 4 cameras) in order to monitor all focusing activity.
- advanced hardware and software designs focus on minimizing the latency of the system to the order of milliseconds (e.g. interrupts, multiple cores, multithreaded software, etc.).
- due to the low latency and responsiveness of the system, a function can allow the operator to actually slow down the autofocusing responsiveness so as not to look too 'robotic'.
- a mechanical input device (e.g. a digital follow focus dial attached to an iPad) can be linked to any elements of the software's graphical user interface (e.g. sequencer).
- 'malleable' touchscreens that can create the feeling of textures, grooves, etc. via electrical charges on screen surfaces lend themselves to this system. For example, the graphical lines and nodes in the 'Geometric Slider' function could turn into grooves for improved operability including limiting the operator's reliance on look at the touchscreen.
- recording and playback of the built-in video feed display is extremely useful for both focus pullers, directors of photography, directors, etc. For example, a focus puller could easily assess the quality of the focus in the last 'take' or at the end of a 'shot' or the end of the day.
- touching an area of the video feed can select a node for fucusing and/or control other equipment functions, like remote head pointing, lighting, etc.
- a sensor and transmitter can be placed inside free objects. For example, a sensor and transmitter could be placed in a custom basketball in a way that didn't affect the ball's mass or center of mass, in order to focus on the ball during a basketball game).

along with the 'scene saving' function that saves the state of the app, a node manager can allow the operator to save groups of like-nodes (e.g. all the parts of a car can be defined as nodes and reloaded at any time in the future to re-use the same car or to facilitate node creation for a new car).

equipment control events can be triggered (hardware and/or software triggers) based on the coordinate position of a node.

many 'intelligent' uses of node data are possible. For example, an indication can alert the operator when a node is nearing or enters the camera's field of view (frame). In this example, a node could be preprogrammed to automatically snap into focus when it enters the frame.

the motion tracking data stream can be filtered using many mathematical approaches. For example, noise in the data stream can be quantified to determine when the data becomes suspect or unusable. This data can be fed into the 'Manual Overrides and Automatic Handoff' software functions.

Many filters can also be applied to the data stream to control the level of dampening, etc.

when the node sequencer is in 'neutral', the 2 (line), 3 (triangle), or 4 (square) geometry nodes are all set to a green colour. This way when the sequencer is put into 'forward' or 'reverse', the next node will be outside of the 2, 3, or 4 group, and the next logical node in the sequence will become the sole green node.

a software function can allow the operator to quickly correct for slight errors in a node's tip offset by viewing the node through the camera and then manipulating the focus fine adjust function until the node is focused sharply. At this moment, the operator can trigger the system to automatically recalculate the node's tip offset (via quaternion calculations).

pre-recorded motion tracking data (e.g. earthquake movements) can be fed into the system to move camera and equipment in order to mimic the pre-recorded movements. This technique may heighten an audience's 'natural experience' (e.g. earthquake movements, vehicle in rough terrain, etc.).

specific (and difficult) predefined equipment actions can be automated and/or facilitated (e.g. a Hitchcock zoom using a handheld camera, a camera rotating in sync with a trapeze artist, etc.).

effects relating to music content are possible including feedback loops (e.g. focus in and out in time with the beat of a song or camera position/pointing in relation to a beat, including live performance).

the entire system can be 'scriptable' so that any user interactions with software can be recorded and automated.

various accessories can be used for sensor placement on objects. For example, sensors can be placed in straps to put on an actors, or can be snapped into on various mounts for easy placement/attachment.

the source setup function can include a 3D modular source building function for setups that use the modular pole-connected source system accessory. In this function the operator can quickly build a 3D representation of the modular setup they have manually constructed. The software can then instantly calculate the position and orientation of all sources, since the lengths of the poles and angles of the sources are predefined by way of the physical design of the modular source system accessory.

for the modular source system, connecting poles can be taken away after setup without moving the sources. This allows for quick, non-tethered source placement without the need to measure source position or orientation, as these are calculated in the iPad app's 3D modular source building function.

along with servo motor control of lens rings, the internal electronics of certain camera lenses can be accessed to directly control focus, aperture, zoom, removing the servo motor requirement.

the system software allows for complete control of the configuration of the motion tracking system.

an accessory is a sensor calibration 'body cap' tool that would fit onto the lens mount of cameras for a precise measurement. This would allow for very precise measurement of the focal plane centre which is important for visual effects work because it makes the camera data "nodal".

Embodiments of the present invention are advantageous in that using a real-time stream of three-dimensional position and orientation data to adjust lens functions, composition, camera positioning, lighting, and sound greatly facilitates and expands on the functionalities available to film makers and moving and/or still image content creators.

The use of nodes in the context of cinematic control, in accordance with embodiments of the present invention, present numerous advantages including:

1) The node system allows for predefining multiple moving nodes (virtually all other camera/focus systems don't, but Pictorvision Eclipse does use GPS for a coarser application http://www.pictorvision.com/aerial-products/eclipse/).

2) The node system allows for true auto-tracking of multiple moving nodes (possibly all other camera/focus systems don't; some make an attempt by having a human do the tracking; Pictorvision Eclipse may have only one moving node; an example a "true auto-tracker" for lighting might be: http://www.tfwm.com/news-0310precision).

3) The node system provides three-dimensional positional data (as opposed to distance which is far less useful, unlike almost all other systems).

4) A property of the nodes used is position and orientation, allowing to define points on subjects/objects instead of general 'areas' (unlike possibly all other camera/focus systems; without this, other systems cannot apply offsets to define a node anywhere on an object, e.g. focusing on eyes).

5) Position and orientation allow for tying control to subject/object angles e.g. switch from an actor's right eye to their left eye when their head is at a certain angle to camera (no other system can do this).

6) The node system provides extremely high accuracy (less than 1 cm in many situations) unlike possibly all other auto-tracking systems (thanks to orientation and offsets providing an increased level of control/focus).

7) The node system further provides extremely high frequency (120 Hz) unlike possibly all other auto-tracking systems (e.g. gps systems, active face detection likely don't have this).

8) The node system further provides is low latency (10 ms). This level of latency doesn't inhibit 'cinematic' control for most situations (again, many systems lack this).

9) The node system provides predictive/corrective functions, considerably reducing latency.

10) The node system requires no 'line of sight' requirement, i.e. the nodes use sensors placed on the actor/object so a laser or sound wave doesn't have to bounce off the actor. Facial recognition also requires line of sight obviously. Another benefit of sensors in this regards is constant node data. For example, if an actor jumps out from behind a bush, he/she is already 'instantly' in focus as opposed to line of sight systems that have to react to the new presence of the actor.

11) The node system continues to function in a moving environment. For example, if a source is mounted to a handheld camera system (or is used with the source boom pole accessory), the system continues to function in the vicinity of the camera operator no matter where he/she walks. Similarly, the system works in a moving vehicle, for example on a moving train.

12) Moreover, the node system is a portable system.

Adjustment Device for Combined Automated and Manual Control

Figure 36:
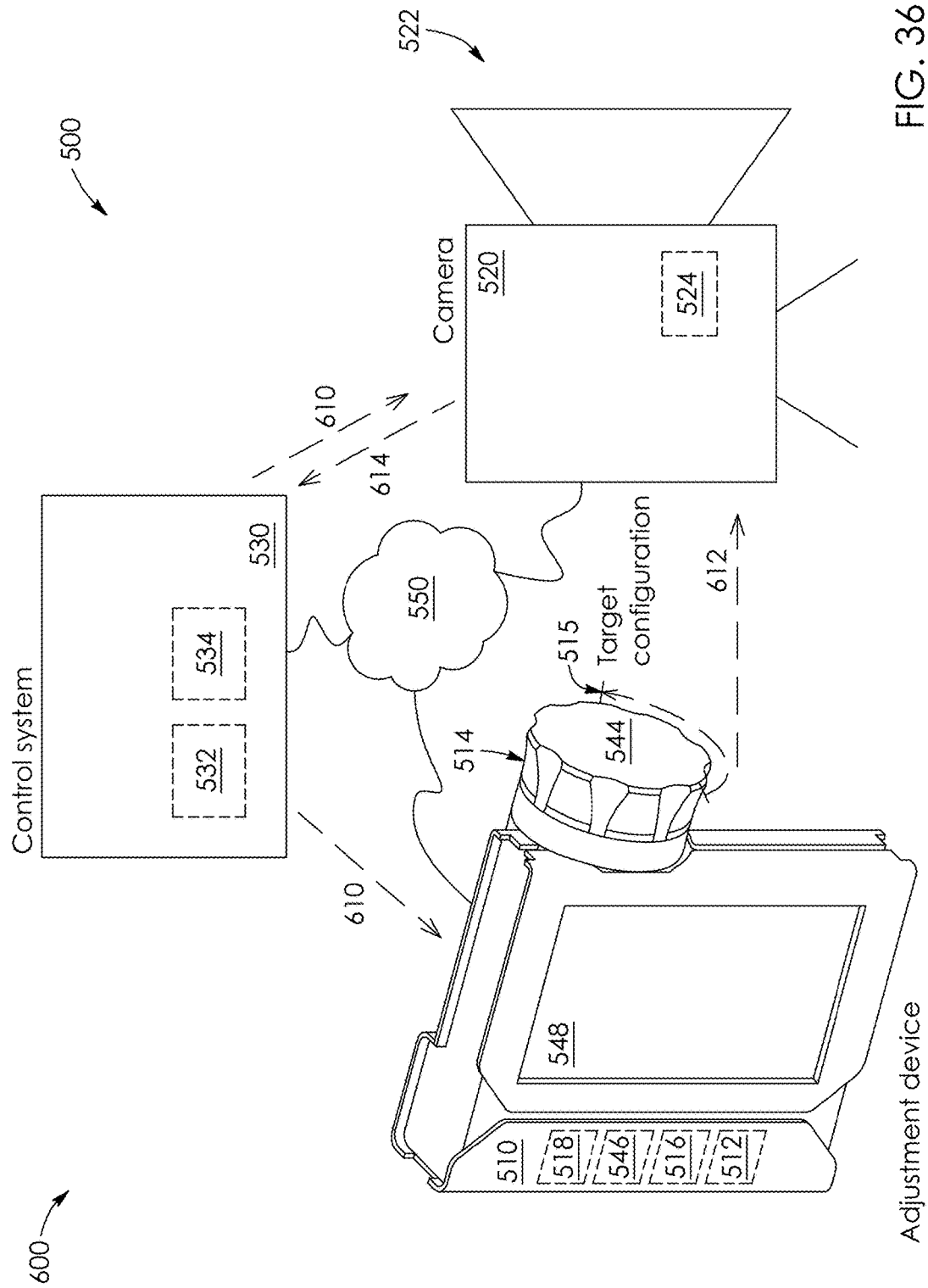
FIG. 36 is a schematic diagram of a camera system within which the adjustment device of FIGS. 26 to 34 can operate.

According to an embodiment, with reference to FIG. 26 to 35, with further reference to FIG. 36, there is provided a device which allows a user to interact with a fully automated focus pulling system without losing any manual control, tactile feedback or "learned" operation.

This device uses a motorized focus dial 544 on a remote focus device 510, such that when the dial 544 is turned, the lens 522, in a given fixed ratio, will also turn. Conversely, if the lens 522 is turned, by other means, manually, or through motorized control, the dial 544 also turns, by means of a servo 540 (or other motorized control). In this way the dial 544 is alwaysin the same position as the lens 522, whether the lens 522 is adjusted automatically—by some auto focus/Zoom or Iris system 530 or whether the lens 522 is adjusted manually, by user adjustment of the dial 544. In this way hard stops can be preserved, and learned or by feel responses are preserved.

Of equal importance is the ability for the dial 544 to override the automatic direction of the system 530 by physically turning the dial contrary to the impulse of the system. In this way, a user can simply adjust focus manually, by holding onto the dial 544 and turning it to a desired focal point, or allow the system 540 to adjust focus automatically, by simply releasing the dial 544, (or maintain a grip but not apply pressure) and allowing automatic focus/Iris or Zoom to occur.

The remote HMI (Human Machine Interface) Control system 510 is a wireless hand held control system, incorporating a full embedded micro computer system 516, with integrated touch screen 548.

It's most unique features are its ability to run the HMI interface app within the unit itself, and the unique use of mechanical feedback 518 in the focus control knob 544. These features are unique to the requirements of the automated focus control design, as the auto focus functions have a lot more variables and settings to deal with, such as selecting the appropriate node to focus on, and system setup, such as the programming of nodes.

The focus control knob is normally a mechanical positioning input. As this device has the ability to auto focus, adding mechanical feedback to the focus knob, will give the user a new found ability to control and manipulate focus as the user desires. Some typical applications would be as the system is automatically controlling focus, the user could apply some pressure with a finger/thumb to slow the knob and hence the rate of focus, thus giving a slower visual effect or more natural/organic visual effect as a result of the focus pull.

The mechanical feedback may be incorporated by an electric motor driving the knob directly, or through a reduction mechanism such as a gear box or belt drive. Through software, the travel distance of the knob can be greater or less then the travel distance of the focus lens. This will allow for large ratios for very fine detailed control, or small ratios for quick response, depending on the user's needs.

Using an electric motor will allow us to give the user Haptic feedback, which may be more substantial and practical than rumbles or vibrations, as the electromechanical system can be controlled to allow functions such as virtual detents in the rotation of the knob, giving the user feedback, for example when a preset focal target was hit during a manual focus pull. This detent could also, once hit, increase in strength, for example, to become a complete lock, which in the case of a moving node would allow the user to switch from manual to auto simply by turning the dial to focus on an existing node. The system would then automatically lock onto that node, allowing the user to release their grip on the dial and thus switch to automatic mode.

Other functions may be incorporated so that the knob does not follow the lens, but instead has an auto return function that returns the knob to a set point. Turning the knob away from this set point causes a torque to be applied so that the knob would give feedback to the user. The torque applied could be a flat torque curve, or a curve that increases the further away it gets from the set point. This function would be useful for such functions as allowing the system to be in auto focus mode, and turning the knob forward or backward would pull the system out of focus an proportionate amount to give a natural feel, or visual effect as controlled by the user.

Additionally, the electric motor would allow for the creation of "virtual hard stops" in the rotation angle of the dial itself, for example a user might want a 180 degree rotation for one type of work but then wish to limit the rotation to only 80 degrees for more fine adjustment. This system allows for the mechanical "hard stops" of the device to be completely flexible.

The various input controls, including the knob, can be reconfigured via software to allow alternative functionality such as zoom, aperture/iris, focal speed, etc. At any time, the knob can be set so that it will go in manual override mode for focus control takeover.

An expansion port allows external devices to be attached, such as alternative input controls.

Thus, referring to FIG. 36, the adjustment device 510 is configured for operating with a camera system 500. The camera system 500 comprises a camera 520 having a lens 522 and an actuator 524 for adjusting the lens 522. The camera system 500 further comprises a control system 530 for automatically controlling the actuator 524 of the lens 522. The adjustment device 510 comprises: a communication module 512 for receiving control data from the control system 530; a command component 514 in a slave mode (or automatic mode of operation), wherein the command component is operated toward a target configuration 515 in response to the control data received from the control system 530, said target configuration 515 representing a position of the actuator of the lens 522, the command component 514 being further operable in an override mode when the command component 514 receives a manual operation (i.e. when the command component is operated manually); and a processor 516 for operating the command component 514 based on the control data received in the slave mode, and for generating, based on a configuration of the command component, command data to be sent to the actuator 524 of the lens 522, via the communication module 512, when the command component 510 is operated manually in the override mode.

Thus, the target configuration 515 of the command component 514 corresponds to a configuration or position of the actuator 524 for adjusting the lens of the camera. More particularly, the target configuration 515 corresponds to a target setting of the lens for capturing a target location in a given space, which may be associated with a node of a model of the given space.

In the present embodiment, the command component 514 is driven in the slave mode by the control system 530 to reflect the configuration or position of the actuator 524 of the camera 520. In this default mode (or slave mode, or automatic mode), both the actuator 524 of the camera 520 and the command component 514 of the adjustment device 510 are controlled automatically by the control system 530. However, when the command component 514 is operated manually, then the adjustment device 510 generates the command data which overrides the signal of the control system 530, such that the adjustment device 510 now commands the actuator 524 of the camera 520 (rather than the control system 540 controlling the actuator 524, as is the case during the slave mode). Thus in the override mode, the command component 510 controls the actuator 524.

The actuator 524 of the camera is an actuator for adjusting the focus of the lens 522. Accordingly, the command data represents an adjustment of the focus of the lens. Alternatively or additionally, an actuator may be provided for adjusting an aperture/iris setting or zoom of the camera. Accordingly, the command data may represent an adjustment of the iris setting of the lens, an adjustment of the zoom of the lens and/or the like.

Figure 37:
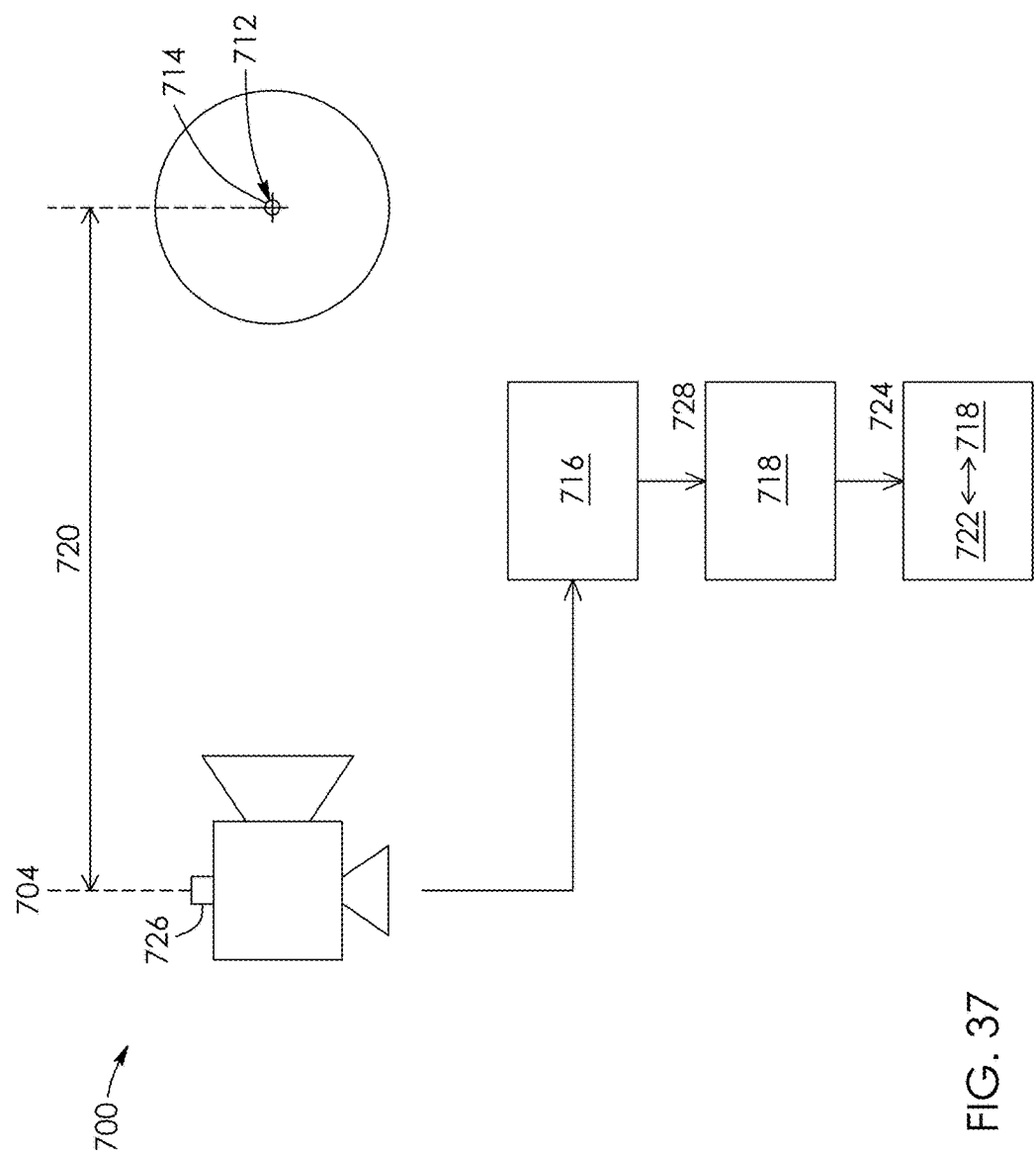
FIG. 37 shows a camera system, according to a particular embodiment, comprising the adjustment device of FIG. 26 to 34.

Referring to FIG. 37, the adjustment device 510 comprises a motor 540 for driving the command component 514, comprises a rotable knob 544 operable manually. The adjustment device 510 may further comprise a reduction mechanism operatively connected to the motor 540 and the command component 514.

The adjustment device 510 may further comprise a user feedback mechanism 518 being operatively connected to the processor 516 and to the command component 514, to provide feedback to a user via the command component 514, when the command component 514 is operated manually in the override mode. The user feedback mechanism 518 may comprises a haptic feedback mechanism. For example, the haptic feedback mechanism may be configured to apply a torque to the command component 514, and more particularly to create a detent during the manual operation of the command component (i.e. during the rotation of the knob 544) by increasing the torque. The adjustment device comprises a memory 546 which stores one or more feedback condition and the processor is configured to activate the user feedback mechanism in the override mode, when the one or more feedback condition is met. For example, a feedback condition may met when the command component is manually operated away from the target configuration 515 communicated in the control data received from the control system.

Alternatively, the haptic feedback mechanism may generate a vibration, a lock in a given direction, a jerking movement, a resistance in the movement of the command component, and/or any other suitable kinesthetic communication via the command component, depending on particular conditions being met. Other examples of user feedback mechanism, may be provided via a user interface component such as a display, a light, a speaker, etc.

The adjustment device 510 according to the illustrated embodiment is in communication with the camera 520 and with the control system 530 over a communication network 550, wirelessly. Alternatively, the adjustment device 510 may be connected to the camera 520 and/or to the control system 530 over a wire connection.

The adjustment device 510 further comprises a user interface component 547 for receiving a command from a user, and/or otherwise interacting with a user. The user interface component 547, which may be a touch screen 548, may comprises the command component, according to an alternative embodiment.

In an alternative embodiment, the control system may be integrated within said adjustment device.

The control system 530 is a computer system which processes information to determine the control data to be output to the camera's actuator. The computer system may be provided by a general purpose computer, tablet, or the like, having a processor 532 and a memory 534. It is to be understood that the computer system 530 may be provided by a plurality of such computer devices being in communication with each other. Typically, the computer system includes software in the form of data and instructions stored in a memory, which is executable by the processor. The software may be located centrally, remotely or distributed, and adapted to service the computer system. The control system may be in communication with one or more other system(s) to obtain and process additional information (for example, data from equipment such as a camera, a sound equipment, a lighting equipment, etc. or data from another information system, for example to receive a model of nodes representing the space subjected to the camera, and input commands in relation to the nodes, etc.).

In accordance with the present embodiment, the control system 530 generates control data based on a location in a given space to be captured by the camera 520, in order to operate the actuator 524 of the lens 522 toward a corresponding position and to operate the command component 514 in an associated target configuration 515. This location may be received from an external source, via a communication module 538 of the control system 530.

Alternatively, this location may be determined taking into account capture information at the camera 520, or the control system may determine a position to key-in on, based on various factors, and signals to operate the camera accordingly (for example to move the direction of the camera).

The position location to be captured corresponds to a node within a model representing the given space to be subjected to the camera for an image capture. The control system is further configured to receive lens setting data representing a position of the actuator of the lens.

In some embodiments, the adjustment device may be integrated with the camera. Additionally or alternatively, the control system may be integrated with the camera.

In operation, the adjustment device 510 is operated by a method 600 for adjusting a camera 520, the camera 520 having a lens 522 and an actuator 524 for adjusting the lens 522, the camera 520 being in communication with a control system 530 for automatically controlling the actuator 524 of the lens 522. The method comprises: (a) receiving at a command component 514 of the adjustment device 510, control data 612 from a control system 530, for operating the command component 514 in a slave mode 614 toward a target configuration 515 in response to the control data 612, the target configuration 515 representing a position of the actuator 524 of the lens 524; and (b) when receiving a manual operation at the command component 514, generating via a processor 516, command data 616 to be sent to the actuator 524 of the lens 522 for an adjustment of the lens 522, in order to override the control data 612 received from the control system 530. The method further includes (c) sending the command data 612 to the actuator 524 of the lens 522.

The operation of the command component 514 is motor driven in the slave mode. When the command component 514 is operated manually in the override mode, a feedback operation is generated at the command component 514, for example varying the torque applied to the command component 514, and more particularly increasing the torque to create a detent during the manual operation of the command component 514. The feedback operation may be activated in the override mode, when one or more feedback condition is met, for example, when the command component is manually operated away from the target configuration communicated in the control data received from the control system. The feedback condition is stored in a memory 546 of the adjustment component.

According to alternate embodiments, the manual operation of the command component may be received via a user interface, for example via a touchscreen on the adjustment device.

The control data 610 received at step (a) of the method is determined based on a location to be captured by the camera 520, within a given space. This location may be received from an external source, and may correspond to a node within a model representing the given space to be subjected to the camera 520 for an image capture.

The method further comprises receiving at the control system, lens setting data 614 representing a position of the actuator 524 of the lens 522, and storing the lens setting data into the memory 534.

It is to be understood that the above-described system and method may be transferable to other applications, such as other types of equipment having an actuator for a variable setting which can also be operated manually (either directly or indirectly through a remote device).

For example, in the context of an adjustment device for adjusting an equipment having a variable setting, where the equipment has an actuator for adjusting this variable setting, and the actuator is responsive to a control system for automatically controlling the actuator. The adjustment device would comprise: a communication module for receiving control data from the control system; a command component being operable in a slave mode, wherein the command component is operated toward a target configuration in response to the control data received from the control system, said target configuration representing a position of the actuator of equipment, the command component being further operable in an override mode when the command component receives a manual operation; and a processor for operating the command component based on the control data received in the slave mode, and for generating, based on a configuration of the command component, command data to be sent to the actuator of the variable setting of the equipment, via the communication module, when the command component is operated manually in the override mode. This device may comprise several of the features and components described above.

In operation, a corresponding method would comprise: (a) receiving control data, at a command component, from said control system for operating the command component toward a target configuration in response to the control data, the target configuration representing a position of the actuator of the variable setting of the equipment; and (b) when receiving a manual operation at the command component, generating via a processor, command data to be sent to the actuator of the equipment for an adjustment of the variable setting, in order to override the control data received from the control system.

Method for Creating a Mathematical Model of a Lens

Referring to FIG. 37, there is provided a method 700 for building a model of a lens for a camera 702, the camera having a focal plane 704. The method 700 comprises: (a) providing a visual target 710 located at a focal node 712 of a node sensor 714; (b) receiving 716 focus adjustment of the lens to achieve a focus setting where the visual target 710 is in focus at the camera 702; (c) obtaining focal distance data 718 representing a distance 720 between the visual target and the focal plane 704 of the camera 702; and (d) recording in a memory 724 an indicator 722 representing said focus setting, in association with said focal distance data. The visual target may include a focus chart. Thus, the model correlates a focus setting with a focal distance data.

The steps of the method are repeated for additional focal node(s) at corresponding location(s) (for example, between 3 and 15 distinct locations) of a given space, in order to create a mapping of the focus settings of the lens. In a particular embodiment, the visual target is placed at a first location at a minimum focal distance relative to the camera's focal plane, at a second location corresponding to an infinity distance and at a third location between the first and second locations. It is to be understood that any number of measurements may be taken. The greater the number of measurements taken, the more precise the model becomes. Focal settings corresponding to points between measured locations are correlated to a distance by extrapolation from the measured points.

The focus adjustment of step (b) may be executed via an automated focus system at the camera, for example, using pixel analysis or projecting a modulated Light-emitting diode (LED) at or near the visual target 710.

In accordance with an embodiment, step (c) comprises: providing a camera sensor 726 at the camera 702; receiving position information of the camera via the camera sensor 726, said position information corresponding to the focal plane 704 of the camera 702, and receiving position information of the focal node 712 via the node sensor 714; and calculating, by means of a processor 728, said focal distance data 718 based on the position information received.

Thus, the method for creating a mathematical model of a lens in two possible stages:

Stage One:

Firstly, a visual target or focus chart is attached to a motion capture or positional/orientation sensor such that the exact plane of focus of that focus chart is (by using offset) the exact focal node associated with that sensor. i.e. the position reported by the system is the focal plane.

Using a position/orientation sensor on the camera, that similarly has a focal node associated with the exact focal plane of the image sensor (or photographic plane) of the camera, it is then possible to calculate the distance between the focus chart and camera.

The user can then manually adjust focus until the chart is in focus and then record that "integer number" as a point on the lens which represents that distance for that lens. This point can then be stored in a software application by choosing to enter the data when observed focus is acceptable.

By repeating this process for several points it will be possible, without using a measuring tape, or laser finder, or referring to witness marks to create a visually accurate mathematical model of the lens which will represent observed focus to the limit of the observers ability.

Stage Two:

Further to this method it is also possible to use an optical recognition algorithm to analyze the focus chart, instead of using human evaluation, which will be capable, by means of pixel analysis, to more accurately evaluate when focus is achieved.

An enhancement of this method causes the software to recognize the focus chart (equipped with a position/orientation sensor) as a distinct object and automatically "hunt" for focus by automatically adjusting the focus motor that controls the lens. In this way, a user can calibrate a lens by simply holding the focus chart in view of the lens and moving from one distance to another. The software then automatically tracks the corresponding "integer number" to an observed sharp focus and thus creates a mathematical model of the lens behavior.

In Addition:

It is equally important to note that this method, relying as it does on a positional and orientation tracking system, is not only a method for calibrating a lens—which is the case in situations where it is known that the positional and orientation data is 100% accurate, but also a method for calibrating the motion tracking field, relative to the lens behavior, in situations where it is knows or suspected that the positional and orientation data are exposed to a constant distortion. In this way, even if the distance data is incorrect, the observed focus will be correct. The mathematical data gathered in this instance can be seen as an additional method for calibrating a lens/motion tracking hybrid system. The data gathered from known qualities about the focal performance of the lens (i.e. when witness marks have been verified as being accurate and entered into one mathematical model) can thus be applied to make corrections in the positional/orientation data, creating an "overlay" or look-up table which makes said correction, or it can be used to create an alternative mathematical model of the lens which matches perfectly the (incorrect) positional/orientation data.

This method includes both uses. For greater clarity, it is a method for using lens data to calibrate a motion capture field, in equal measure to using a motion capture field to calibrate a lens.

Hunting Focus Method:

The camera can adjust it's focus to find a defined focal target based on pixel analysis. The focal target will have highly detailed optical features to allow well defined focal points. Once the focal target is found, the focal system will pull the focus forward until it just starts to go out of focus. The focal system will then pull the focus back until sharp focus is found again or in reverse order. This data point can be stored. The focal system can then pull the focus back until it just starts to go out of focus again, and then pull forward until sharp focus is achieved. This data point would then be stored as well. Mathematically, the focal curves would be applied to find the focal center of these measurements. This data gives us the focal distance and depth for the given measurements. The motion capture system would record the data of the focal target. Repeating these measurements in areas of interest would allow mapping out a target area, and thus allowing a simplified way of automatically calibrating the camera lens system, along with compensating for motion capture distortions.

To assist in the camera finding the focal target quickly, a modulated LED that may be visible or infrared (in a range that the camera can view) could be used on or near the focal target. This will quickly allow the vision processing to find where the target is located, by looking for the modulated blink of the LED, thus avoiding the need to search the entire view plane for patterns, that are out of focus. The LED may be controlled by the vision processor, though the already established RF link, to avoid blinding the camera.

Motion of the focal target may be compensated by feedback from the motion capture system, so that the results are as accurate as possible. A display, such as a LED bar graph on the unit may be used to indicate to the user that the system has completed the focus data point successfully.

The system can be further automated by embedding focal targets in the set, or by robotic methods such as drones or other robotic means.

Definitions:

Virtual detent—definition—(Our definition) A virtual detent is a form of Haptic feedback that will give a feeling of a detent normally used in a mechanical device, such as a balance control knob, only it is created and controlled by the control system embedded in the rest of the device. The virtual detent can be created with an electromechanical servo motor. For example, when the detent position is rotated to, the servo applies some torque to "pull" it into the detent, where it locks to, with moderate opposing (to rotation) torque levels. One the rotation is turned beyond the detent, the torque is removed.

Virtual analog rocker—(Our definition) A moderate torque setting is used to return a shaft, in which a knob can be connected. Once the knob reaches it's set position, servo lock is maintained. If the knob is turned from the set position, an opposing torque is applied, in the direction of the set point. The torque is controlled to give a comfortable user experience, and the torque may be increased as the knob gets further from it's set point to give greater feedback. The servo encoder gives the position of the knob.

Live Visual Effects

Figure 38:
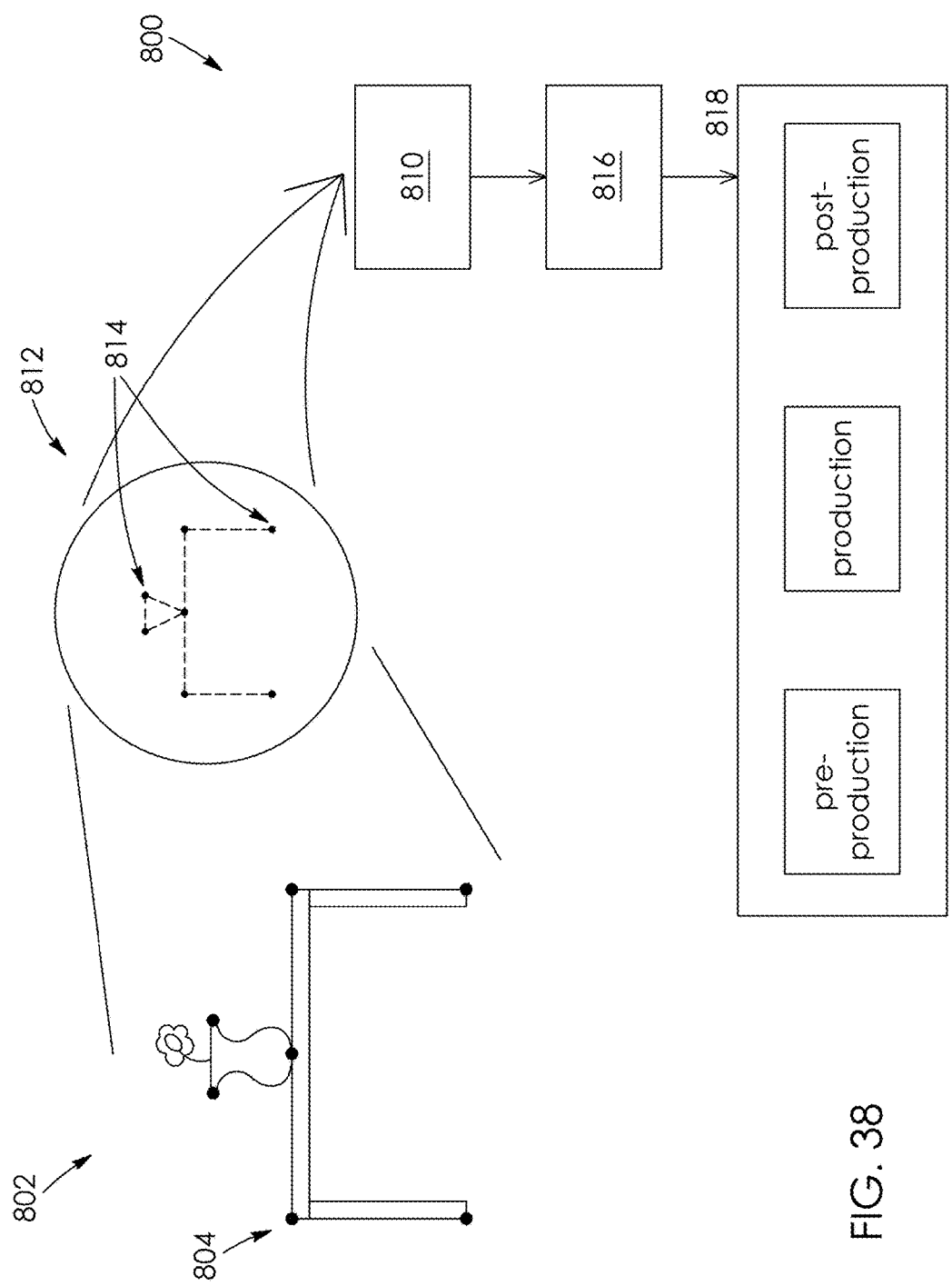
FIG. 38 is a schematic diagram showing a method for treating an image capture, in accordance with a particular embodiment.
Figure 39:
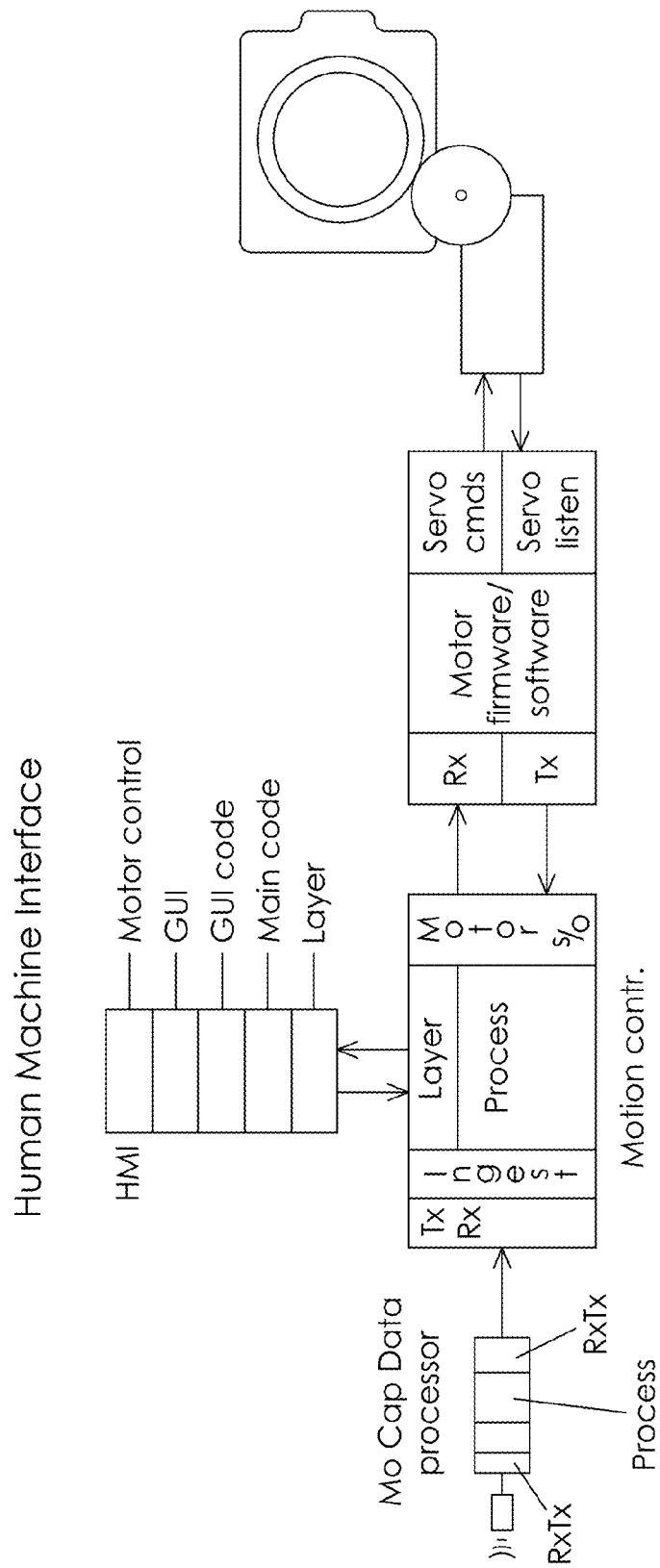
FIG. 39 concerns a system for generating visual effects in live situations, in accordance with the method shown in FIG. 38.
Figure 40:
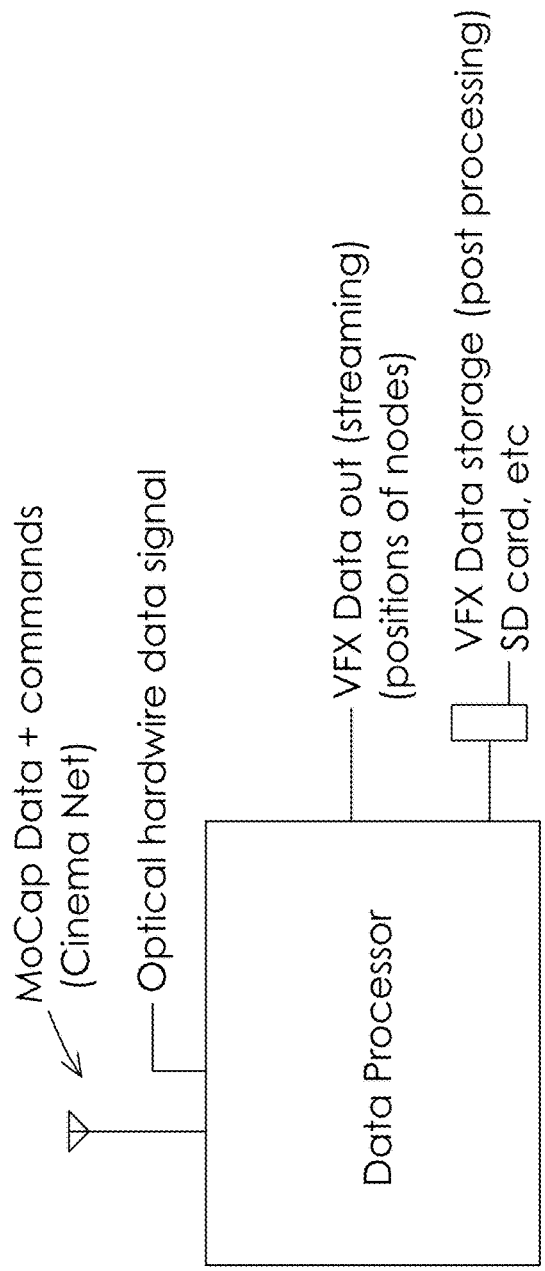
FIG. 40 concerns the capture and providing of position and orientation data to a software for use in visual effects, in accordance with the method shown in FIG. 38.

A particular embodiment, with reference to FIG. 38 to 40, relates to the field of in-camera and cameral-less data collection during pre-production, production, and post production, providing datasets for live and post production workflows related to visual effects (also referred to herein as "Visual FX" of vfx). More particularly, there is provided a system and method for capturing and providing position and orientation node data for use in the field of visual effects in live situations and in all stages of production (i.e. uses of the data other than for control of camera equipment). This approach to providing positional and orientation data will drastically change aspects of motion pictures including visual effects. props/set construction, 2D to 3D conversions. This will change the current production vs. post production workflow. Visual effects includes any aspect of image manipulation including all aspects of cgi (e.g. lighting and shading, texture mapping, use of physics models, compositing, etc.) and all other types of image manipulations.

FIG. 38 show steps of a method 800 for treating an image capture, to produce visual effects. The method comprises: (a) providing in a memory 810, a model 812 of a given space 802, said model 812 comprising at least one node 814, each node 814 representing a physical location 804 in the given space 802; and manipulating, by means of a processor 816, an image capture activity 818 of said given space, based on said at least one node 814 of the model 812.

The image capture activity 818 may comprise a pre-production activity, a production activity, and/or a post-production activity.

As examples of pre-production activities, the image capture activity may comprise presenting the physical location(s) 804, as reference points relative to the given space, for example by displaying the reference points 814 on a display screen, which may optionally display an image capture of physical elements to overlay over said reference points.

Production activities may include treating image capture based on a condition associated with a target node of the model. Examples include:

- generating an output to direct an image capture equipment according to a location in the given space corresponding to the target node (for example, with reference to FIG. 38, directing a camera, lighting equipment, and/or sound equipment to point to a particular corner of the table);
- controlling said image capture equipment based on a position of the target node within the captured image (for example, with reference to FIG. 38, controlling a camera to focus on a particular corner of the table);
- creating an animation or virtual object to be displayed, over the captured image, at the position within the captured image corresponding to the target node;
- creating a visual effect to be displayed, over the captured image, at a position within the captured image corresponding to the target node; and
- capturing a physical movement during image capture, and generating a new node in the model, based on said physical movement.

Each node 814 is associated with a corresponding position data. The position data may be offset relative to a reference. In this case, the position data of a node may be obtained by: (i) providing position data and orientation data of the reference; (ii) applying said offset to the position data and orientation data of the reference to calculate the position of the node. Applying the offset in step (ii) comprises: determining relative coordinates of the node in relation to said position data and orientation data of the reference, within an axis system defined by the reference; and evaluating an absolute position of the node, based on an axis system of the model. The reference may be a sensor node associated with a sensor in the given space. In this case, step (i) comprises receiving said position data and orientation data from a measurement of the sensor.

Some examples of ways which embody the above-described method include:

- current technique for vfx often need to much computation time (and also often require visible markers) and so don't allow for real-time vfx (e.g. a parrot setting on the shoulder of a newscaster in*real-time*).
- combining auxilliary measured data type to improve facets and uses of the data set (e.g. intertial sensors in lenses, barometer for elevation, GPS data, gimble inertial measurement sensors, etc.).
- synchronising the dataset with other data controlled equipment (e.g. motion control arms, perfect horizon, remote heads, lighting, etc.).
- the system and data described in this patent allows for capturing the desired actor in the streets of Paris in the correct clothes even though he will be missing his head.
- for a location based shoot, a vfx team could capture the physical environment (e.g. an entire house interior) before shooting begins.
- nodes (e.g. an actor's eyes) can now be captured in any environment as opposed to being limited to specially equipped studios (e.g. motion capture studios). For example, a pirate could do their acting on an actual pirate ship or in somebody's living room as opposed to needing to wear a motion tracking suit and work in a green screen studio.
- create a node a few inches above an actor's shoulder, then the node data is useful to assist post production in placing an animated CGI parrot on a pirate's shoulder for scenes in a movie.
- create a series of nodes by tapping on a wall to make a geometric pattern, then data from these points can be used to create a cgi hole in the wall as opposed to making use of a 'green screen'.
- create nodes on persons face and then overlay a mask on their face using these nodes.
- allowing production staff to indicate to create multiple nodes in the air to make a point or 2D or 3D object anywhere (e.g. make a portal).
- it can change the way VFX teams plan to manipulate objects in the frame, allowing for actors to naturally interact with real things that can be changed in post (or made to stay the same from take to take) by mapping those objects. Example: Aladdin's lamp is on the table, a fight ensure, it falls off the table but is to be glowing in the final movie. Every take, it can go where it naturally falls, and the actor is chasing the real object. We are bringing an element to visual effects movies that will allow for different, naturalistic performances, eyelines etc. This changes how you can plan and preconceive how actors can/will interact with virtual elements of a scene.
- create nodes on objects so post will know two-dimensional to three-dimensional conversion.

Other optional aspects and exemplary embodiments of the techniques include:

A particular embodiment provides a system and method for controlling a setting of an equipment related to image capture. Such equipment may include a camera, and the setting may be for example a focus setting, a zoom setting, an aperture setting, an inter ocular lens angle setting, and/or control pan setting, a tilt setting, a roll setting of the camera, and/or positional setting of the camera, and/or a lighting equipment setting, and/or a sound equipment setting, and/or the like.

In accordance with an optional aspect, there is provided a method for controlling a setting of an equipment related to image capture, comprising:

a) capturing position data and orientation data at a sensing device;
b) determining, by means of a processor, position information of a region of interest to be treated by the equipment, from the position data and orientation data having been captured; and
c) outputting, via an output port of the processor, a control signal directed to the equipment, in order to control in real-time the setting of the equipment based on said position information of the region of interest.

The "equipment" may comprise an image capture equipment, such as a camera to capture an image of the subject (either a photo or video image)_and/or it may comprise equipment which cooperates with an image capture equipment, such as lighting equipment, sound capture equipment, and/or the like.

In accordance with another optional aspect, there is provided a system for controlling a setting of an equipment related to image capture, comprising:

a sensing device configured to capture position data and orientation data;
a processor being in communication with the sensing device, the processor being configured to determine position information of a region of interest to be treated by the equipment, from the position data and orientation data; and an output port integrated in the processor, configured to output a control signal directed to the equipment, in order to control in real-time the setting of the equipment based on said position information of the region of interest.

In accordance with another optional aspect, there is provided a non-transitional computer-readable storage having stored thereon data and instructions for execution by a computer, said data and instructions comprising:

code means for receiving position data and orientation data of a sensing device;

code means for determining position information of a region of interest to be treated by the equipment, from the position and orientation data; and code means for outputting a control signal directed to the equipment, in order to control in real-time the setting of the equipment based on said position information of the region of interest.

In accordance with another optional aspect, there is provided a method for controlling a setting of an equipment related to image capture, comprising:

a) storing in a memory, one or more identifier, each identifier being associated to a predefined region of interest to be treated by the equipment and storing corresponding position information;

b) receiving, at a processor, a selection of said one or more identifier; and c) outputting, via an output port of the processor, a control signal directed to the equipment, in order to control in real-time the setting of the equipment based on the position information of the selected one of said one or more predefined region of interest.

In accordance with another optional aspect, there is provided a system for controlling a setting of an equipment related to image capture, comprising:

a memory configured to store one or more identifier of a predefined region of interest to be treated by the equipment and corresponding position information;

a processor being in communication with the memory and configured to receive a selection of said one or more identifier; and an output port being integrated with the processor, being configured to output a control signal directed to the equipment, in order to control in real-time the setting of the equipment based on the position information of the selected one of said one or more predefined region of interest.

According to embodiments, the components of the above system are provided in a central device (for example a computer), the system further comprising one or more user device (for example a computer, which may be a tablet computer with a touch screen) for receiving user commands, the user device being in communication with the central device. More particularly, the user device may be configured to present the one or more predefined region of interest to a user via a graphical user interface, as well as to receive from the user a selection of said one or more region of interest, and to transmit references to said one or more region of interest to the central device.

In accordance with yet another optional aspect, there is provided a non-transitional computer-readable storage having stored thereon one or more identifier of a predefined region of interest to be treated by the equipment and corresponding position information, the computer-readable storage further comprising data and instructions for execution by a processor, said data and instructions comprising:

code means for receiving a selection of said one or more identifier; and code means for outputting a control signal directed to the equipment, in order to control in real-time the setting of the equipment based on the position information of the selected one of said one or more predefined region of interest.

In accordance with yet another optional aspect, there is provided a method for controlling a setting of an equipment related to image capture, comprising:

a) capturing, by means of a visibility independent sensing device, position data at the sensing device;

b) determining, by means of a processor, position information of a region of interest to be treated by the equipment, from the position data; and c) outputting, by means of an output port of the processor, a control signal directed to the equipment, in order to control in real-time the setting of the equipment based on said position information of the region of interest.

In accordance with yet another optional aspect, there is provided a system for controlling a setting of an equipment related to image capture, comprising:

a visibility independent sensing device configured to capture position data;

a processor being in communication with the sensing device, the processor being configured to determine position information of a region of interest to be treated by the equipment, based on the position and orientation data; and an output port integrated with the processor being configured to output a control signal directed to the equipment, in order to control in real-time the setting of the equipment based on said position information of the region of interest.

According to embodiments, the system further comprises a controller being in communication with the output port and being configured to control the setting of the equipment with said control signal.

According to embodiments, the setting may comprise: a focus setting of a camera, a zoom setting of the camera, an aperture setting of the camera, an inter ocular lens angle setting of the camera, a pan setting of the camera, a tilt setting of the camera, a roll setting of the camera, a positional setting of the camera, a lighting equipment control setting, and/or a sound equipment setting.

In accordance with still another optional aspect, there is provided a non-transitional computer-readable storage having stored thereon data and instructions for execution by a computer having an input port for receiving position data from a visibility independent sensing device, said data and instructions comprising:

code means for determining position information of a region of interest to be treated by the equipment, based on the position data and orientation data; and code means for outputting a control signal directed to the equipment, in order to control in real-time the setting of the equipment based on said position information of the region of interest.

According to still another optional aspect, there is provided a system for controlling a setting of an equipment related to image capture, comprising:

a) a sensor to be mounted on a subject to be captured by the camera, adapted for capturing three-dimensional positional data;

b) a processor adapted to communicate with the sensor for receiving the positional data and for generating a control signal based on the positional data; and
c) a controller adapted to communicate with the processor, in order to control, in response to the control signal, the setting of the equipment.

In particular embodiments, the setting may include: a focus setting, a zoom setting, an aperture setting, an inter ocular lens angle setting, and/or control pan setting, a tilt setting, a roll setting of the camera, positional setting of the camera, a lighting equipment setting, a sound equipment setting, and/or any combination thereof.

In particular embodiments, the system further comprises a sensor to be mounted on the camera, namely in case the camera moves in relation to the subject to be captured.

According to still another optional aspect, there is provided a method for controlling a setting of an equipment related to image capture, comprising:
capturing three-dimensional positional data related to a subject to be captured by a camera;
generating a control signal based on the positional data; and
controlling, in response to the control signal, the setting of the equipment.

According to still another optional aspect, there is provided a non-transitional processor-readable storage medium for controlling a setting of an equipment related to image capture, the storage medium comprising data and instructions for execution by a processor to:
receive three-dimensional positional data related to a subject to be captured by a camera;
generate a control signal based on the positional data; and
transmit the control signal to a controller for controlling the setting of the equipment.

According to still another optional aspect, there is provided a system for controlling a setting of an equipment related to image capture, comprising:
a sensor and transmitter to be mounted on a subject to be captured by a camera, adapted for capturing positional and/or orientation data;
a processor adapted to communicate with the sensor's transmitter for receiving the positional data and for sending a control signal based on said positional and/or orientation data; and
a controller adapted to communicate with the processor, in order to receive the control signal and to control, in response to the control signal, the setting of the equipment.

In accordance with still another aspect, there is provided a method associated to the above-mentioned system.

In accordance with still another aspect, there is provided a non-transitional processor-readable storage medium comprising data and instructions to carry out the method associated to the above-mentioned system.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

The invention claimed is:

1. An adjustment device for a camera system, the camera system comprising a camera having a lens and an actuator for adjusting the lens, the camera system further comprising a control system for automatically controlling the actuator of the lens, the adjustment device comprising:
a communication module for receiving control data from the control system;
a command component comprising a rotatable knob and a motor for driving the rotatable knob and being operable remotely of the camera system and further being operable in a slave mode, wherein the command component is operated toward a target configuration in response to the control data received from the control system, said target configuration representing a position of the actuator of the lens, the rotatable knob further being rotated by the motor to follow the position of the actuator of the lens while in the slave mode, and the command component being further operable in an override mode when the command component receives a manual operation; and
a processor for operating the command component based on the control data received in the slave mode, and for generating, based on a configuration of the command component, command data to be sent to the actuator of the lens, via the communication module, when the command component is operated manually in the override mode.

2. The adjustment device according to claim 1, wherein the command data represents at least one of: an adjustment of the focus of the lens, an adjustment of the iris setting of the lens, and an adjustment of the zoom of the lens.

3. The adjustment device according to claim 1, further comprising a haptic user feedback mechanism being operatively connected to the processor and to the command component, to provide haptic feedback to a user via the rotatable knob of the command component, when the command component is operated manually in the override mode.

4. The adjustment device according to claim 3, wherein the haptic feedback mechanism is configured to apply a torque to the command component.

5. The adjustment device according to claim 4, wherein the haptic feedback mechanism is configured to create a detent during said manual operation of the command component by increasing the torque.

6. The adjustment device according claim 3, wherein the processor is configured to activate the user feedback mechanism in the override mode, when the command component is manually operated away from the target configuration communicated in the control data received from the control system.

7. The adjustment device according to claim 1, wherein said target configuration corresponds to a target setting of the lens for capturing a target location in a given space; and
wherein the control system generates control data based on a location in a given space, to be captured by the camera, in order to operate the actuator of the lens toward a corresponding position and to operate the command component in an associated target configuration.

8. The adjustment device according to claim 7, wherein said target location is associated with a node of a model of said given space.

9. The adjustment device of claim 1, wherein the command component being operated manually in the override mode corresponds to a user manually rotating the knob contrary to an impulse of the knob being rotated in the slave mode.

10. An adjustment system comprising:
a control system;
a camera having a lens and an actuator for adjusting the lens, the actuator being automatically controllable via the control system; and
an adjustment device, in accordance claim 1.

11. The adjustment system according to claim 10, wherein the control system is further configured to receive lens setting data representing a position of the actuator of the lens.

12. A method for adjusting a camera, the camera having a lens and an actuator for adjusting the lens, the camera being in communication with a control system for automatically controlling the actuator of the lens, the method comprising:
  a. receiving at a command component, control data from said control system, for operating the command component remotely of the camera system in a slave mode toward a target configuration in response to the control data, the target configuration representing a position of the actuator of the lens;
  b. when receiving a manual operation at the command component, generating via a processor, command data to be sent to the actuator of the lens for an adjustment of the lens, in order to override the control data received from the control system; and
  c. sending said command data to the actuator of the lens;
  wherein the command component comprises a rotatable knob and a motor for driving the rotatable knob; and
  wherein operating the command component in the slave mode toward the target configuration comprises rotating the knob by the motor to follow the position of the actuator of the lens.

13. The method according to claim 12, wherein the adjustment of the lens corresponding to the command data in step (b) comprises at least one of: an adjustment of the focus setting of the lens, an adjustment of the iris setting of the lens, and an adjustment of the zoom setting of the lens.

14. The method according to claim 12, further comprising: generating a haptic feedback operation at the command component at step (b), when the command component is operated manually in the override mode.

15. The method according to claim 14, wherein said generating comprises varying a torque applied to the command component.

16. The method according to claim 15, wherein said generating comprises create a detent during said manual operation of the command component by increasing the torque.

17. The method according to claim 14, wherein the feedback operation is activated in the override mode, when the command component is manually operated away from the target configuration communicated in the control data received from the control system.

18. The method according to claim 12, wherein the control data received at step (a) is determined based on a location to be captured by the camera, within a given space.

19. The method according to claim 12, further comprising:
receiving at the control system, lens setting data representing a position of the actuator of the lens.

20. A non-transitional storage comprising data and instructions for execution by a processor, to carry out the steps of the method according to claim 12.

21. The adjustment device of claim 12, wherein receiving a manual operation in order to override the control data received from the control system corresponds to a user manually rotating the knob contrary to an impulse of the knob being rotated in the slave mode.

* * * * *